United States Patent
Walmsley et al.

(10) Patent No.: US 6,771,811 B1
(45) Date of Patent: Aug. 3, 2004

(54) METHOD AND APPARATUS FOR UP-INTERPOLATING A BAYER IMAGE

(75) Inventors: Simon Robert Walmsley, Epping (AU); Paul Lapstun, Rodd Point (AU)

(73) Assignee: Silverbrook Research Pty Ltd., Balmain (AU)

( * ) Notice: Subject to any disclaimer, the term of this patent is extended or adjusted under 35 U.S.C. 154(b) by 669 days.

(21) Appl. No.: 09/659,837

(22) Filed: Sep. 11, 2000

(30) Foreign Application Priority Data

Sep. 16, 1999 (AU) ............................................. PQ2890

(51) Int. Cl.$^7$ ................................................. G06K 9/00
(52) U.S. Cl. ....................... 382/162; 382/167; 382/293
(58) Field of Search ................................ 382/162, 165, 382/166, 167, 274, 293, 300; 348/222.1, 263, 264; 358/1.9, 3.07

(56) References Cited

U.S. PATENT DOCUMENTS

| | | | | |
|---|---|---|---|---|
| 6,205,245 B1 | * | 3/2001 | Yuan et al. ................... | 382/162 |
| 6,466,618 B1 | * | 10/2002 | Messing et al. ............... | 348/42 |
| 6,573,932 B1 | * | 6/2003 | Adams et al. ............ | 348/223.1 |

OTHER PUBLICATIONS

EP 0 709 825 A (Harris Corp); May 1, 1996; abstract; p. 2, line 6–line 27; p. 3, line 4–line 53; p. 5, line 17–line 22; p. 5, line 38–line 48.

"Software Pixel Interpolation for Digital Still Cameras Suitable for a 32–bit MCU" Sakamoto T., Nakanishi C., Hase T. IEEE Transactions on Consumer Electronics, vol. 44, No. 4, pp 1342–1352, Nov. 1998.

\* cited by examiner

*Primary Examiner*—Phuoc Tran

(57) ABSTRACT

A method for interpolating a Bayer image of red, green and blue pixels from an input space to an output space, the method including the steps of: receiving the Bayer image; and mapping each of the colors to the output space in accordance with the following:

$$x' = \left(\frac{x}{mps}\right) + k_1$$

$$y' = \left(\frac{y}{mps}\right) + k_2$$

where: x,y is the coordinate in the output space, x'y' is the coordinate in the input space; mps is the number of pixels in the output space per input space sample, and $k_{1,2}$ are either 0 or −0.5 depending on the color and the desired relative rotational orientation of the image. An apparatus for interpolating a Bayer image of red, green and blue pixels from an input space to an output space, the method including the steps of: receiving the Bayer image; and mapping each of the colors to the output space in accordance with the following:

$$x' = \left(\frac{x}{mps}\right) + k_1$$

$$y' = \left(\frac{y}{mps}\right) + k_2$$

where: x,y is the coordinate in the output space, x'y' is the coordinate in the input space; mps is the number of pixels in the output space per input space sample, and $k_{1,2}$ are either 0 or −0.5 depending on the color and the desired relative rotational orientation of the image.

8 Claims, 43 Drawing Sheets

C=Cyan
M=magenta
Y=Yellow

2×2 pixel block
in sensor

Bayer mosaic of several
2×2 pixel blocks

Full CFA res Green plane
(captured pixels are
marked)

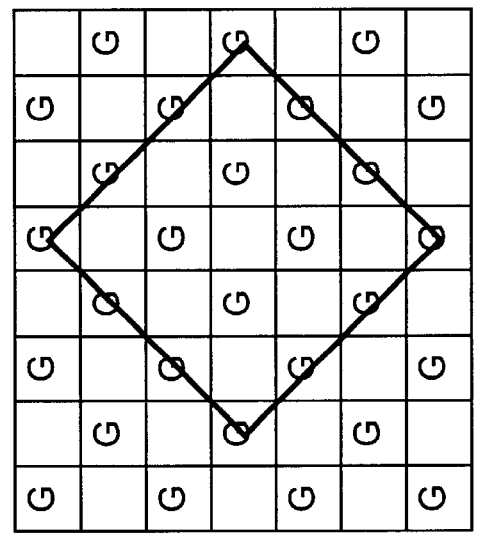
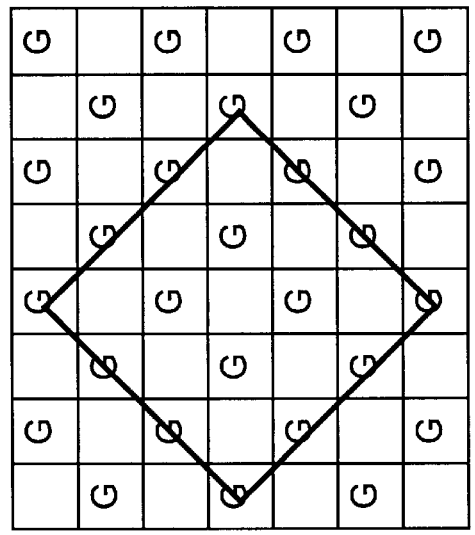
FIG. 59

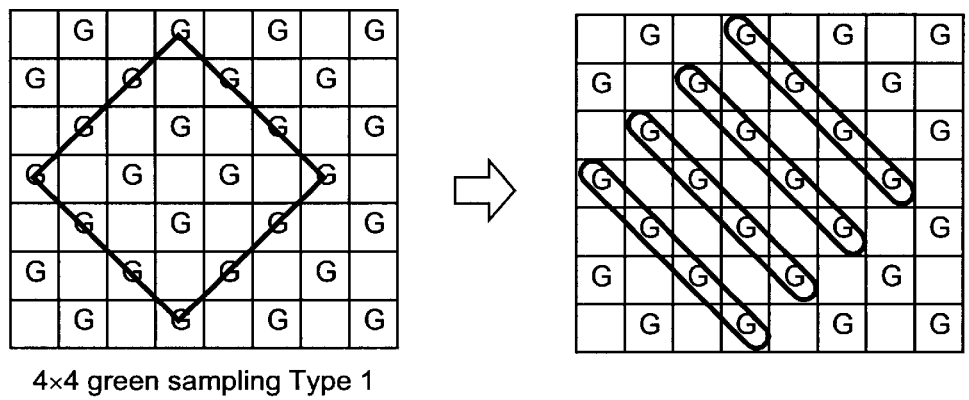
4×4 green sampling Type 1
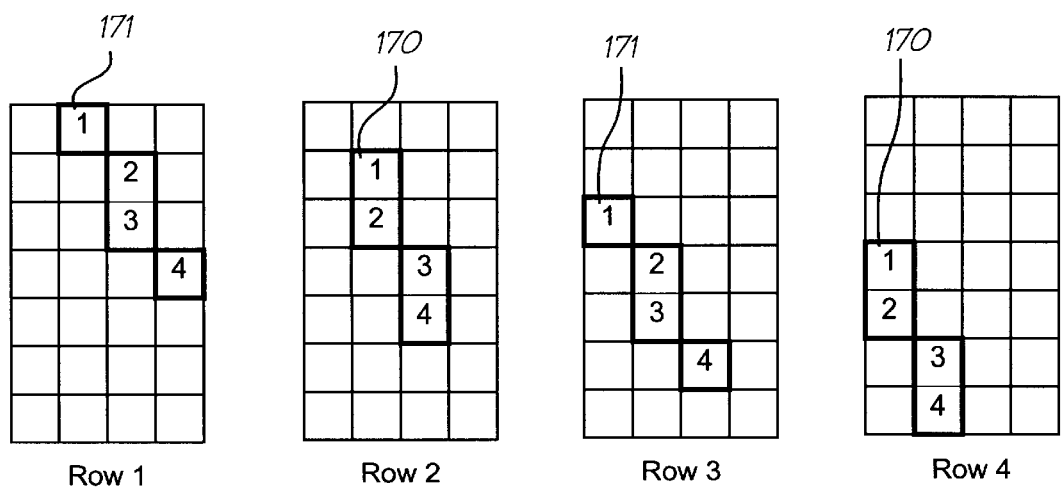
Row 1   Row 2   Row 3   Row 4
FIG. 60

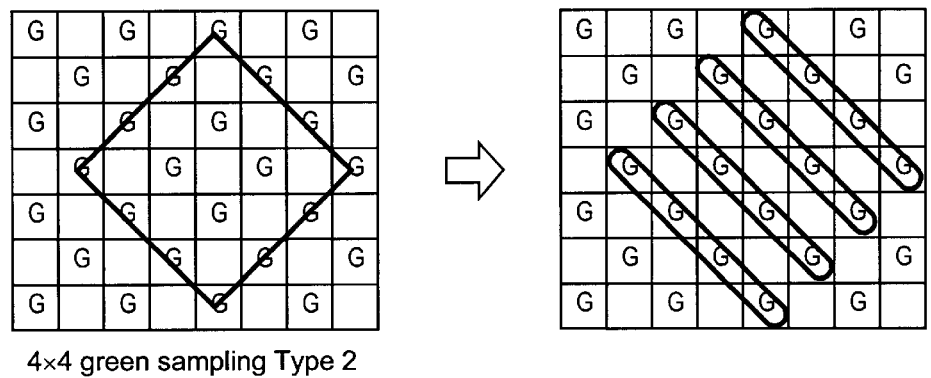
4×4 green sampling Type 2
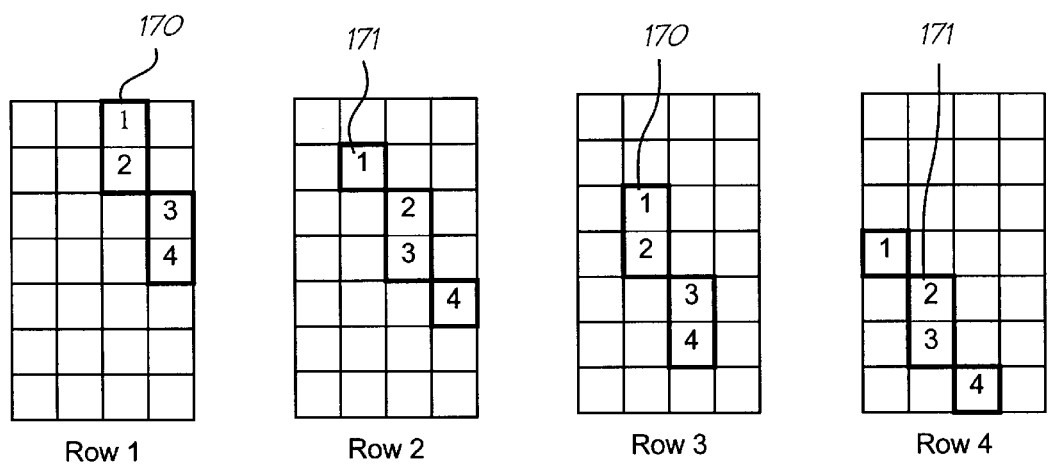
Row 1   Row 2   Row 3   Row 4
FIG. 61

FIG. 65

METHOD AND APPARATUS FOR UP-INTERPOLATING A BAYER IMAGE

CO-PENDING APPLICATIONS

Reference may be had to co-pending applications claiming priority from Australian Provisional Patent Application No. PQ2890 dated 16 Sep. 1999. The co-pending applications describe related modules and methods for implementing the compact printer system. The co-pending applications, filed simultaneously to the present application, are as follows:

| USSN | Ref No | Title of Invention |
| --- | --- | --- |
| 09/659,620 | PCP01 | Method and Apparatus for Producing Print from a Bayer Image |
| 09/659,836 | PCP02 | Method and Apparatus for Sharpening an Image |
| 09/659,835 | PCP04 | Method and Apparatus for Rotating Bayer Images |

FIELD OF INVENTION

The present invention relates to a method and apparatus for up-interpolating a Bayer image.

The invention has been developed primarily for a digital camera including an integral printer for providing a paper print of an image captured by the camera and will be described hereinafter with reference to that application. However, it will be appreciated that the invention is not limited to that particular field of use.

SUMMARY OF INVENTION

According to a first aspect of the invention there is provided a method for interpolating a Bayer image of red, green and blue pixels from an input space to an output space, the method including the steps of:

receiving the Bayer image; and mapping each of the colors to the output space in accordance with the following:

$$x' = \left(\frac{x}{mps}\right) + k_1$$

$$y' = \left(\frac{y}{mps}\right) + k_2$$

where:

x,y is the coordinate in the output space, x'y' is the coordinate in the input space;

mps is the number of pixels in the output space per input space sample, and $k_{1,2}$ are either 0 or −0.5 depending on the color and the desired relative rotational orientation of the image.

Preferably, for the green pixels in the input space, each ordinate of the input space is multiplied by $1/\sqrt{2}$. More preferably, for the green pixels in the input space, each coordinate of the input space is multiplied by $1/\sqrt{2}$.

According to a second aspect of the invention there is provided an apparatus for interpolating a Bayer image of red, green and blue pixels from an input space to an output space, the method including the steps of:

receiving the Bayer image; and mapping each of the colors to the output space in accordance with the following:

$$x' = \left(\frac{x}{mps}\right) + k_1$$

$$y' = \left(\frac{y}{mps}\right) + k_2$$

where:

x,y is the coordinate in the output space, x'y' is the coordinate in the input space;

mps is the number of pixels in the output space per input space sample, and $k_{1,2}$ are either 0 or −0.5 depending on the color and the desired relative rotational orientation of the image.

Preferably, for the green pixels in the input space, each ordinate of the input space is multiplied by $1/\sqrt{2}$. More preferably, for the green pixels in the input space, each coordinate of the input space is multiplied by $1/\sqrt{2}$.

BRIEF DESCRIPTION OF THE DRAWINGS

Preferred embodiments of the invention will now be described, by way of example only, with reference to the following description and Figures.

FIG. 59 shows 4×4 sampling of the green channel.

FIG. 60 shows 4×4 green sampling type 1.

FIG. 61 shows 4×4 green sampling type 2.

FIG. 65 shows the overlapping worst case 4×4 reading from blue and red buffers.

1 OVERVIEW OF THE PCP

1.1 High Level Functional Overview

Figure 1:
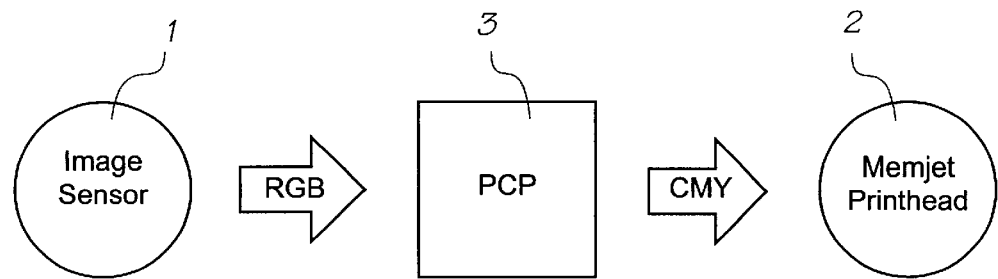
FIG. 1 shows a high level image flow of the PCP.

The Printcam Central Processor (PCP) possesses all the processing power for a Printcam and is specifically designed to be used in the Printcam digital still camera system. The PCP 3 connects to an image sensor 1 (for image capture), and a Memjet printer 2 for image printout. In terms of image processing, the PCP can be thought of as being the translator of images from capture to printout, as shown in FIG. 1:

- The Image Sensor 1 is a CMOS image sensor, which captures a 1500×1000 RGB image.
- The Image Sensor is the image input device.
- The Printhead 2 is a 4 inch long 1600 dpi Memjet printer capable of printing in three colors: cyan, magenta and yellow. The Printhead is the image output device.
- The PCP 3 takes an image from the Image Sensor 1, processes it, and sends the final form of the image to the Printhead 2 for printing. Since the Image Sensor 1 captures in RGB and the Printhead 2 prints in CMY, the PCP 3 must translate from the RGB color space to the CMY color space. The PCP 3 contains all of the requirements for the intermediate image processing, including white balance, color correction and gamut mapping, image sharpening, and half toning. In addition, the PCP 3 controls the user interface and entire print process, providing support for a variety of image formats. The PCP 3 also contains interfaces to allow export and import of photos, complying with the DPOF (Digital Print Order Format) standard.

1.2 High Level Internal Overview

The PCP 3 is designed to be fabricated using a 0.25 micron CMOS process, with approximately 10 million transistors, almost half of which are flash memory or static RAM. This leads to an estimated area of 16 mm$^2$. The estimated manufacturing cost is $4 in the year 2001. The PCP 3 is a relatively straightforward design, and design effort can be reduced by the use of datapath compilation techniques, macrocells, and IP cores. The PCP 3 contains:

- A low speed CPU/microcontroller core 10
- 1.5 MBytes of multi-level Flash memory (2-bits per cell) 11
- A CMOS Image Sensor Interface 98 inside an Image Capture Unit 12
- 16 KByte Flash memory for program storage 13
- 4 KByte RAM for program variable storage 14

The PCP 3 is intended to run at a clock speed of approximately 100 MHz on 3V externally and 1.5V internally to minimize power consumption. The actual operating frequency will be an integer multiple of the Printhead operating frequency. The CPU 10 is intended to be a simple micro-controller style CPU, running at about 1 MHz. Both the CPU 10 and CMOS sensor interface 12 can be vendor supplied cores.

Figure 2:
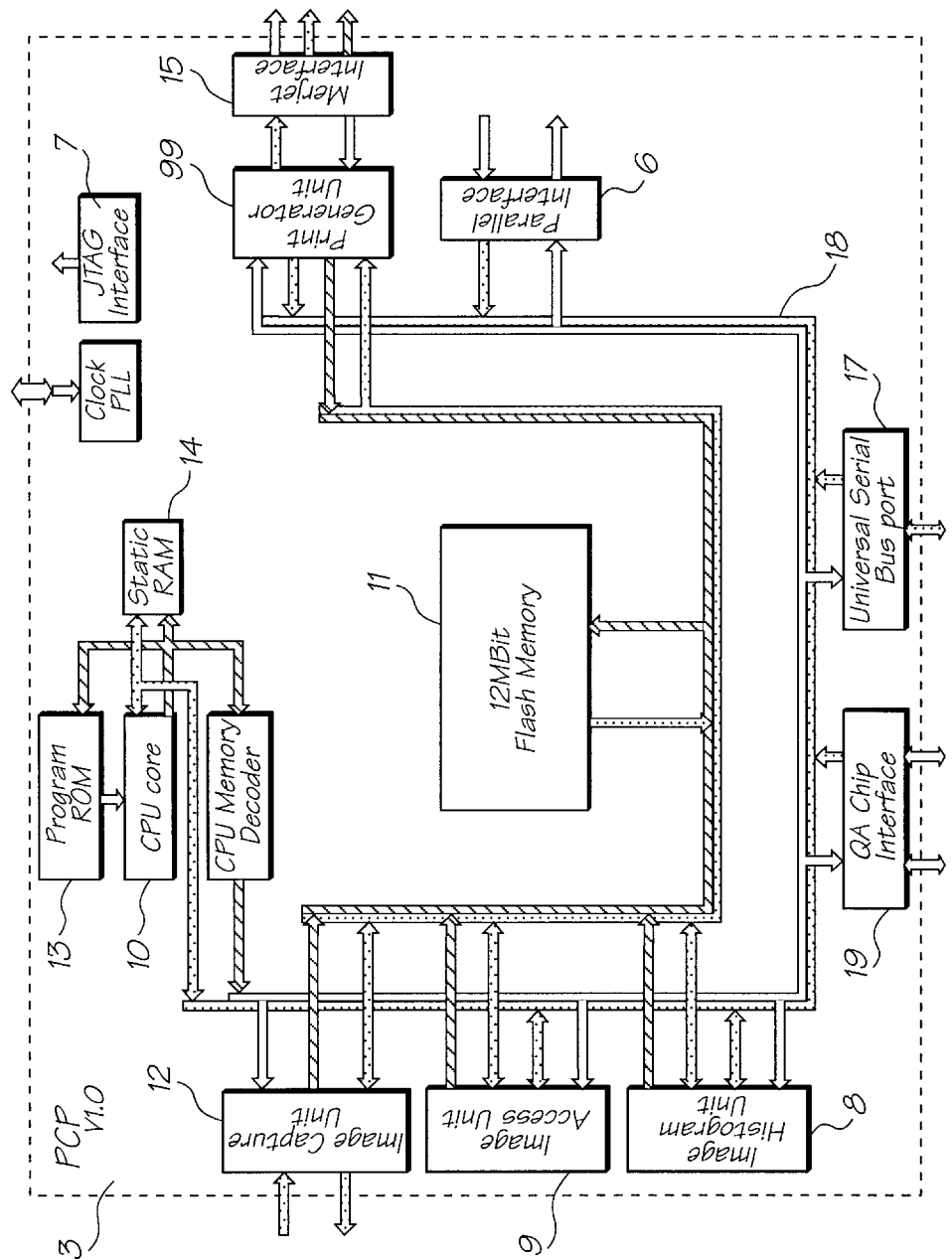
FIG. 2 shows a block diagram of the PCP in isolation.

FIG. 2 shows a block diagram of the PCP 3 in isolation.

Figure 3:
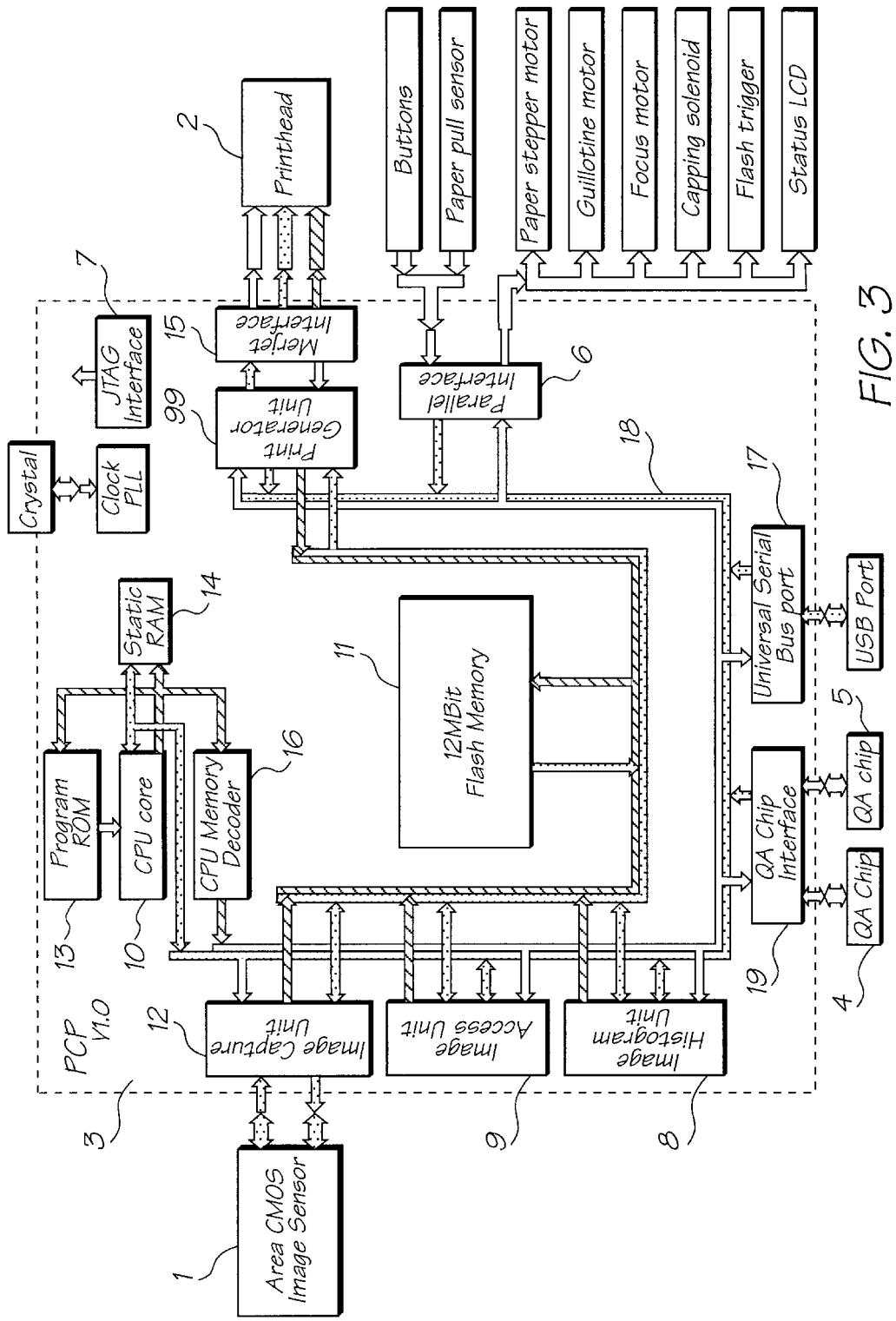
FIG. 3 shows a block diagram of the PCP connected to Printcam hardware.

The PCP 3 is designed for use in Printcam systems. FIG. 3 shows a block diagram of the PCP 3 connected to the rest of the Printcam hardware.

2 Printhead Background

Figure 4:
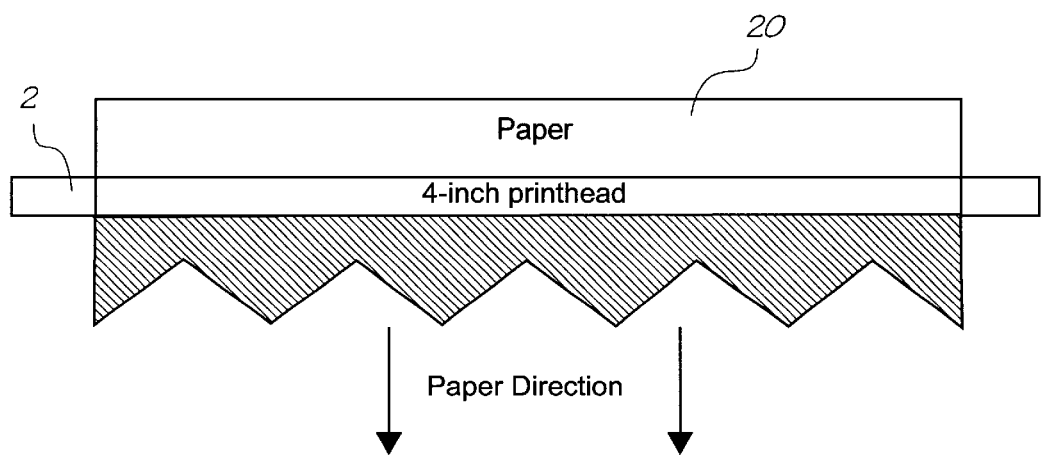
FIG. 4 shows a 4-inch Memjet printhead.

The PCP 3 is specifically designed to connect to a 4-inch (10-cm) Memjet printhead 2. The printhead 2 is used as a page-width printer, producing a 4-inch wide printed image without having to be moved. Instead, paper 20 is printed on as it moves past the printhead 2, as shown in FIG. 4

2.1 Composition of 4-inch Printhead

Figure 5:
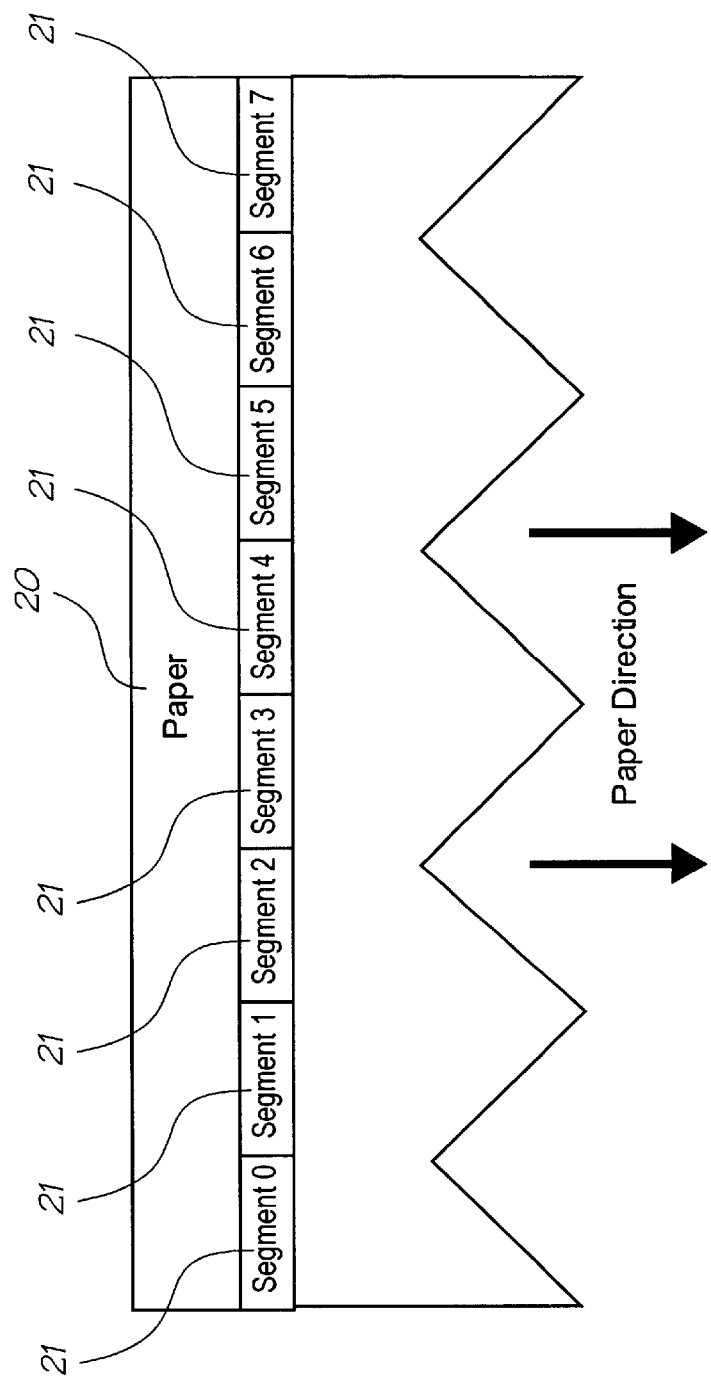
FIG. 5 shows the arrangement of segments in a 4-inch printhead.

Each 4-inch printhead 2 consists of 8 segments, each segment ½ an inch in length. Each of the segments 21 prints bi-level cyan, magenta and yellow dots over a different part of the page to produce the final image. The positions of the segments are shown in FIG. 5.

Since the printhead 2 prints dots at 1600 dpi, each dot is 22.5 µm in diameter, and spaced 15.875 µm apart. Thus each half-inch segment prints 800 dots, with the 8 segments corresponding to positions:

TABLE 1

Final Image Dots Addressed by Each Segment

| Segment | First dot | Last dot |
|---|---|---|
| 0 | 0 | 799 |
| 1 | 800 | 1,599 |
| 2 | 1,600 | 2,399 |
| 3 | 2,400 | 3,199 |
| 4 | 3,200 | 3,999 |
| 5 | 4,000 | 4,799 |
| 6 | 4,800 | 5,599 |
| 7 | 5,600 | 6,399 |

Although each segment 21 produces 800 dots of the final image, each dot is represented by a combination of bi-level cyan, magenta, and yellow ink. Because the printing is bi-level, the input image should be dithered or error-diffused for best results.

Each segment 21 then contains 2400 nozzles: 800 each of cyan, magenta, and yellow. A four-inch printhead 2 contains 8 such segments 21 for a total of 19,200 nozzles.

2.1.1 Grouping of Nozzles Within a Segment

The nozzles 22 within a single segment 21 are grouped for reasons of physical stability as well as minimization of power consumption during printing. In terms of physical stability, a total of 10 nozzles share the same ink reservoir. In terms of power consumption, groupings are made to enable a low-speed and a high-speed printing mode.

The printhead 2 supports two printing speeds to allow different speed/power trade-offs to be made in different product configurations.

In the low-speed printing mode, 96 nozzles 22 are fired simultaneously from each 4-inch printhead 2. The fired nozzles should be maximally distant, so 12 nozzles 22 are fired from each segment. To fire all 19,200 nozzles, 200 different sets of 96 nozzles must be fired.

In the high-speed printing mode, 192 nozzles 22 are fired simultaneously from each 4-inch printhead 2. The fired nozzles 22 should be maximally distant, so 24 nozzles are fired from each segment. To fire all 19,200 nozzles, 100 different sets of 192 nozzles must be fired.

The power consumption in the low-speed mode is half that of the high-speed mode. Note however, that the energy consumed to print a line, and hence a page, is the same in both cases.

In a scenario such as a battery powered Printcam, the power consumption requirements dictate the use of low-speed printing.

2.1.1.1 10 Nozzles Make a Pod

Figure 6:
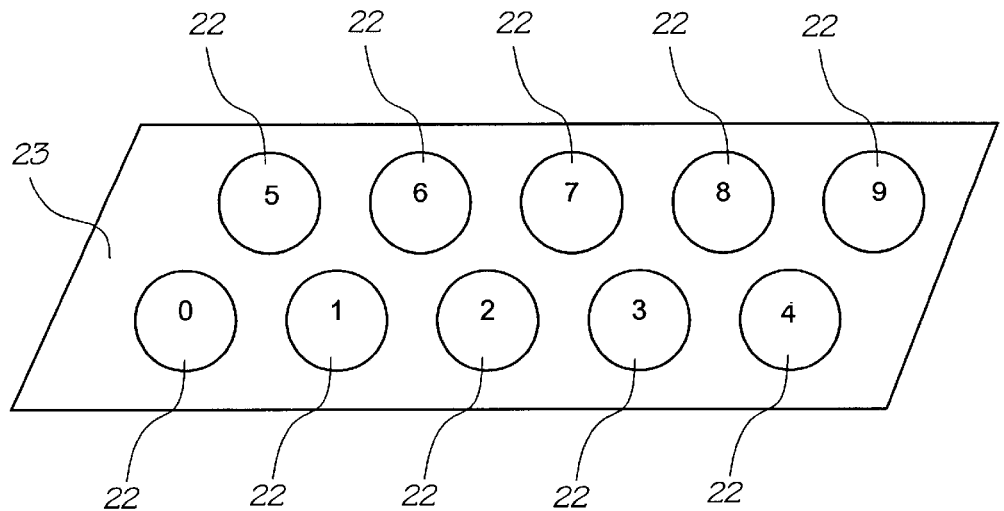
FIG. 6 shows the arrangement of nozzles in a pod, numbered by fixing order.

A single pod 23 consists of 10 nozzles 22 sharing a common ink reservoir. 5 nozzles 22 are in one row, and 5 are in another. Each nozzle 22 produces dots approximately 22.5 µm in diameter spaced on a 15.875 µm grid. FIG. 6 shows the arrangement of a single pod, with the nozzles 22 numbered according to the order in which they must be fired.

Figure 7:
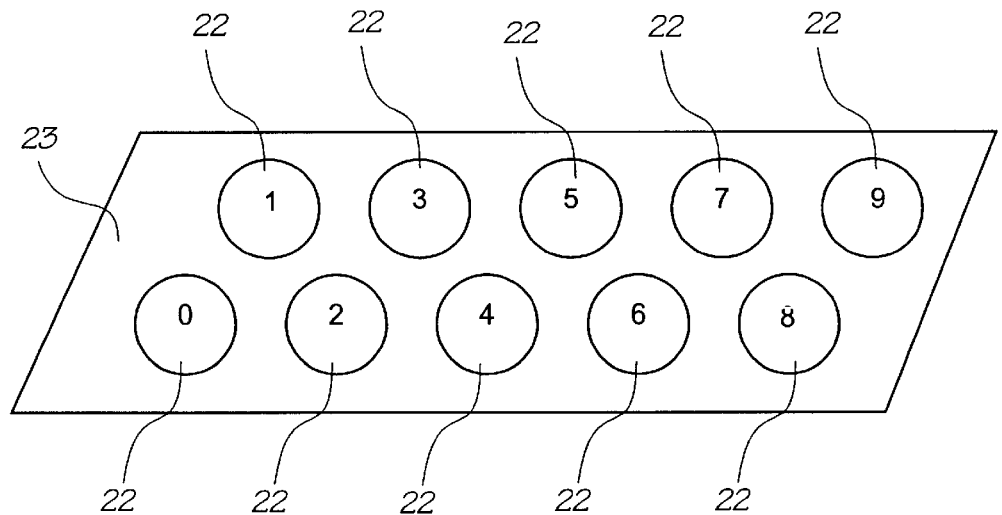
FIG. 7 shows the arrangement of nozzles in a pod, numbered by loading order.

Although the nozzles 22 are fired in this order, the relationship of nozzles 22 and physical placement of dots on the printed page is different. The nozzles 22 from one row represent the even dots from one line on the page, and the nozzles on the other row represent the odd dots from the adjacent line on the page. FIG. 7 shows the same pod 23 with the nozzles 22 numbered according to the order in which they must be loaded.

The nozzles 22 within a pod 23 are therefore logically separated by the width of 1 dot. The exact distance between the nozzles 22 will depend on the properties of the Memjet firing mechanism. The printhead 2 is designed with staggered nozzles designed to match the flow of paper 20.

2.1.1.2 3 Pods Make a Chromapod

Figure 8:
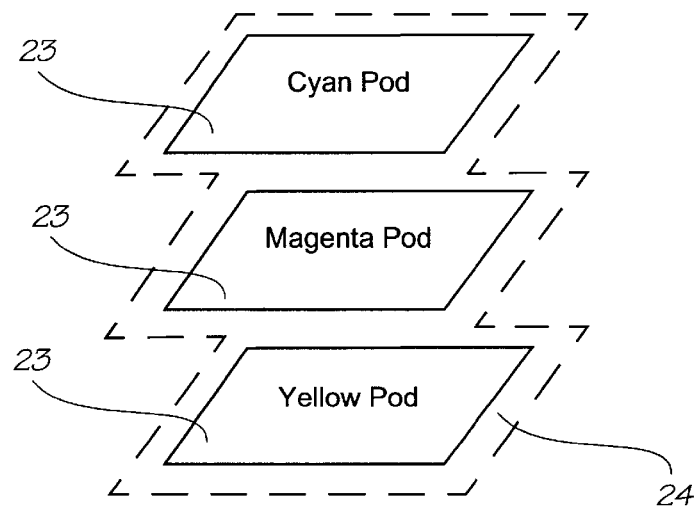
FIG. 8 shows a chromopod.

One pod 23 of each color (cyan, magenta, and yellow) are grouped into a chromapod 24. A chromapod 24 represents different color components of the same horizontal set of 10 dots, on different lines. The exact distance between different color pods 23 depends on the Memjet operating parameters, and may vary from one Memjet design to another. The distance is considered to be a constant number of dot-widths, and must therefore be taken into account when printing: the dots printed by the cyan nozzles will be for different lines than those printed by the magenta or yellow nozzles. The printing algorithm must allow for a variable distance up to about 8 dot-widths between colors (see Table 3 for more details). FIG. 8 illustrates a single chromapod 24.

Figure 9:
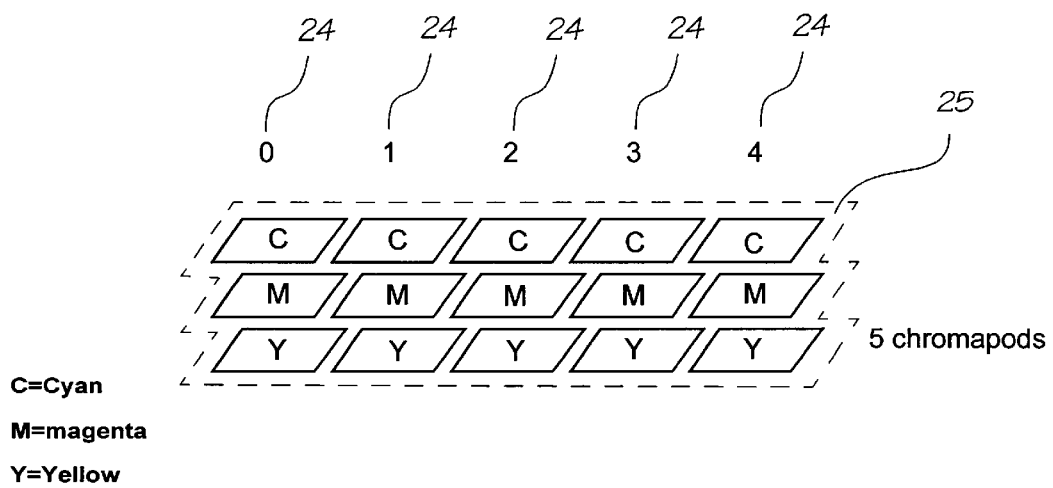
FIG. 9 shows a podgroup.

2.1.1.3 5 Chromapods make a Podgroup 5 chromapods 24 are organized into a single podgroup 25. Since each chromapod contains 30 nozzles 22, each podgroup contains 150 nozzles 22: 50 cyan, 50 magenta, and 50 yellow nozzles. The arrangement is shown in FIG. 9, with chromapods numbered 0–4. Note that the distance between adjacent chromapods is exaggerated for clarity.

2.1.1.4 2 Podgroups make a Phasegroup 2 podgroups 25 are organized into a single phasegroup 26. The phasegroup 26 is so named because groups of nozzles 23 within a phasegroup are fired simultaneously during a given firing phase (this is explained in more detail below). The formation of a phasegroup from 2 podgroups 25 is entirely for the purposes of low-speed and high-speed printing via 2 PodgroupEnable lines.

During low-speed printing, only one of the two PodgroupEnable lines is set in a given firing pulse, so only one podgroup of the two fires nozzles. During high-speed printing, both PodgroupEnable lines are set, so both podgroups fire nozzles. Consequently a low-speed print takes twice as long as a high-speed print, since the high-speed print fires twice as many nozzles at once.

Figure 10:
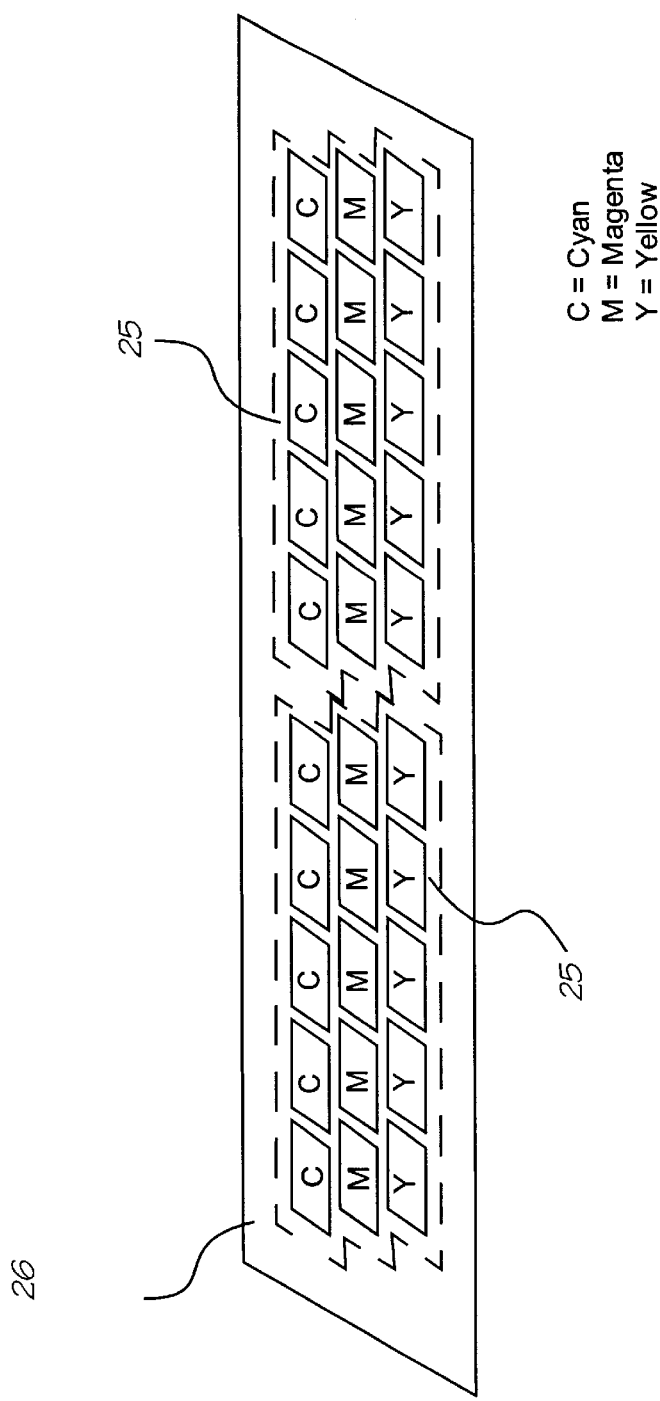
FIG. 10 shows a phasegroup.

FIG. 10 illustrates the composition of a phasegroup. The distance between adjacent podgroups is exaggerated for clarity.

2.1.1.5 2 Phasegroups make a Firegroup

Figure 11:
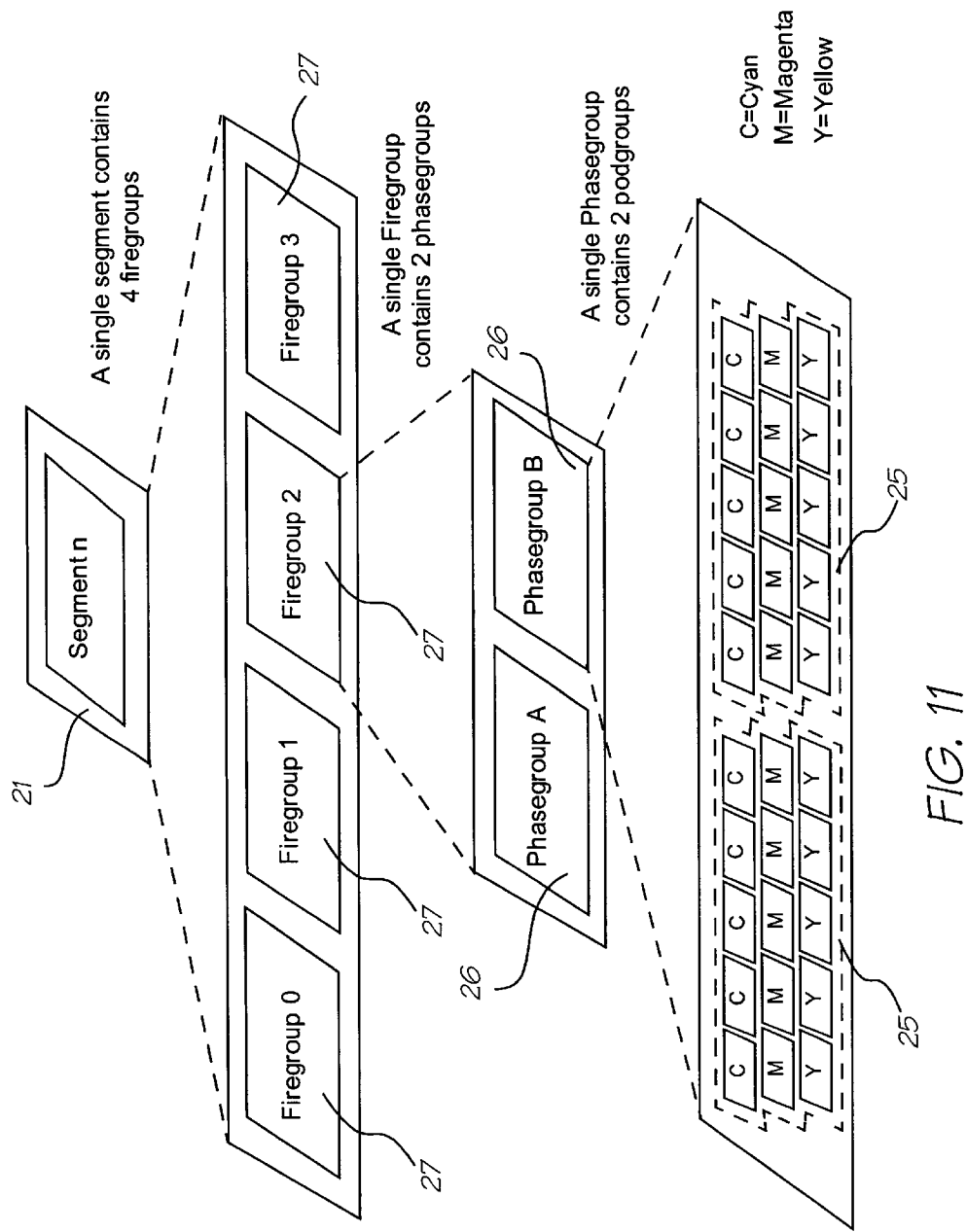
FIG. 11 shows the relationship between segments, firegroups, phasegroups, podgroups and chromopods.

Two phasegroups (PhasegroupA and PhasegroupB) are organized into a single firegroup 27, with 4 firegroups in each segment. Firegroups 27 are so named because they all fire the same nozzles 27 simultaneously. Two enable lines, AEnable and BEnable, allow the firing of PhasegroupA nozzles and PhasegroupB nozzles independently as different firing phases. The arrangement is shown in FIG. 11. The distance between adjacent groupings is exaggerated for clarity.

2.1.1.6 Nozzle Grouping Summary

Table 2 is a summary of the nozzle groupings in a printhead.

TABLE 2

Nozzle Groupings for a single 4-inch printhead

| Name of Grouping | Composition | Replication Ratio | Nozzle Count |
|---|---|---|---|
| Nozzle 22 | Base unit | 1:1 | 1 |
| Pod 23 | Nozzles per pod | 10:1 | 10 |
| Chromapod 24 | Pods per CMY chromapod | 3:1 | 30 |
| Podgroup 25 | Chromapods per podgroup | 5:1 | 150 |
| Phasegroup 26 | Podgroups per phasegroup | 2:1 | 300 |
| Firegroup 27 | Phasegroups per firegroup | 2:1 | 600 |
| Segment 21 | Firegroups per segment | 4:1 | 2,400 |
| 4-inch printhead 2 | Segments per 4-inch printhead | 8:1 | 19,200 |

2.2 Load and Print Cycles

A single 4-inch printhead 2 contains a total of 19,200 nozzles 22. A Print Cycle involves the firing of up to all of these nozzles, dependent on the information to be printed. A Load Cycle involves the loading up of the printhead with the information to be printed during the subsequent Print Cycle.

Each nozzle 22 has an associated NozzleEnable bit that determines whether or not the nozzle will fire during the Print Cycle. The NozzleEnable bits (one per nozzle) are loaded via a set of shift registers.

Logically there are 3 shift registers per segment (one per color), each 800 long. As bits are shifted into the shift register for a given color they are directed to the lower and upper nozzles on alternate pulses. Internally, each 800-deep shift register is comprised of two 400-deep shift registers: one for the upper nozzles, and one for the lower nozzles. Alternate bits are shifted into the alternate internal registers. As far as the external interface is concerned however, there is a single 800 deep shift register.

Once all the shift registers have been fully loaded (800 load pulses), all of the bits are transferred in parallel to the appropriate NozzleEnable bits. This equates to a single parallel transfer of 19,200 bits. Once the transfer has taken place, the Print Cycle can begin. The Print Cycle and the Load Cycle can occur simultaneously as long as the parallel load of all NozzleEnable bits occurs at the end of the Print Cycle.

2.2.1 Load Cycle

The Load Cycle is concerned with loading the printhead's shift registers with the next Print Cycle's NozzleEnable bits.

Each segment 21 has 3 inputs directly related to the cyan, magenta, and yellow shift registers. These inputs are called CDataIn, MDataIn and YDataIn. Since there are 8 segments, there are a total of 24 color input lines per 4-inch printhead. A single pulse on the SRClock line (shared between all 8 segments) transfers the 24 bits into the appropriate shift registers. Alternate pulses transfer bits to the lower and upper nozzles respectively. Since there are 19,200 nozzles, a total of 800 pulses are required for the transfer. Once all 19,200 bits have been transferred, a single pulse on the shared PTransfer line causes the parallel transfer of data from the shift registers to the appropriate NozzleEnable bits.

The parallel transfer via a pulse on PTransfer must take place after the Print Cycle has finished. Otherwise the NozzleEnable bits for the line being printed will be incorrect.

Since all 8 segments 21 are loaded with a single SRClock pulse, any printing process must produce the data in the correct sequence for the printhead. As an example, the first SRClock pulse will transfer the CMY bits for the next Print Cycle's dot 0, 800, 1600, 2400, 3200, 4000, 4800, and 5600. The second SRClock pulse will transfer the CMY bits for the next Print Cycle's dot 1, 801, 1601, 2401, 3201, 4001, 4801 and 5601. After 800 SRClock pulses, the PTransfer pulse can be given.

It is important to note that the odd and even CMY outputs, although printed during the same Print Cycle, do not appear on the same physical output line. The physical separation of odd and even nozzles within the printhead, as well as separation between nozzles of different colors ensures that they will produce dots on different lines of the page. This relative difference must be accounted for when loading the data into the printhead. The actual difference in lines depends on the characteristics of the inkjet mechanism used in the printhead. The differences can be defined by variables $D_1$, and $D_2$ where $D_1$, is the distance between nozzles of different colors, and $D_2$ is the distance between nozzles of the same color. Table 3 shows the dots transferred to segment n of a printhead on the first 4 pulses.

TABLE 3

Order of Dots Transferred to a 4-inch Printhead

| Pulse | Dot | Yellow Line | Magenta Line | Cyan Line |
|---|---|---|---|---|
| 1 | 800 S[a] | N | $N + D_1$[b] | $N + 2D_1$ |
| 2 | 800 S + 1 | $N + D_2$[c] | $N + D_1 + D_2$ | $N + 2D_1 + D_2$ |
| 3 | 800 S + 2 | N | $N + D_1$ | $N + 2D_1$ |
| 4 | 800 S + 3 | $N + D_2$ | $N + D_1 + D_2$ | $N + 2D_1 + D_2$ |

[a] S = segment number (0–7)
[b] $D_1$ = number of lines between the nozzles of one color and the next (likely = 4–8)
[c] $D_2$ = number of lines between two rows of nozzles of the same color (likely = 1)

And so on for all 800 pulses.

Data can be clocked into the printhead at a maximum rate of 20 MHz, which will load the entire data for the next line in 40 µs.

2.2.2 Print Cycle

A 4-inch printhead 2 contains 19,200 nozzles 22. To fire them all at once would consume too much power and be problematic in terms of ink refill and nozzle interference. Consequently two firing modes are defined: a low-speed print mode and a high-speed print mode:

In the low-speed print mode, there are 200 phases, with each phase firing 96 nozzles. This equates to 12 nozzles per segment, or 3 per firegroup.

In the high-speed print mode, there are 100 phases, with each phase firing 192 nozzles. This equates to 24 nozzles per segment, or 6 per firegroup.

The nozzles to be fired in a given firing pulse are determined by 3 bits ChromapodSelect (select 1 of 5 chromapods 24 from a firegroup 27)

4 bits NozzleSelect (select 1 of 10 nozzles 22 from a pod 23)

2 bits of PodgroupEnable lines (select 0, 1, or 2 podgroups 25 to fire)

When one of the PodgroupEnable lines is set, only the specified Podgroup's 4 nozzles will fire as determined by ChromapodSelect and NozzleSelect. When both of the PodgroupEnable lines are set, both of the podgroups will fire their nozzles. For the low-speed mode, two fire pulses are required, with PodgroupEnable=10 and 01 respectively. For the high-speed mode, only one fire pulse is required, with PodgroupEnable=11.

The duration of the firing pulse is given by the AEnable and BEnable lines, which fire the PhasegroupA and PhasegroupB nozzles from all firegroups respectively. The typical duration of a firing pulse is 1.3–1.8 µs. The duration of a pulse depends on the viscosity of the ink (dependent on temperature and ink characteristics) and the amount of power available to the printhead. See Section 2.3 on page 18 for details on feedback from the printhead in order to compensate for temperature change.

The AEnable and BEnable are separate lines in order that the firing pulses can overlap. Thus the 200 phases of a low-speed Print Cycle consist of 100 A phases and 100 B phases, effectively giving 100 sets of Phase A and Phase B. Likewise, the 100 phases of a high-speed print cycle consist of 50 A phases and 50 B phases, effectively giving 50 phases of phase A and phase B.

Figure 12:
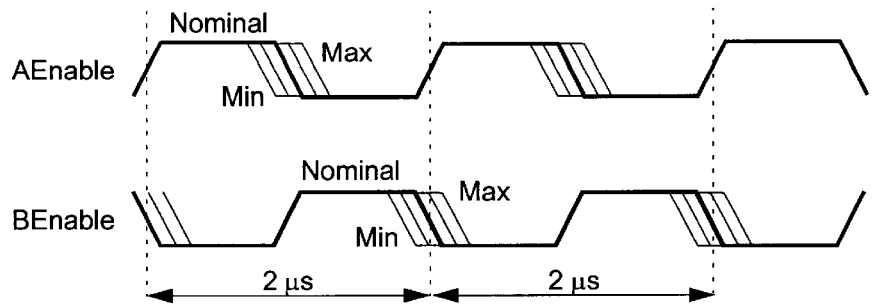
FIG. 12 shows AEnable and BEnable pulse profiles during the printing of an odd and even dot.

FIG. 12 shows the AEnable and BEnable lines during a typical Print Cycle. In a high-speed print there are 50 2 µs cycles, while in a low-speed print there are 100 2 µs cycles.

For the high-speed printing mode, the firing order is:

ChromapodSelect 0, NozzleSelect 0, PodgroupEnable 11 (Phases A and B)
ChromapodSelect 1, NozzleSelect 0, PodgroupEnable 11 (Phases A and B)
ChromapodSelect 2, NozzleSelect 0, PodgroupEnable 11 (Phases A and B)
ChromapodSelect 3, NozzleSelect 0, PodgroupEnable 11 (Phases A and B)
ChromapodSelect 4, NozzleSelect 0, PodgroupEnable 11 (Phases A and B)
ChromapodSelect 0, NozzleSelect 1, PodgroupEnable 11 (Phases A and B)
. . .
ChromapodSelect 3, NozzleSelect 9, PodgroupEnable 11 (Phases A and B)
ChromapodSelect 4, NozzleSelect 9, PodgroupEnable 11 (Phases A and B)

For the low-speed printing mode, the firing order is similar. For each phase of the high speed mode where PodgroupEnable was 11, two phases of PodgroupEnable=01 and 10 are substituted as follows:

ChromapodSelect 0, NozzleSelect 0, PodgroupEnable 01 (Phases A and B)
ChromapodSelect 0, NozzleSelect 0, PodgroupEnable 10 (Phases A and B)
ChromapodSelect 1, NozzleSelect 0, PodgroupEnable 01 (Phases A and B)
ChromapodSelect 1, NozzleSelect 0, PodgroupEnable 10 (Phases A and B)
ChromapodSelect 3, NozzleSelect 9, PodgroupEnable 01 (Phases A and B)
ChromapodSelect 3, NozzleSelect 9, PodgroupEnable 10 (Phases A and B)
ChromapodSelect 4, NozzleSelect 9, PodgroupEnable 01 (Phases A and B)
ChromapodSelect 4, NozzleSelect 9, PodgroupEnable 10 (Phases A and B)

When a nozzle 22 fires, it takes approximately 100 µs to refill. The nozzle 22 cannot be fired before this refill time has elapsed. This limits the fastest printing speed to 100 µs per line. In the high-speed print mode, the time to print a line is 100 µs, so the time between firing a nozzle from one line to the next matches the refill time, making the high-speed print mode acceptable. The low-speed print mode is slower than this, so is also acceptable.

The firing of a nozzle 22 also causes acoustic perturbations for a limited time within the common ink reservoir of that nozzle's pod 23. The perturbations can interfere with the firing of another nozzle within the same pod 23. Consequently, the firing of nozzles within a pod should be offset from each other as long as possible. We therefore fire three nozzles from a chromapod 24 (one nozzle 22 per color) and then move onto the next chromapod 24 within the podgroup 25.

In the low-speed printing mode the podgroups 25 are fired separately. Thus the 5 chromapods 24 within both podgroups must all fire before the first chromapod fires again, totalling 10×2 µs cycles. Consequently each pod 23 is fired once per 20 µs.

In the high-speed printing mode, the podgroups 25 are fired together. Thus the 5 Chromapods 24 within a single podgroup must all fire before the first chromapod fires again, totalling 5×2 µs cycles. Consequently each pod 23 is fired once per 10 µs.

As the ink channel is 300 µm long and the velocity of sound in the ink is around 1500 µs, the resonant frequency of the ink channel is 2.5 MHz, thus the low speed mode allows 50 resonant cycles for the acoustic pulse to dampen, and the high speed mode allows 25 resonant cycles. Thus any acoustic interference is minimal in both cases.

2.2.3 Sample Timing

As an example, consider the timing of printing an 4"×6" photo in 2 seconds, as is required by Printcam. In order to print a photo in 2 seconds, the 4-inch printhead must print 9600 lines (6×1600). Rounding up to 10,000 lines in 2 seconds yields a line time of 200 µs. A single Print Cycle and a single Load Cycle must both finish within this time. In addition, a physical process external to the printhead must move the paper an appropriate amount.

From the printing point of view, the low-speed print mode allows a 4-inch printhead to print an entire line in 200 µs. In the low-speed print mode, 96 nozzles 22 fire per firing pulse, thereby enabling the printing of an entire line within the specified time.

The 800 SRClock pulses to the printhead 2 (each clock pulse transferring 24 bits) must also take place within the 200 µs line time. The length of an SRClock pulse cannot exceed 200 µs/800=250 ns, indicating that the printhead must be clocked at 4 MHz. In addition, the average time to calculate each bit value (for each of the 19,200 nozzles) must not exceed 200 µs/19,200=10 ns. This requires a dot generator running at one of the following speeds:

100 MHz generating 1 bit (dot) per cycle
50 MHz generating 2 bits (dots) per cycle
25 MHz generating 4 bits (dots) per cycle 2.3 Feedback from the Printhead The printhead 2 produces several lines of feedback (accumulated from the 8 segments). The feedback lines are used to adjust the timing of the firing pulses. Although each segment 21 produces the same feedback, the feedback from all segments share the same tri-state bus lines. Consequently only one segment 21 at a time can provide feedback.

A pulse on the SenseSegSelect line ANDed with data on Cyan enables the sense lines for that segment. The feedback sense lines will come from the selected segment until the next SenseSegSelect pulse. The feedback sense lines are as follows:

Tsense informs the controller how hot the printhead is. This allows the controller to adjust timing of firing pulses, since temperature affects the viscosity of the ink.

Vsense informs the controller how much voltage is available to the actuator. This allows the controller to compensate for a flat battery or high voltage source by adjusting the pulse width.

Rsense informs the controller of the resistivity (Ohms per square) of the actuator heater. This allows the controller to adjust the pulse widths to maintain a constant energy irrespective of the heater resistivity.

Wsense informs the controller of the width of the critical part of the heater, which may vary up to ±5% due to lithographic and etching variations. This allows the controller to adjust the pulse width appropriately.

2.4 Special Cycles 2.4.1 Preheat Cycle

The printing process has a strong tendency to stay at the equilibrium temperature. To ensure that the first section of the printed photograph has a consistent dot size, the equilibrium temperature must be met before printing any dots. This is accomplished via a preheat cycle.

The Preheat cycle involves a single Load Cycle to all nozzles with 1s (i.e. setting all nozzles to fire), and a number of short firing pulses to each nozzle. The duration of the pulse must be insufficient to fire the drops, but enough to heat up the ink. Altogether about 200 pulses for each nozzle are required, cycling through in the same sequence as a standard Print Cycle.

Feedback during the Preheat mode is provided by Tsense, and continues until equilibrium temperature is reached (about 30° C. above ambient). The duration of the Preheat mode is around 50 milliseconds, and depends on the ink composition.

Preheat is performed before each print job. This does not affect printer performance, as it is done while the page data is transferred to the printer.

2.4.2 Cleaning Cycle

In order to reduce the chances of nozzles becoming clogged, a cleaning cycle can be undertaken before each print job. Each nozzle is be fired a number of times into an absorbent sponge.

The cleaning cycle involves a single Load Cycle to all nozzles with 1s (i.e. setting all nozzles to fire), and a number of firing pulses to each nozzle. The nozzles are cleaned via the same nozzle firing sequence as a standard Print Cycle. The number of times that each nozzle 22 is fired depends upon the ink composition and the time that the printer has been idle, as with preheat, the cleaning cycle has no effect on printer performance.

2.5 Printhead Interface Summary

A single 4-inch printhead 2 has the following connections:

TABLE 4

Four-Inch Printhead Connections

| Name | # Pins | Description |
|---|---|---|
| ChromapodSelect | 3 | Select which chromapod will fire (0–4) |
| NozzleSelect | 4 | Select which nozzle from the pod will fire (0–9) |
| PodgroupEnable | 2 | Enable the podgroups to fire (choice of: 01, 10, 11) |
| AEnable | 1 | Firing pulse for phasegroup A |
| BEnable | 1 | Firing pulse for phasegroup B |
| CDataIn[0–7] | 8 | Cyan input to cyan shift register of segments 0–7 |
| MDataIn[0–7] | 8 | Magenta input to magenta shift register of segments 0–7 |
| YDataIn[0–7] | 8 | Yellow input to yellow shift register of segments 0–7 |
| SRClock | 1 | A pulse on SRClock (ShiftRegisterClock) loads the current values from CDataIn[0–7], MDataIn[0–7] and YDataIn[0–7] into the 24 shift registers. |
| PTransfer | 1 | Parallel transfer of data from the shift registers to the internal NozzleEnable bits (one per nozzle). |
| SenseSegSelect | 1 | A pulse on SenseSegSelect ANDed with data on CDataIn[n] selects the sense lines for segment n. |
| Tsense | 1 | Temperature sense |
| Vsense | 1 | Voltage sense |
| Rsense | 1 | Resistivity sense |
| Wsense | 1 | Width sense |
| Logic GND | 1 | Logic ground |
| Logic PWR | 1 | Logic power |
| V− | Bus bars | Actuator Ground |
| V+ | Bus bars | Actuator Power |
| TOTAL | 44 | |

Internal to the 4-inch printhead, each segment has the following connections to the bond pads:

TABLE 5

Four-Inch Printhead Internal Segment Connections

| Name | # Pins | Description |
|---|---|---|
| ChromapodSelect | 3 | Select which chromapod will fire (0–4) |
| NozzleSelect | 4 | Select which nozzle from the pod will fire (0–9) |
| PodgroupEnable | 2 | Enable the podgroups to fire (choice of: 01, 10, 11) |
| AEnable | 1 | Firing pulse for phasegroup A |
| BEnable | 1 | Firing pulse for phasegroup B |
| CDataIn | 1 | Cyan input to cyan shift register |
| MDataIn | 1 | Magenta input to magenta shift register |
| YDataIn | 1 | Yellow input to yellow shift register |
| SRClock | 1 | A pulse on SRClock (ShiftRegisterClock) loads the current values from CDataIn, MDataIn and YDataIn into the 3 shift registers. |
| PTransfer | 1 | Parallel transfer of data from the shift registers to the internal NozzleEnable bits (one per nozzle). |
| SenseSegSelect | 1 | A pulse on SenseSegSelect ANDed with data on CDataIn selects the sense lines for this segment. |
| Tsense | 1 | Temperature sense |
| Vsense | 1 | Voltage sense |
| Rsense | 1 | Resistivity sense |
| Wsense | 1 | Width sense |
| Logic GND | 1 | Logic ground |
| Logic PWR | 1 | Logic power |
| V− | 21 | Actuator Ground |
| V+ | 21 | Actuator Power |
| TOTAL | 65 | (65 × 8 segments = 520 for all segments) |

3 Image Processing Chains

The previous sections have dealt only with the highest level overview of the PCP functionality—that of mapping CFA images to a variety of output print formats. In fact, there are a number of steps involved in taking an image from the image sensor, and producing a high quality output print. We can break the high level process into two image processing chains, each with a number of steps:

Image Capture Chain

Print Chain

The Image Capture Chain is concerned with capturing the image from the Image Sensor and storing it locally within the Printcam. The Print Chain is concerned with taking the stored image and printing it. These two chains map onto the basic Printcam functionality as follows:

Take&Print=Image Capture Chain followed by Print Chain

Reprint=Print Chain

For example, a user may print a thumbnail image (Take&Print), and if happy with the results, print several standard copies (Reprint).

This chapter describes an implementation independent image processing chain that meets the quality requirements of Printcam. At this stage, we are not considering exactly how the processing is performed in terms of hardware, but rather what must be done. These functions must be mapped onto the various units within the PCP.

Regardless of the PCP implementation, there are a number of constraints:

The input image is a CFA based contone RGB image.

The output image is for a Memjet printhead (bi-level dots at 1600 dpi) in CMY color space, and is always the same output width (4 inches wide).

3.0.1 Supported Print Formats

The PCP 3 supports a variety of output print formats, as shown in Table 6. In all cases, the width of the image is 4 inches (matching the printhead width). Only the length of the print out varies.

TABLE 6

Supported Image Formats

| Format Name | Aspect Ratio | Output Size (inches) | Output resolution (at 1600 dpi) | Rotation |
|---|---|---|---|---|
| Standard 30 | 2:3 | 4" × 6" | 6400 × 9600 | 90 |
| Passport 31 | 2:3 | 4" × 6" | 6400 × 9600 | 90 |
| Panoramic 33 | 4:6 | 4" × 12" | 6400 × 19200 | 90 |
| Thumbnail 32 | 2:3 | 4" × 2.67" | 6400 × 4267 | 0 |

Figure 13:
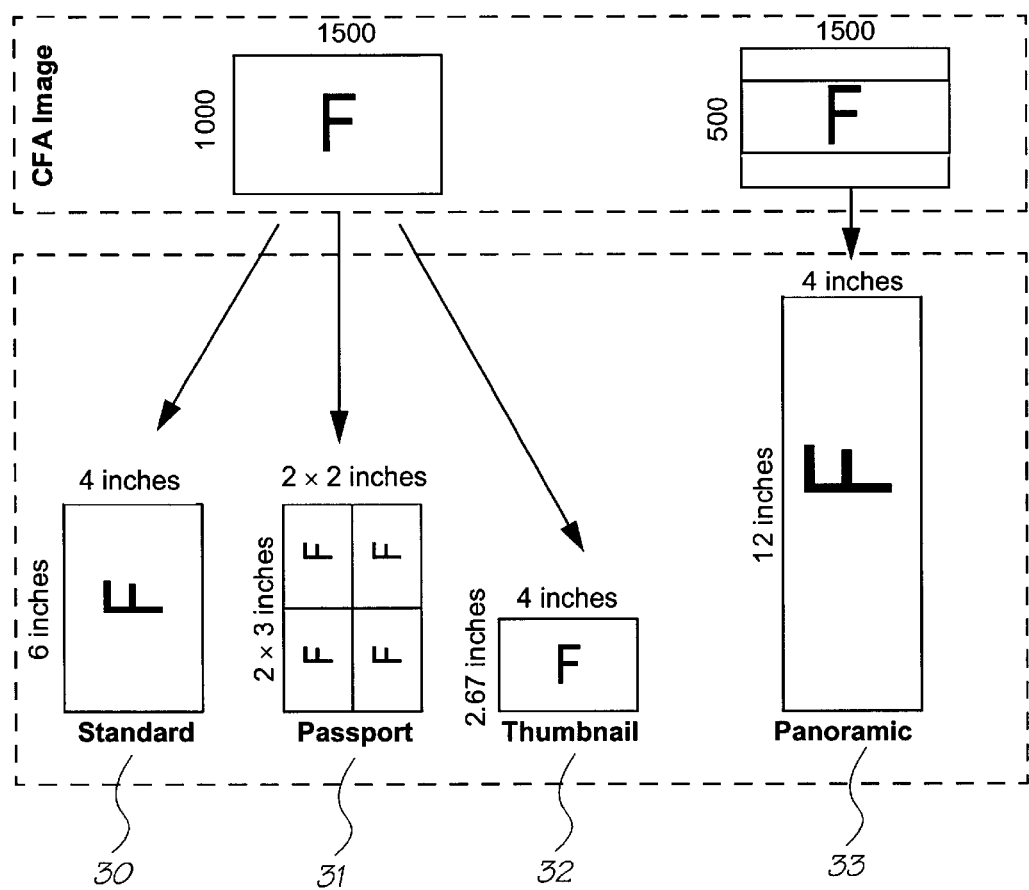
FIG. 13 shows the orientation of print formats based on the CFA image.

The image sensor does not provide orientation information. All input images are captured at the same resolution (1500×1000), and may need to be rotated 90 degrees before printout. FIG. 13 illustrates the mapping between the captured CFA image and the various supported print formats. Note that although the image is shown rotated 90 degrees anti-clockwise, the image can be rotated clockwise or anti-clockwise.

3.1 Image Capture Chain

Figures 14, 15:
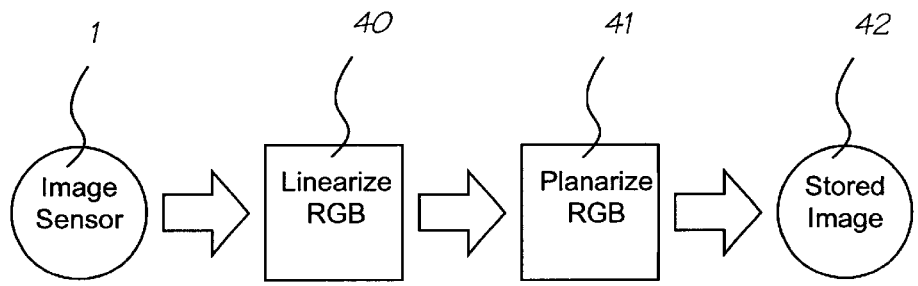
FIG. 14 shows a block diagram of the image capture chain.
FIG. 15 shows the arrangement of pixels in a Bayer CFA 2G mosaic.

The Image Capture Chain is responsible for taking an image from the Image Sensor and storing it locally within the Printcam. The Image Capture Chain involves a number of processes that only need to be performed during image capture. The Image Capture Chain is illustrated in FIG. 14, with subsequent sections detailing the sub-components.

3.1.1 Image Sensor 1

The input image comes from an image sensor 1. Although a variety of image sensors are available, we only consider the Bayer color filter array (CFA). The Bayer CFA has a number of attributes which are defined here.

The image captured by the CMOS sensor 1 (via a taking lens) is assumed to have been sufficiently filtered so as to remove any aliasing artifacts. The sensor itself has an aspect ratio of 3:2, with a resolution of 1500×1000 samples. The most likely pixel arrangement is the Bayer color filter array (CFA), with each 2×2 pixel block arranged in a 2G mosaic as shown in FIG. 15:

Each contone sample of R, G, or B (corresponding to red, green, and blue respectively) is 10-bits. Note that each pixel of the mosaic contains information about only one of R, G, or B. Estimates of the missing color information must be made before the image can be printed out.

The CFA is considered to perform adequate fixed pattern noise (FPN) suppression.

3.1.2 Linearize RGB 40

The image sensor 40 is unlikely to have a completely linear response. Therefore the 10-bit RGB samples from the CFA must be considered to be non-linear. These non-linear samples are translated into 8-bit linear samples by means of lookup tables (one table per color).

Figure 16:
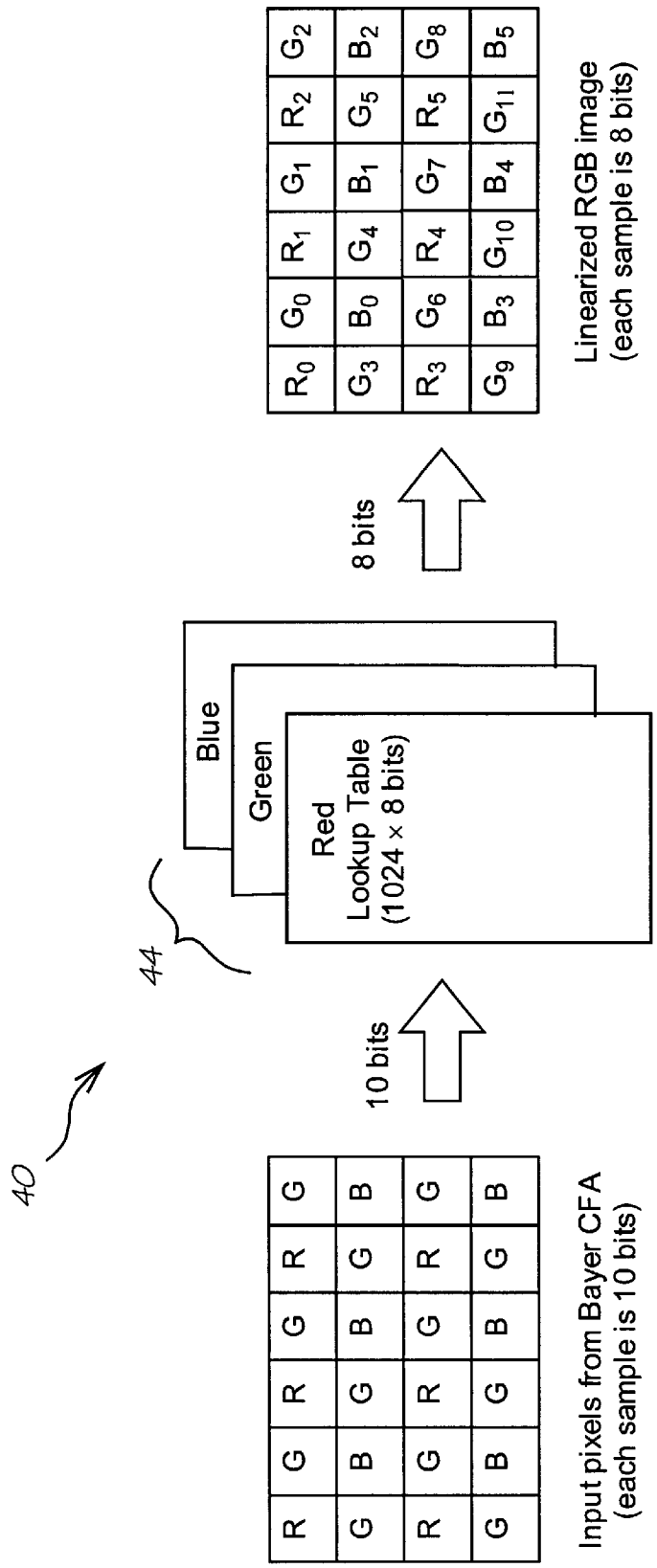
FIG. 16 shows the linearize RGB process.

Pixels from the CFA lines 0, 2, 4 etc. index into the R and G tables, while pixels from the CFA lines 1, 3, 5 etc. index into the G and B tables. This is completely independent of the orientation of the camera. The process is shown in FIG. 16. The total amount of memory required for each lookup table is $2^{10} \times 8$-bits. The 3 lookup tables 45 therefore require a total of 3 KBytes ($3 \times 2^{10}$ bytes).

3.1.3 Planarize RGB 41

The pixels obtained from the CFA have their color planes interleaved due to the nature of the Bayer mosaic of pixels. By this we mean that on even horizontal lines, one red pixel is followed by a green pixel and then by another red pixel—the different color planes are interleaved with each other. In some image processing systems, an interleaved format is highly useful. However in the Printcam processing system, the algorithms are more efficient if working on planar RGB.

Figure 17:
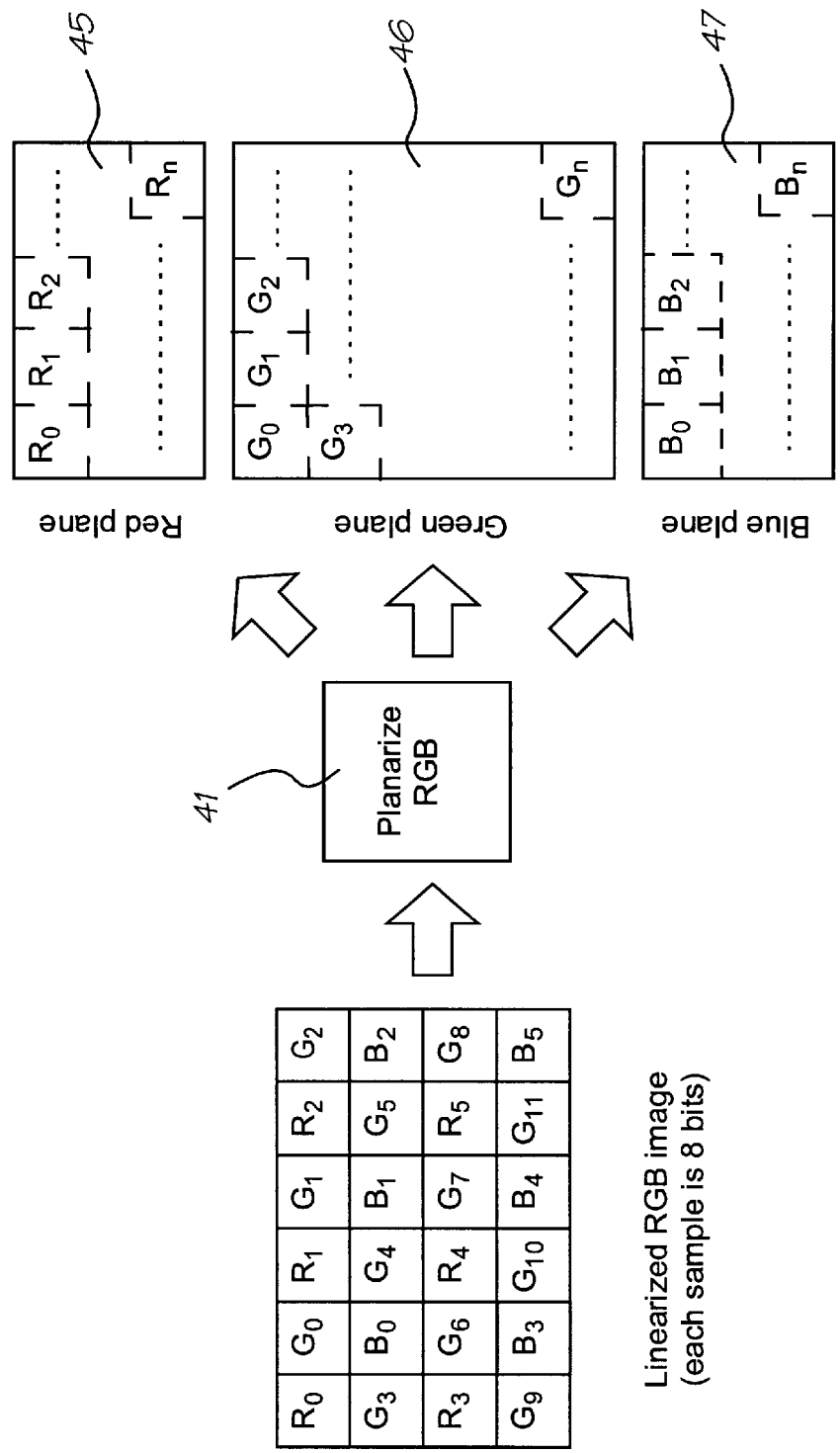
FIG. 17 shows the planarize RGB process.

A planarized image is one that has been separated into its component colors. In the case of the CFA RGB image, there are 3 separate images: one image containing only the red pixels, one image containing only the blue pixels, and one image containing only the green pixels. Note that each plane only represents the pixels of that color which were actually sampled. No resampling is performed during the planarizing process. As a result, the R, G and B planes are not registered with each other, and the G plane is twice as large as either the R or B planes. The process is shown in FIG. 17.

The actual process is quite simple—depending on the color of the pixels read in, the output pixels are sent to the next position in the appropriate color plane's image (therefore in the same orientation as the CFA).

The red 45 and blue 47 planar images are exactly one quarter of the size of the original CFA image. They are exactly half the resolution in each dimension. The red and blue images are therefore 750×500 pixels each, with the red image implicitly offset from the blue image by one pixel in CFA space (1500×1000) in both the x and y dimensions.

Although the green planar image 46 is half of the size of the original CFA image, it is not set out as straightforwardly as the red or blue planes. The reason is due to the checkerboard layout of green. On one line the green is every odd pixel, and on the next line the green is every even pixel. Thus alternate lines of the green plane represent odd and even pixels within the CFA image. Thus the green planar image is 750×1000 pixels. This has ramifications for the resampling process (see "Resample 64" on page 28 below).

3.1.4 Stored Image 42

Each color plane of the linearized RGB image is written to memory for temporary storage. The memory should be Flash 11 so that the image is retained after the power has been shut off.

The total amount of memory required for the planarized linear RGB image is 1,500,000 bytes (approximately 1.5 MB) arranged as follows:

R: 750×500=375,000 bytes

B: 750×500=375,000 bytes

G: 750×1000=750,000 bytes

3.2 Print Chain

The Print Chain is concerned with taking an existing image from memory 42 and printing it to a Memjet printer 2. An image is typically printed as soon as it has been captured, although it can also be reprinted (i.e. without recapture).

Figure 18:
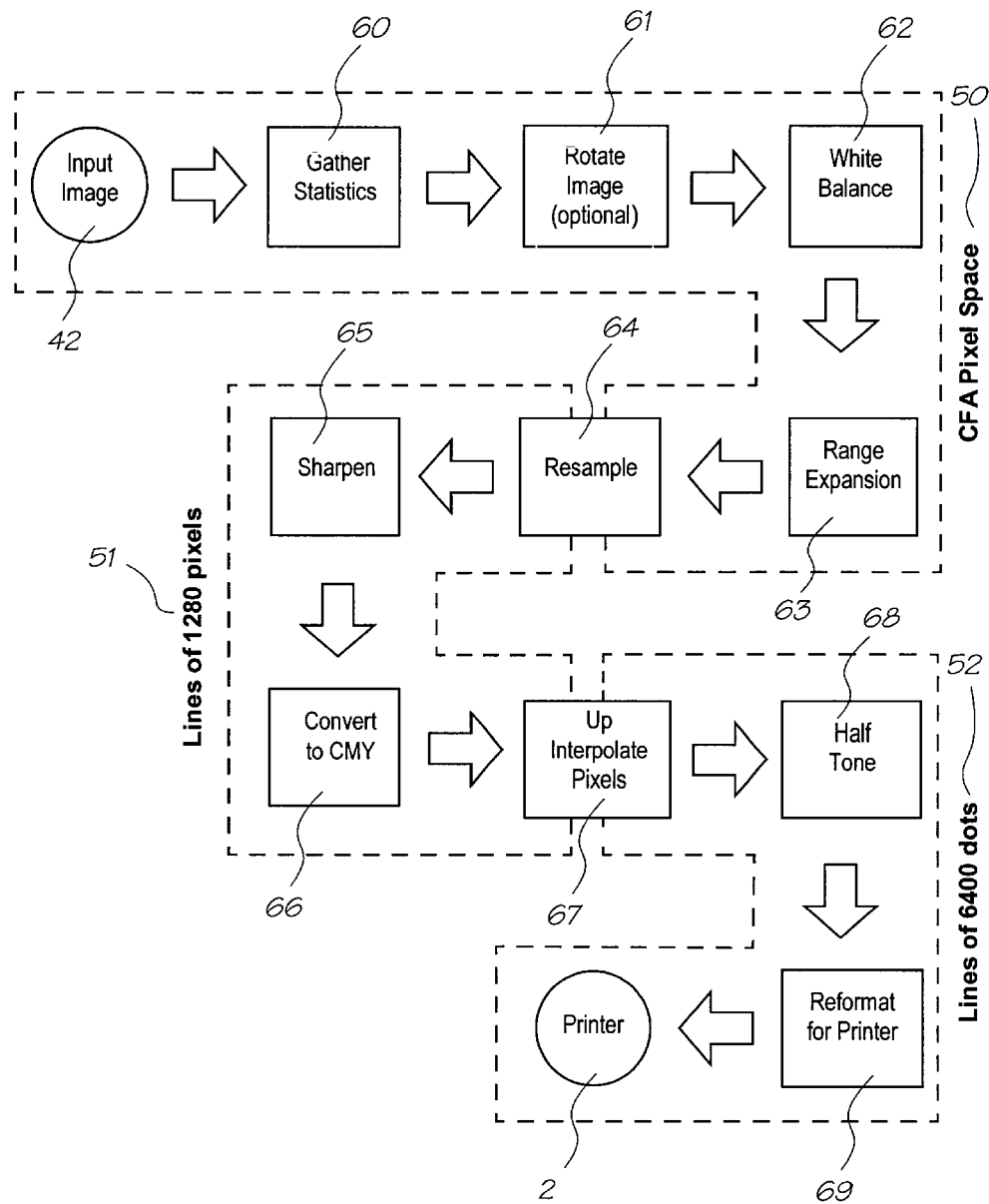
FIG. 18 shows a block diagram of the image print chain.

There are a number of steps required in the image processing chain in order to produce high quality prints from CFA captured images. FIG. 18 illustrates the Print Chain. The chain is divided into 3 working resolutions. The first is the original image capture space 50 (the same space as the CFA), the second is an intermediate resolution 51 (lines of 1280 continuous tone pixels), and the final resolution is the printer resolution 52, with lines of 6400 bi-level dots.

3.2.1 Input Image

The input image is a linearized RGB image 42 stored in planar form, as stored by the Image Capture Chain described in Section 3.1.4.

3.2.2 Gather Statistics 60

A number of statistics regarding the entire image need to be gathered before processes like white balance and range expansion can be performed. These statistics only need to be gathered once for all prints of a particular captured image 42, and can be gathered separately from the red, green, and blue planar images.

3.2.2.1 Build Histogram

The first step is to build a histogram for each 8-bit value of the color plane. Each 1500×1000 CFA image contains a total of:

375,000 red pixels (min 19-bit counter required)

375,000 blue pixels (min 19-bit counter required)

750,000 green pixels (min 20-bit counter required)

Therefore a single 256×20 bit table is required to hold the histogram.

The process of building the histogram is straightforward, as illustrated by the following pseudocode:

```
For I=0 to 255
  Entry[I]=0
EndFor
For Pixel=ImageStart to ImageEnd
  p=Image[Pixel]
  Entry[p]=Entry[p]+1
EndFor
```

3.2.2.2 Determine High and Low Thresholds

Once the histogram has been constructed for the color plane, it can be used to determine a high and low threshold. These thresholds can be used for automating later white balance and range expansion during the print process.

Basing the thresholds on the number of pixels from the histogram, we consider the n % darkest pixels to be expendable and therefore equal. In the same way, we consider the n % lightest pixels to be expendable and therefore equal. The exact value for n is expected to be about 5%, but will depend on the CFA response characteristics.

The process of determining the n % darkest values is straightforward. It involves stepping through the color plane's histogram from the count for 0 upwards (i.e. 0, 1, 2, 3 etc.) until the n % total is reached or we have travelled further than a set amount from 0. The highest of these values is considered the low threshold of the color plane. Although there is a difference between these darkest values, the difference can be considered expendable for the purposes of range expansion and color balancing.

The process of determining the n % lightest values is similar. It involves stepping through the color plane's histogram from the count for 255 downwards (i.e. 255, 254, 253 etc.) until the n % total is reached or until we have travelled further than a set amount from 255. The lowest of these values is considered the high threshold of the color plane. Although there is a difference between these lightest values, the difference can be considered expendable for the purposes of range expansion and color balancing.

The reason for stopping after a set distance from 0 or 255 is to compensate for two types of images:

where the original dynamic range is low, or where there is no white or black in an image In these two cases, we don't want to consider the entire n % of upper and lower values to be expendable since we have a low range to begin with. We can safely set the high 73 and low 72 thresholds to be outside the range of pixel values actually sampled. The exact distance will depend on the CFA, but will be two constants.

Figure 19:
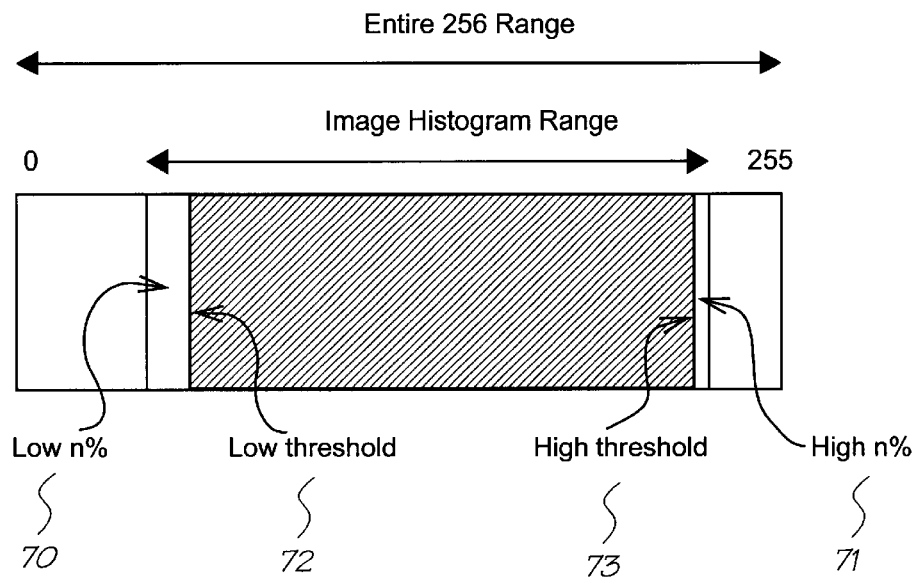
FIG. 19 shows a sample color range for a single color plane.

A sample color range for a color plane is shown in FIG. 19. Note that although the entire 0–255 range is possible for an image color plane's pixels, this particular image has a smaller range. Note also that the same n % histogram range 70, 71 is represented by a larger range in the low end 70 than in the high end 71. This is because the histogram must contain more pixels with high values closer together compared to the low end.

The high 73 and low 72 thresholds must be determined for each color plane individually. This information will be used to calculate range scale and offset factors to be used in the later white balance and range expansion process.

The following pseudocode illustrates the process of determining either of the two thresholds (to find the low threshold, StartPosition=255, and Delta=1. To find the high threshold, StartPosition=0 and Delta=−1). The pseudocode assumes that Threshold is an 8-bit value that wraps during addition.

```
Threshold=StartPosition
Total=0
TotalDelta=0
While ((TotalDelta<MaxDelta) AND (Total<MaxPixels))
  Threshold=Threshold+Delta
  Total=Total+Entry[Threshold]
  TotalDelta=TotalDelta+1
EndWhile
Return Threshold
```

3.2.3 Rotate Image 61

Rotation of the image 61 is an optional step on both the Capture and Print and Reprint processes.

Different print formats require the image to be rotated either 0 or 90 degrees relative to the CFA orientation, as shown in FIG. 13. The rotation amount depends on the currently selected print format. Although the direction of rotation is unimportant (it can be clockwise or counterclockwise since the new orientation is only facilitating the printhead width), the rotation direction will affect the relative registration of the 3 color planes. Table 7 summarizes the rotation required for each print format from the original CFA orientation.

TABLE 7

Rotations from CFA orientation for Print Formats

| Print Format | Rotation |
|---|---|
| Standard 30 | 90 |
| Passport 31 | 90 |
| Panoramic 33 | 90 |
| Thumbnail 32 | 0 |

Since we are rotating only by 0 or 90 degrees, no information is lost during the rotation process. For a rotation of 0, the image can be read row by row, and for a rotation of 90, the image can be read column by column. Registration of the 3 color planes must take the rotation direction into account.

3.2.4 White Balance 62 and Range Expansion 63

A photograph is seldom taken in ideal lighting conditions. Even the very notion of "perfect lighting conditions" is fraught with subjectivity, both in terms of photographer and subject matter. However, in all cases, the subject matter of a photograph is illuminated by light either from a light source (such as the sun or indoor lighting), or its own light (such as a neon sign).

In most lighting conditions, what may appear to the photographer as "white" light, is usually far from white. Indoor lighting for example, typically has a yellow cast, and this yellow cast will appear on an uncorrected photograph. To most people, the yellow cast on the final uncorrected photograph is wrong. Although it may match the viewing conditions at the time the photograph was taken, it does not match the perceived color of the object. It is therefore crucial to perform white balance on a photograph before printing it out.

In the same way, an image can be perceived to be of higher quality when the dynamic range of the colors is expanded to match the full range in each color plane. This is particularly useful to do before an image is resampled to a higher resolution. If the dynamic range is higher, intermediate values can be used in interpolated pixel positions, avoiding a stepped or blocky image. Range expansion is designed to give the full 256 value range to those values actually sampled. In the best case, the lowest value is mapped to 0, and the highest value is mapped to 255. All the intermediate values are mapped to proportionally intermediate values between 0 and 255.

Mathematically, the operation performed is a translation of LowThreshold 72 to 0 followed by a scale. The formula is shown here:

$$Pixel' = (Pixel - LowThreshold) \times RangeScaleFactor \text{ where}$$

$$RangeScaleFactor = \frac{256}{(HighThreshold - LowThreshold)}$$

RangeScaleFactor should be limited to a maximum value to reduce the risk of expanding the range too far. For details on calculating LowThreshold, 72 see Section 3.2.2 "Gather Statistics". These values (LowThreshold and RangeScaleFactor) will be different for each color plane, and only need to be calculated once per image.

Figure 20:
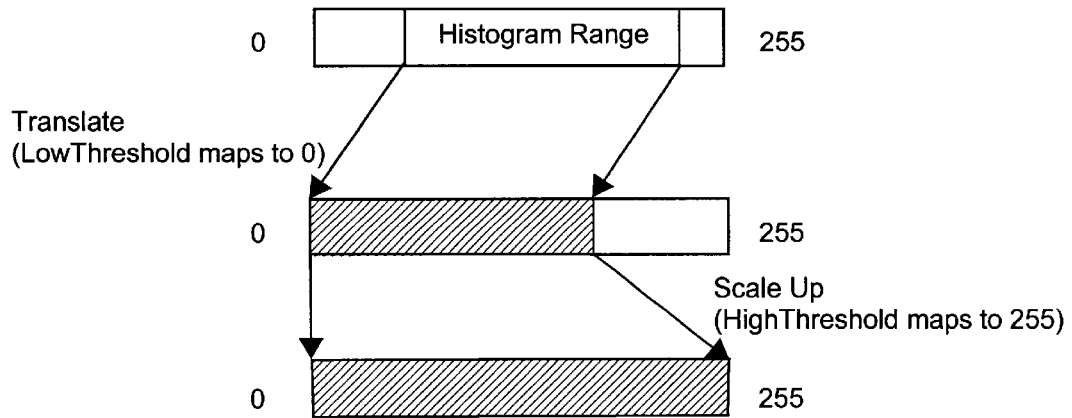
FIG. 20 shows the steps involved in white balance and range expansion.
Figure 21:
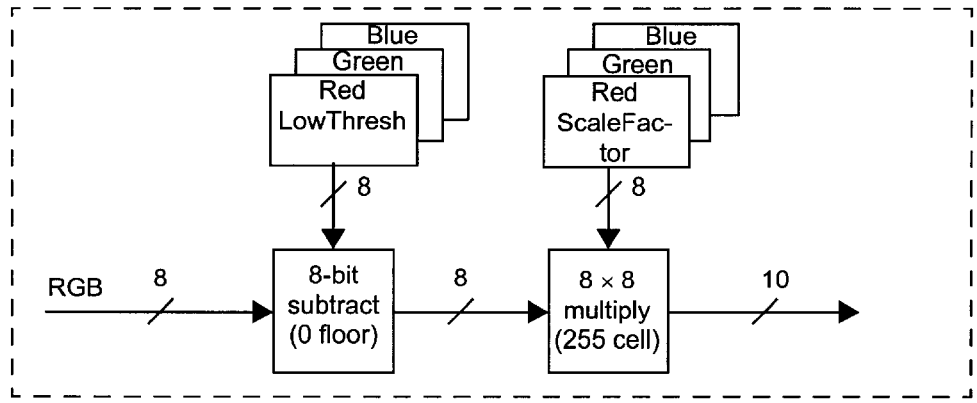
FIG. 21 shows a block diagram of apparatus capable of performing white balance and range expansion.

Both tasks can be undertaken simultaneously, as shown in FIG. 20:

Since this step involves a scaling process, we can be left with some fractional component in the mapped value e.g. the value 12 may map to 5.25. Rather than discard the fractional component, we pass a 10 bit result (8 bits of integer, 2 of fraction) on to the next stage of the image processing chain. We cannot afford the memory to store the entire image at more than 8-bits, but we can make good use of the higher resolution in the resampling stage. Consequently the input image is 8-bits, and the output image has 10-bits per color component. The logical process is shown in FIG. 21.

It is important to have a floor of 0 during the subtraction so that all values below LowThreshold 72 to be mapped to 0. Likewise, the multiplication must have a ceiling of 255 for the integer portion of the result so that input values higher than HighThreshold 73 will be mapped to 255.

3.2.5 Resample 64

The CFA only provides a single color component per pixel (x,y) coordinate. To produce the final printed image we need to have the other color component values at each pixel. Ultimately we need cyan, magenta, and yellow color components at each pixel, but to arrive at cyan, magenta, and yellow we need red, green and blue. With our one-color-per-pixel, we may have the red component for a particular position, but we need to estimate blue and green. Or we may have green, and need to estimate red and blue.

Even if we did have the full red, green, and blue color components for each CFA resolution pixel, the CFA resolution image is not the final output resolution. In addition, although the output format varies, the physical width of the printed image is constant (4 inches at 1600 dpi). The constant width of the printhead is therefore 6400 dots.

There are two extreme cases to consider:

Interpolate to CFA resolution (minimal interpolation), and then perform sharpening, color conversion. Finally scale up to the print resolution. This has the advantage of a constant sharpening kernel and color conversion at the low resolution. However it has the disadvantage of requiring more than 8-bits per color component to be stored for the interpolated image or intermediate values will be incorrectly interpolated during the final scale-up to print resolution. It also has the disadvantage of requiring a scale-up unit that is capable of producing 1 print-res interpolated value per cycle.

Interpolate to the print resolution, then perform sharpening and color conversion. This has the advantage of only one resampling process, providing maximum accuracy. However it has the disadvantage of requiring a scale-up unit that is capable of producing 1 bi-cubic interpolated value per cycle as well as performing sharpening and color conversion, all on an average of a single cycle. The sharpening kernel must be large enough to apply the CFA-res kernel to the high-res image. Worse still, for sharpening, there must be at least 3 windows kept onto the output image (each containing a number of 6400 entry lines) since on a single print cycle, the cyan, magenta, and yellow dots represent dots from 6 different lines.

Neither of these cases take into account the fact that the final print output is bilevel rather than contone. Consequently we can strike a middle ground with regards to resampling, and achieve the best from both methods.

The solution is to interpolate to an intermediate resolution. Sharpening and color conversion occur at the intermediate resolution, followed by a scale-up to print resolution.

The intermediate resolution must be low enough to allow the advantages of small sharpening kernel size and color conversion timing. But the intermediate resolution must be high enough so that there is no loss of quality scaling up to the print resolution bi-level image. The effect must be the same as if there was a single interpolation to the print resolution (rather than two).

Since the print image is printed as 1600 dpi dithered bi-level dots, it can be safely represented by a 320 dpi contone image. Consequently an intermediate resolution of 1280 contone pixels provides no perceived loss of quality over 6400 bi-level dots. The later scaling from 1280 to 6400 is therefore an exact scaling ratio of 1:5.

Figure 22:
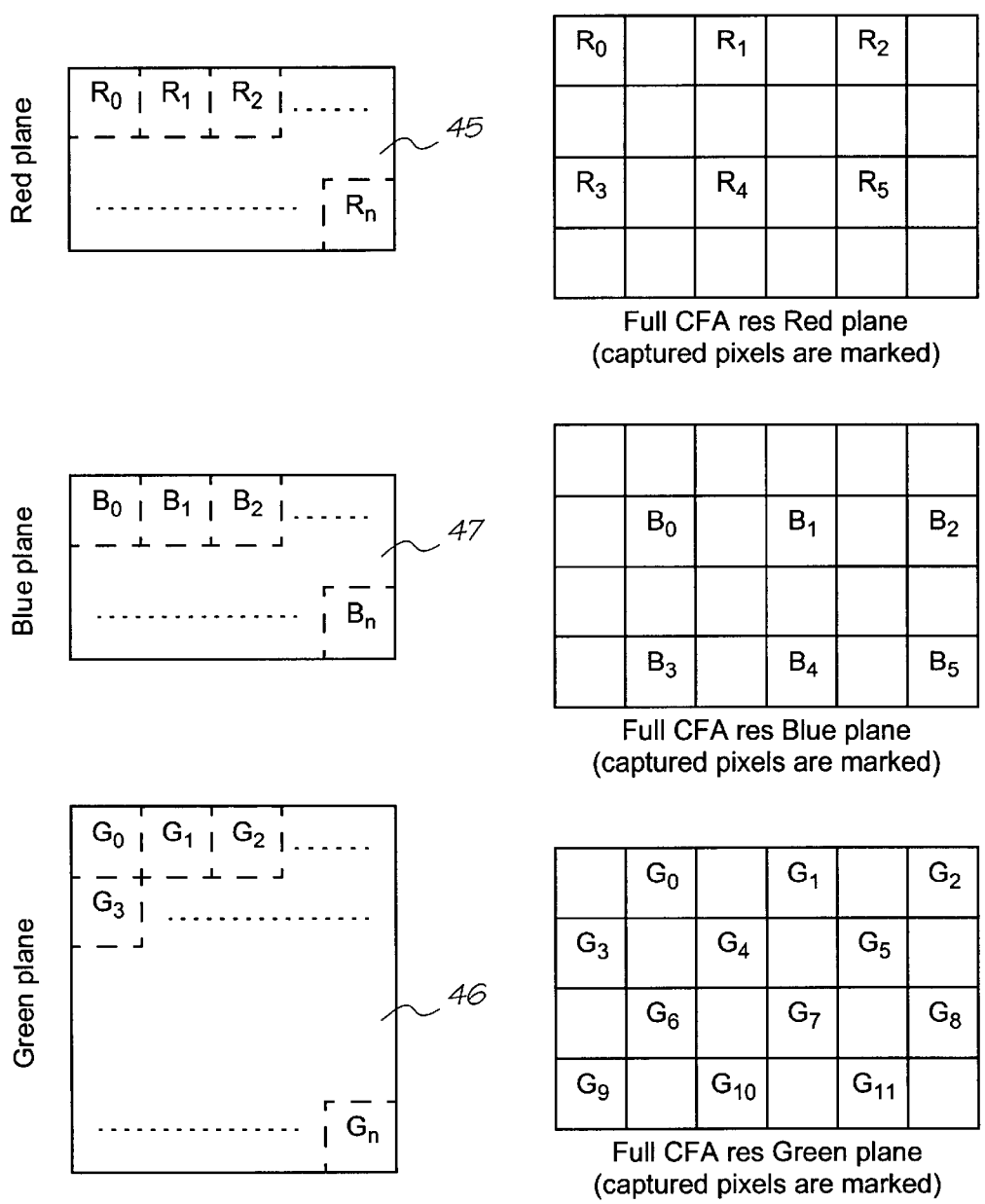
FIG. 22 shows the various color plane pixels in relation to CFA resolution.

To decide how best to resample, it is best to consider each color plane in relation to the CFA resolution. This is shown in FIG. 22 for a rotation of 0.

3.2.5.1 Red 45 and Blue 47

Looking at the red 45 and blue 47 planes, the full CFA resolution version of the color plane can be created by scaling up the number of sampled pixels in each dimension by 2. The intermediate pixels can be generated by means of a reconstruction filter (such as a Lanczos or Exponential filter). Only one dimension in the kernel is required, since the kernel is symmetric. Since red and blue have different offsets in terms of their initial representation within the CFA sample space, the initial positions in the kernel will be different.

The mapping of output coordinates (in 1280 space) to input coordinates depends on the current rotation of the image, since the registration of pixels changes with rotation (either 0 or 90 degrees depending on print format). For red and blue then, the following relationship holds:

$$\left.\begin{array}{l} x' = \left(\frac{x}{mps}\right) + k_1 \\ y' = \left(\frac{y}{mps}\right) + k_2 \end{array}\right\}$$

where x,y=coordinate in medium res space x'y'=coordinate in input space mps=medium res pixels per input space sample $k_{1,2}=\{0, -0.5\}$ depending on rotation This means that given a starting position in input space, we can generate a new line of medium resolution pixels by adding a $\Delta x$ and $\Delta y$ of 1/mps and 0 respectively 1279 times. The fractional part of x and y in input space can be directly used for looking up the kernel coefficients for image reconstruction and resampling.

Note that $k_1$ and $k_2$ are 0 and −0.5 depending on whether the image has been rotated by 0 or 90 degrees. Table 8 shows the values for $k_1$ and k2 in the red and blue planes, assuming that the rotation of 90 degrees is anti-clockwise.

TABLE 8

Effect of Rotation on k1 and k2 (rotation is anti-clockwise)

| Format | Rotation From Original CFA | Red $k_1$ | Red $k_2$ | Blue $k_1$ | Blue $k_2$ |
|---|---|---|---|---|---|
| Standard 30 | 90 | 0 | −0.5 | −0.5 | 0 |
| Passport 31 | 90 | 0 | −0.5 | −0.5 | 0 |
| Panoramic 33 | 90 | 0 | −0.5 | −0.5 | 0 |
| Thumbnail 32 | 0 | 0 | 0 | −0.5 | −0.5 |

The number of medium res pixels per sample, mps, depends on the print format. Given that the planarized RGB image has the following red and blue planar resolutions when unrotated: R: 750×500, B: 750×500, the scale factors for the different output formats (see FIG. 13 on page 17) are shown in Table 9. Note that with the Passport image format, the entire image is resampled into ¼ of the output space.

TABLE 9

Red and Blue Scale Factors for Image Formats

| Format | Mapping | mps | 1/mps |
|---|---|---|---|
| Standard 30 | 500 ⇒ 1280 | 2.56 | 0.390625 |
| Passport 31 | 500 ⇒ 640 | 1.28 | 0.78125 |
| Panoramic 33 | 250 ⇒ 1280 | 5.12 | 0.1953125 |
| Thumbnail 32 | 750 ⇒ 1280 | 1.71 | 0.5848 |

As can be seen in Table 9, the red and blue images are scaled up for all image formats. Consequently there will not be any aliasing artifacts introduced by the resampling process.

3.2.5.2 Green 46

The green plane 46 cannot be simply scaled up in the same way as red or blue, since each line of the green plane represents different pixels—either the odd or even pixels on alternate lines. Although in terms of the number of pixels it is representative to say the green image is 750×1000, the image could equally be said to be 1500×500. This confusion arises because of the checkerboard nature of the green pixels, where the distance between pixels is not equal in x and y dimensions, and does not map well to image reconstruction or resampling. The number of interpolation methods used by other systems for green plane reconstruction is testimony to this—from nearest neighbor replication to linear interpolation to bi-linear interpolation and heuristic reconstruction.

The mapping of output coordinates (in 1280 space) to input coordinates is conceptually the same for green as it is for red and blue. The mapping depends on the current rotation of the image, since the registration of pixels changes with rotation (either 0 or 90 degrees depending on print format). For the green plane the following relationship holds:

$$\left.\begin{array}{l} x' = \left(\frac{x}{mps}\right) + k_1 \\ y' = \left(\frac{y}{mps}\right) + k_2 \end{array}\right\}$$

where x,y=coordinate in medium res space x'y'=coordinate in input space mps=medium res pixels per input space sample $k_{1,2}=\{0, -0.5\}$ depending on rotation As with the red 45 and blue 47 planes, the number of medium res pixels per sample, mps, depends on the print format. Given that the planarized RGB image has the following planar resolutions when unrotated: R: 750×500, B: 750×500, G: 750×1000, the scale factors for the different output formats (see FIG. 13) are shown in Table 10. Note that with the Passport image format, the entire image is resampled into ¼ of the output space.

TABLE 10

Green Plane Scale Factors for Image Formats

| Format | Mapping | mps | 1/mps |
|---|---|---|---|
| Standard 30 | 1000 ⇒ 1280 | 1.28 | 0.78125 |
| Passport 31 | 1000 ⇒ 640 | 0.64 | 1.5625 |
| Panoramic 33 | 500 ⇒ 1280 | 2.56 | 0.390625 |
| Thumbnail 32 | 1500 ⇒ 1280 | 0.85 | 1.17648 |

These scale factors allow the mapping of coordinates between CFA resolution input space and medium res space. However, once we have a coordinate in CFA resolution input space, we cannot perform image reconstruction and resampling on the samples in the same way as red or blue due to the checkerboard nature of the green plane 46.

Instead, for the purposes of high quality image reconstruction and resampling, we can consider the green channel to be an image rotated by 45 degrees. When we look at the pixels in this light, as shown in FIG. 23, a high quality image reconstruction and resampling method becomes clear.

Figure 23:
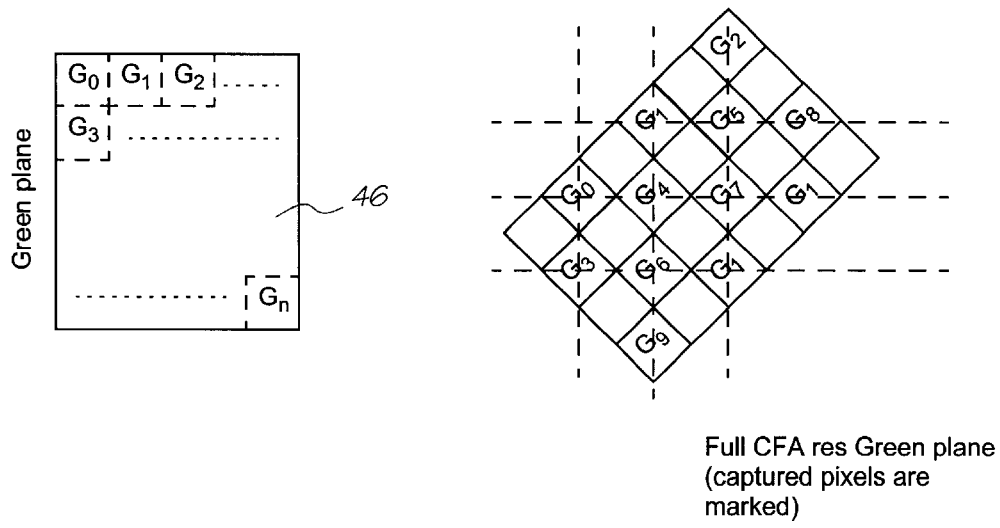
FIG. 23 shows the effect of rotating the green plane by 45 degrees.
Figure 24:
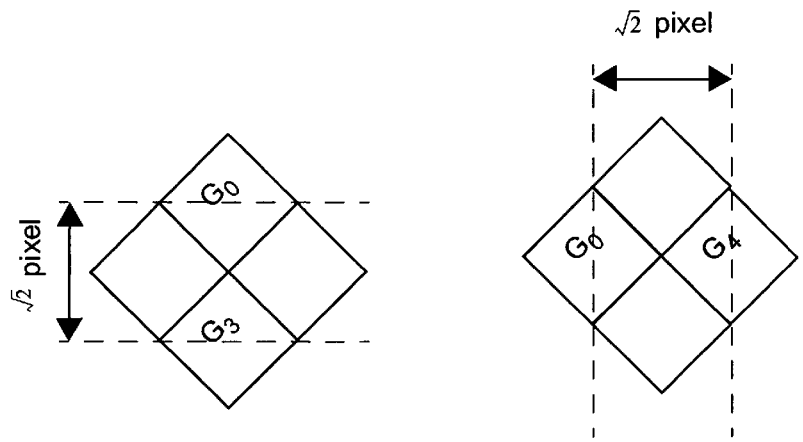
FIG. 24 shows the distance between rotated pixels for the green plane.

Looking at FIG. 23, the distance between the sampled pixels in the X and Y directions is now equal. The actual distance between sampled pixels is √2, as illustrated in FIG. 24.

The solution for the green channel then, is to perform image reconstruction and resampling in rotated space. Although the same reconstruction filter is used as for resampling red and blue, the kernel should be different. This is because the relationship between the sampling rate for green and the highest frequency in the signal is different to the relationship for the red and blue planes. In addition, the kernel should be normalized so that the √2 distance between samples becomes 1 as far as kernel coordinates go (the unnormalized distances between resampling coordinates must still be used to determine whether aliasing will occur however). Therefore we require two transformations:

The first is to map unrotated CFA space into rotated CFA space. This can be accomplished by multiplying each ordinate by 1/√2, since we are rotating by 45 degrees (cos 45=sin 45=1/√2).

The second is to scale the coordinates to match the normalized kernel, which can be accomplished by multiplying each ordinate by 1/√2.

These two transformations combine to create a multiplication factor of ½. Consequently, as we advance in unrotated CFA space x by k, we increase by k/2 in kernel x, and decrease by k/2 in kernel y. Similarly, as we advance in y by k, we increase by k/2 in kernel x and increase by k/2 in kernel y.

Figure 25:
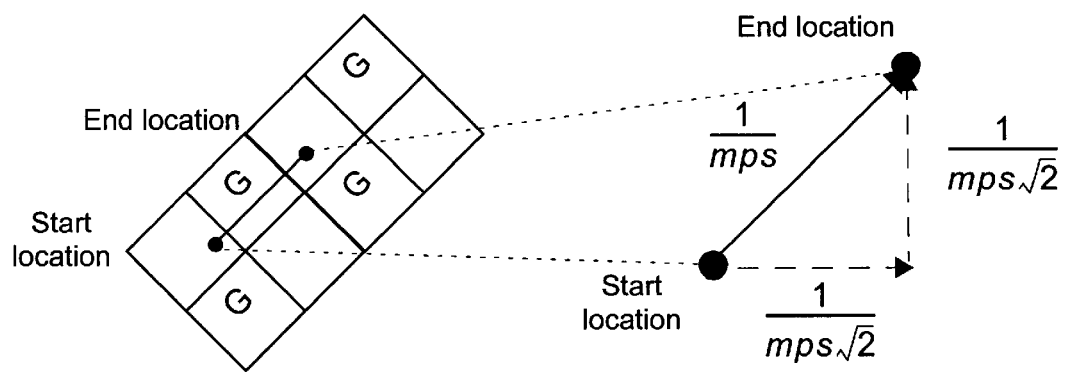
FIG. 25 shows the process of mapping movement in unrotated CFA space to rotated CFA space.

The relationships between these different coordinate systems can be illustrated by considering what occurs as we generate a line of medium resolution pixels from a CFA space input image. Given a starting y ordinate in CFA input space, we begin at x=0, and advance 1280 times by 1/mps, generating a new pixel at each new location. The movement in unrotated CFA space by 1/mps can be decomposed into a movement in x and a movement in y in rotated CFA space. The process is shown in FIG. 25.

Since cos 45=sin 45=1/√2), movement in unrotated CFA space by 1/mps equates to equal movement in x and y by 1/(mps√2). This amount must now be scaled to match the normalized kernel. The scaling equates to another multiplication by 1/√2. Consequently, a movement of 1/mps in unrotated CFA space equates to a movement of ½ mps in kernel x and kernel y. Table 11 lists the relationship between the three coordinate systems for the different formats:

TABLE 11

Green Plane Kernel Δ Values for Image Formats

| Format | Scale Factor (mps) | Unrotated CFA space Δ 1/mps | Rotated CFA Space Δ 1/mps√2 | Kernel Δ 1/2 mps |
|---|---|---|---|---|
| Standard | 1.28 | 0.78125 | 0.552 | 0.391 |
| Passport | 0.64 | 1.5625 | 1.105 | 0.781 |
| Panoramic | 2.56 | 0.391 | 0.276 | 0.195 |
| Thumbnail | 0.85 | 1.17648 | 0.832 | 0.601 |

Table 11 shows that movement in kernel space is always by a number less than 1, but in rotated CFA space, only the Passport image has a Δ value of greater than 1. As a result, aliasing will occur for the Passport print format, but not for any of the others. However, given that the Δ is almost 1, and that each of the 4 images is only ¼ size, aliasing will not be noticeable, especially since we assume ideal low pass filtering on the green during image capture.

3.2.5.3 Reconstruction Filter for Red, Blue and Green

The exact reconstruction filter to be used will depend on a number of issues. There is always a trade off between the number of samples used in constructing the original signal, the time taken for signal reconstruction, and quality of the resampled image. A satisfactory trade-off in this case is 5 pixel samples from the dimension being reconstructed, centered around the estimated position X i.e. X−2, X−1, X, X+1, X+2. Due to the nature of reconstructing with 5 sample points, we only require 4 coefficients for the entry in the convolution kernel.

We create a kernel coefficient lookup table with n entries for each color component. Each entry has 4 coefficients. As we advance in output space, we map the changes in output space to changes in input space and kernel space. The most significant bits of the fractional component in the current kernel space are used to index into the kernel coefficients table. If there are 64 entries in the kernel table, the first 6 fraction bits are used to look up the coefficients. 64 entries is quite sufficient for the resampling in Printcam.

3.2.6 Sharpen 65

The image captured by the CFA must be sharpened before being printed. Ideally, the sharpening filter should be applied in the CFA resolution domain. However, at the image capture resolution we do not have the full color information at each pixel. Instead we only have red, blue or green at a given pixel position. Sharpening each color plane independently gives rise to color shifts. Sharpening should instead be applied to the luminance channel of an image, so that the hue and saturation of a given pixel will be unchanged.

Figure 26:
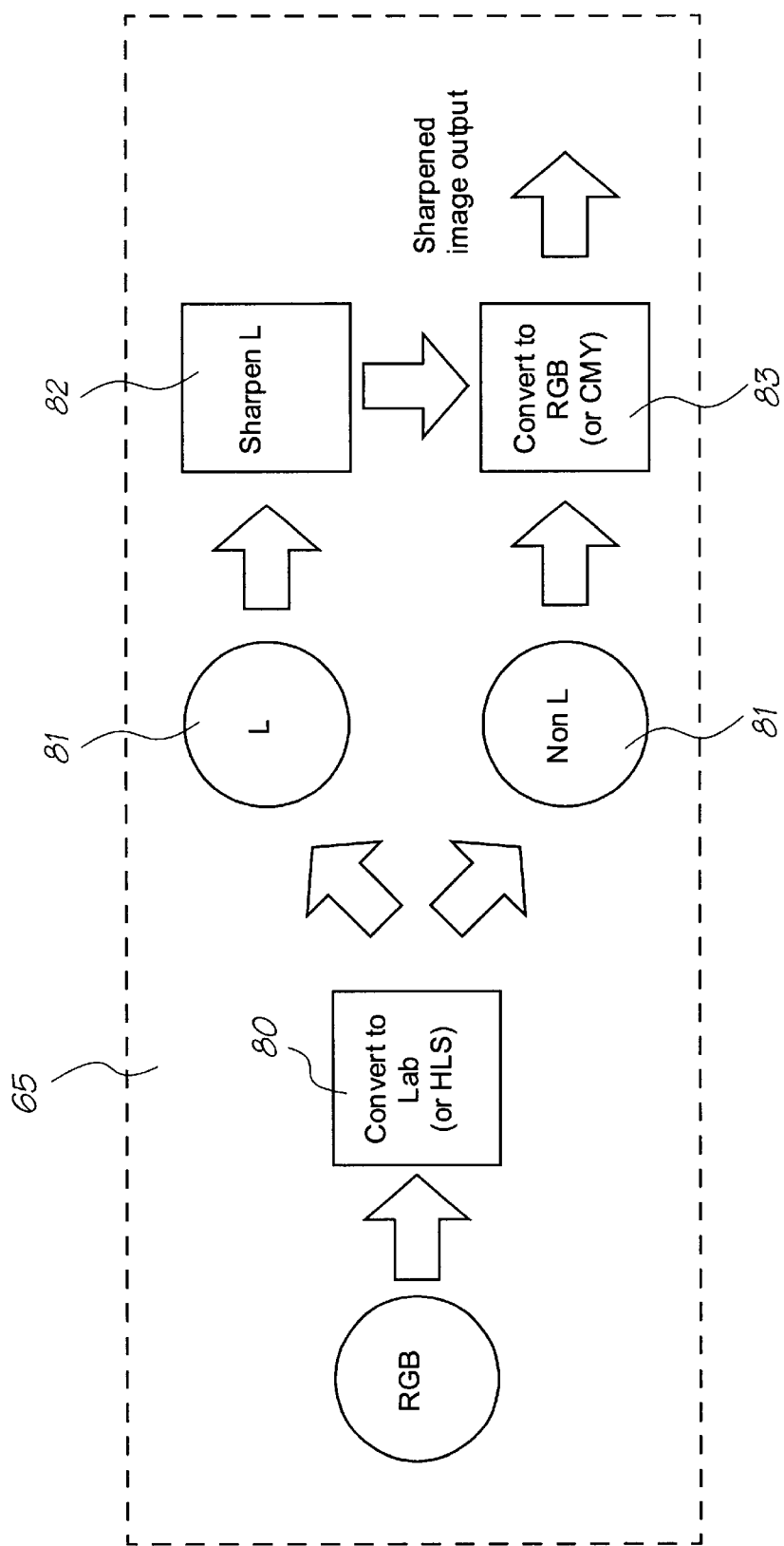
FIG. 26 shows a block diagram of the sharpen process.

Sharpening then, involves the translation of an RGB image into a color space where the luminance is separated from the remainder of the color information (such as HLS or Lab) 80. The luminance channel 81 can then be sharpened 82 (by adding in a proportion of the high-pass-filtered version of the luminance). Finally, the entire image should be converted back to RGB 83 (or to CMY since we are going to print out in CMY). The process is shown in FIG. 26.

However we can avoid much of the color conversion steps if we consider the effect of adding a high-passed-filtered L back into the image—the effect is a change in the luminance of the image. A change in the luminance of a given pixel can be well-approximated by an equal change in linear R, G, and B. Therefore we simply generate L, high-pass-filter L, and apply a proportion of the result equally to R, G, and B.

3.2.6.1 Convert RGB to L 80

We consider the CIE 1976 L*a*b* color space, where L is perceptually uniform. To convert from RGB to L (the luminance channel) we average the minimum and maximum of R, G, and B as follows:

$$L = \frac{\text{MIN}(R, G, B) + \text{MAX}(R, G, B)}{2}$$

3.2.6.2 High Pass Filter L 84

A high pass filter 84 can then be applied to the luminance information. Since we are filtering in med-res space rather than CFA resolution space, the size of the sharpening kernel can be scaled up or the high pass result can be scaled appropriately. The exact amount of sharpening will depend on the CFA, but a 3×3 convolution kernel 85 will be sufficient to produce good results.

If we were to increase the size of the kernel, Table 12 shows the effective scaling 86 required for a 3×3 convolution in CFA space as applied to 1280 resolution space, using the green channel as the basis for scaling the kernel. From this table it is clear that a 7×7 sized kernel applied to the medium resolution space will be adequate for all sharpening.

TABLE 12

Scale Factors for Convolution Filter

| Format | Scale | 3 × 3 | Kernel in Med-res (1280) Space |
|---|---|---|---|
| Standard 30 | 1.28 | 3.84 | 3 × 3 or 5 × 5 |
| Passport 31 | 0.64 | 1.92 | none, or 3 × 3 |
| Panoramic 33 | 2.56 | 7.68 | 7 × 7 |
| Thumbnail 32 | 0.85 | 2.55 | none, or 3 × 3 |

Figure 27:
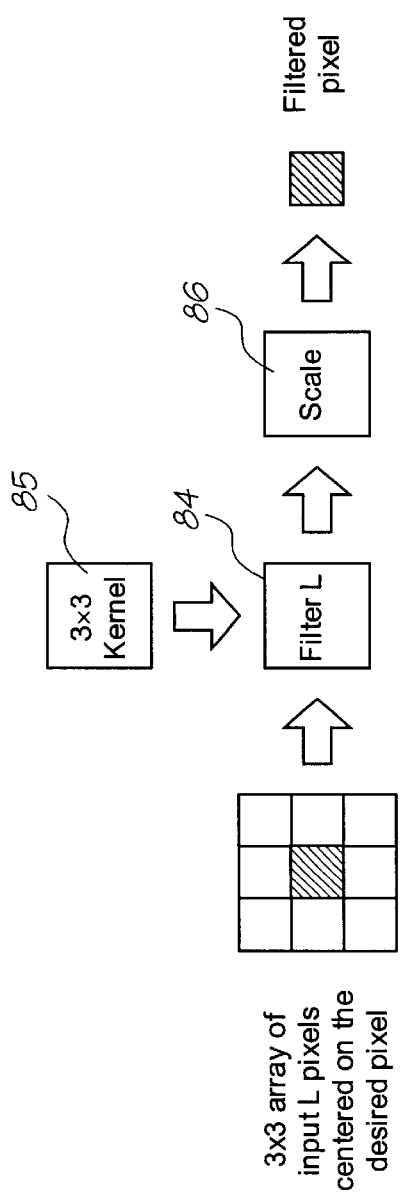
FIG. 27 shows the process involved in high-pass filtering a single luminance pixel with a 3×3 kernel.

If a 3×3 filter 85 were applied on the med-res image, the result will be scaled 86 according to the scale factor used in the general image scale operation. Given the amounts in Table 12 (particularly the Standard print format), we can use a 3×3 filter 85, and then scale the results. The process of producing a single filtered L pixel is shown in FIG. 27.

The actual kernel used can be any one of a set of standard highpass filter kernels. A basic but satisfactory highpass filter is shown in this implementation of the PCP in FIG. 50.

3.2.6.3 Add Filtered L to RGB

The next thing to do is to add some proportion of the resultant high pass filtered luminance values back to the luminance channel. The image can then be converted back to RGB (or instead, to CMY). However, a change in luminance can be reasonably approximated by an equal change in R, G, and B (as long as the color space is linear). Consequently we can avoid the color conversions altogether by adding an equal proportion of the high pass filtered luminance value to R, G, and B. The exact proportion of the high-pass-filtered image can be defined by means of a scale factor.

If L is the high-pass-filtered luminance pixel, and k is the constant scale factor, we can define the transformation of sharpening R, G, and B as follows:

$$\left.\begin{array}{l} R' = R + kL \\ G' = G + kL \\ B' = B + kL \end{array}\right\} \text{(limited to 255 each)}$$

Of course, the scale factor applied to L can be combined with the scale factor in the highpass filter process (see Section 3.2.6.2) for a single scale factor.

Once the sharpening has been applied to the RGB pixel, the image can be converted to CMY 83 in order to be printed out.

3.2.7 Convert to CMY 83

In theoretical terms, the conversion from RGB to CMY is simply:

$$C = 1 - R$$
$$M = 1 - G$$
$$Y = 1 - B$$

However this conversion assumes that the CMY space has a linear response, which is definitely not true of pigmented inks, and only partially true for dye-based inks. The individual color profile of a particular device (input and output) can vary considerably. Consequently, to allow for accurate conversion, as well as to allow for future sensors, inks, and printers, a more accurate model is required for Printcam.

Figure 28:
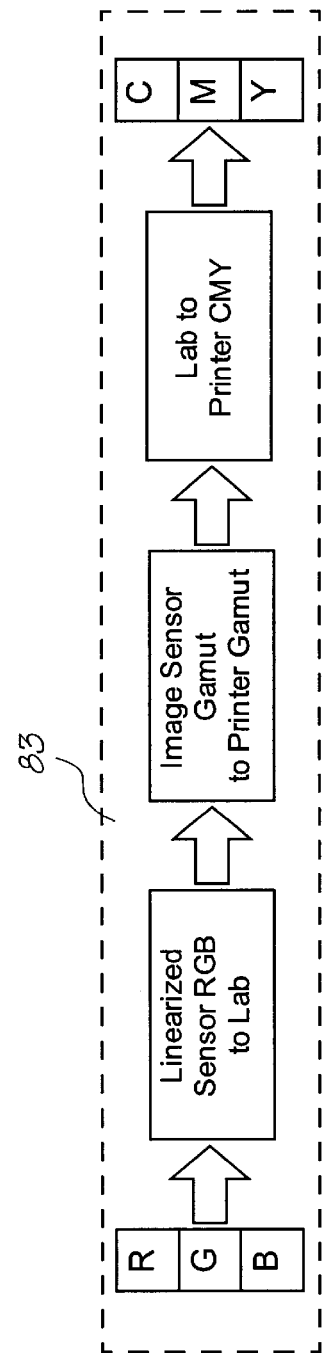
FIG. 28 shows the transformation in conversion from RGB to CMY.

The transformations required are shown in FIG. 28. Lab is chosen because it is perceptually uniform (unlike XYZ). With regards to the mapping from the image sensor gamut to the printer gamut, the printer gamut is typically contained wholly within the sensor gamut.

Figure 29:
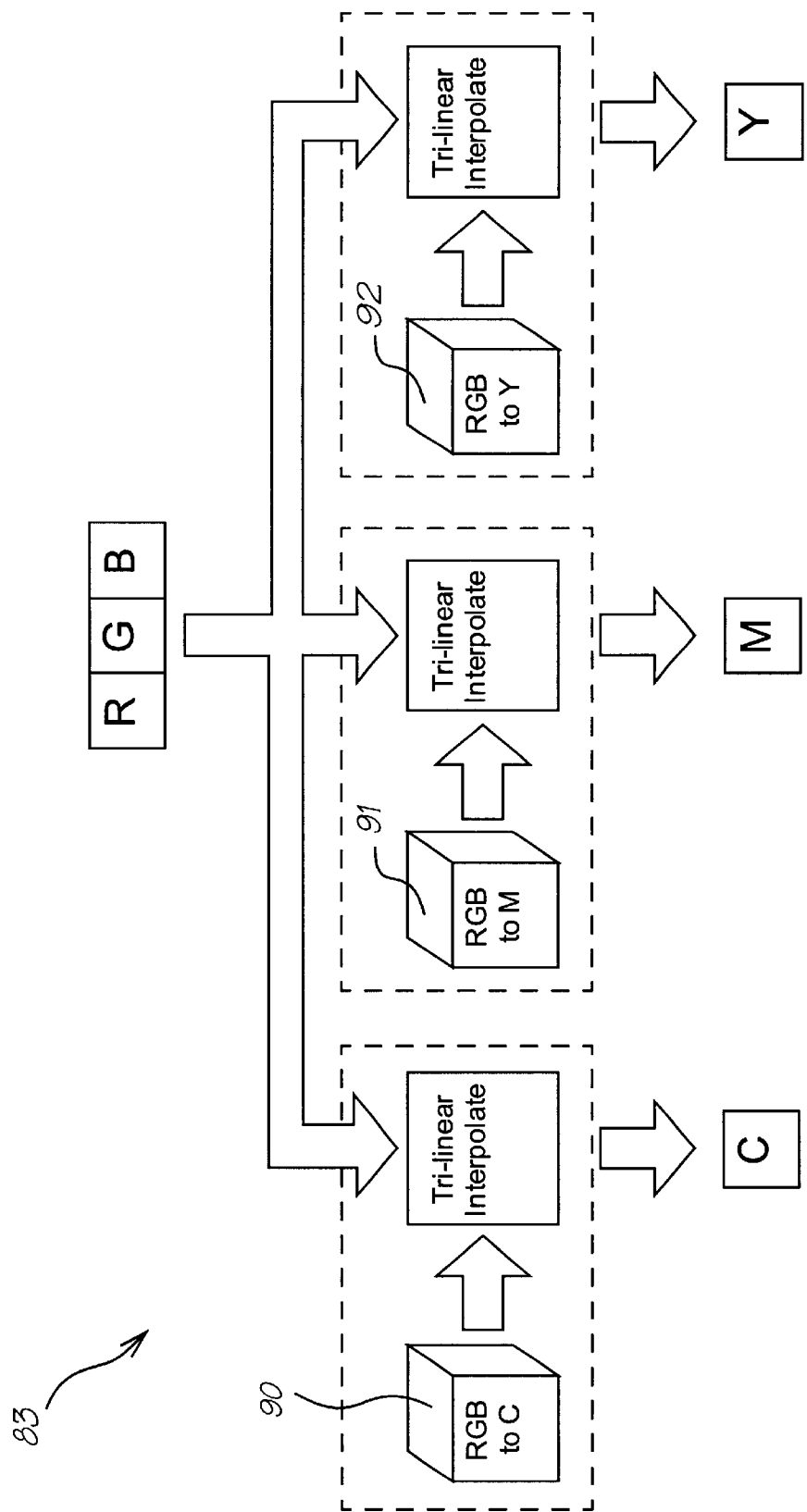
FIG. 29 shows conversion from RGB to CMY by trilinear interpolation.

Rather than perform these transformations exhaustively, excellent results can be obtained via a tri-linear conversion based on 3 sets of 3D lookup tables. The lookup tables contain the resultant transformations for the specific entry as indexed by RGB. Three tables are required: one table 90 mapping RGB to C, one table 91 mapping RGB to M, and one table 92 mapping RGB to Y. Tri-linear interpolation can be used to give the final result for those entries not included in the tables. The process is shown in FIG. 29.

Tri-linear interpolation requires reading 8 values from the lookup table, and performing 7 linear interpolations (4 in the first dimension, 2 in the second, and 1 in the third). High precision can be used for the intermediate values, although the output value is only 8 bits.

The size of the lookup table required depends on the linearity of the transformation. The recommended size for each table in this application is 17×17×17[1], with each entry 8 bits. A 17×17×17 table is 4913 bytes (less than 5KB).

[1]. Although a 17×17×17 table will give excellent results, it may be possible to get by with only a 9×9×9 conversion table (729 bytes). The exact size can be determined by simulation. The 5K conservative-but-definite-results approach was chosen for the purposes of this document.

To index into the 17-per-dimension tables, the 8-bit input color components are treated as fixed-point numbers (4:4). The 4 bits of integer give the index, and the 4 bits of fraction are used for interpolation.

3.2.8 Up Interpolate 67

The medium resolution (1280 wide) CMY image must now be up-interpolated to the final print resolution (6400 wide). The ratio is exactly 1:5 in both dimensions.

Although it is certainly possible to bi-linearly interpolate the 25 values (1:5 in both X and Y dimensions), the resultant values will not be printed contone. The results will be dithered and printed bi-level. Given that the contone 1600 dpi results will be turned into dithered bi-level dots, the accuracy of bi-linear interpolation from 320 dpi to 1600 dpi will not be visible (the medium resolution was chosen for this very reason). Pixel replication will therefore produce good results.

Figure 30:
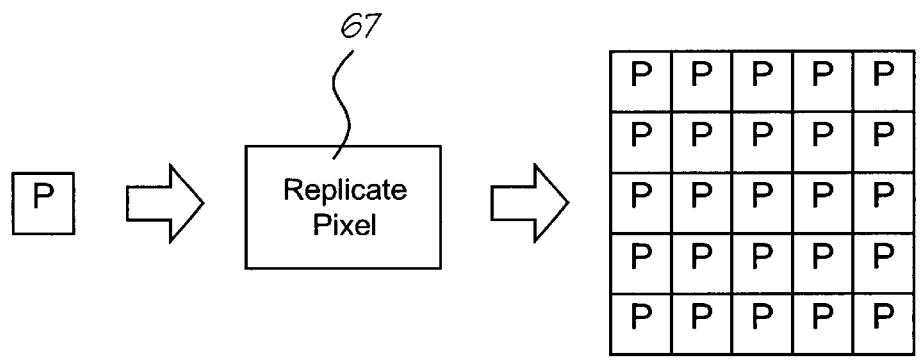
FIG. 30 shows pixel replication of a single pixel to a 5×5 block.

Pixel replication simply involves taking a single pixel, and using it as the value for a larger area. In this case, we replicate a single pixel to 25 pixels (a 5×5 block). If each pixel were contone, the result may appear blocky, but since the pixels are to be dithered, the effect is that the 25 resultant bi-level dots take on the contone value. The process is shown in FIG. 30.

3.2.9 Halftone 68

The printhead 2 is only capable of printing dots in a bi-level fashion. We must therefore convert from the contone CMY to a dithered CMY image. More specifically, we produce a dispersed dot ordered dither using a stochastic dither cell, converting a contone CMY image into a dithered bi-level CMY image.

The 8-bit 1600 dpi contone value is compared to the current position in the dither cell 93. If the 80-bit contone value is greater than the dither cell value, an output bit of 1 is generated. Otherwise an output bit of 0 is generated. This output bit will eventually be sent to the printhead and control a single nozzle to produce a single C, M, or Y dot. The bit represents whether or not a particular nozzle will fire for a given color and position.

The same position in the dither cell 93 can be used for C, M, and Y. This is because the actual printhead 2 produces the C, M, and Y dots for different lines in the same print cycle. The staggering of the different colored dots effectively gives us staggering in the dither cell.

Figure 31:
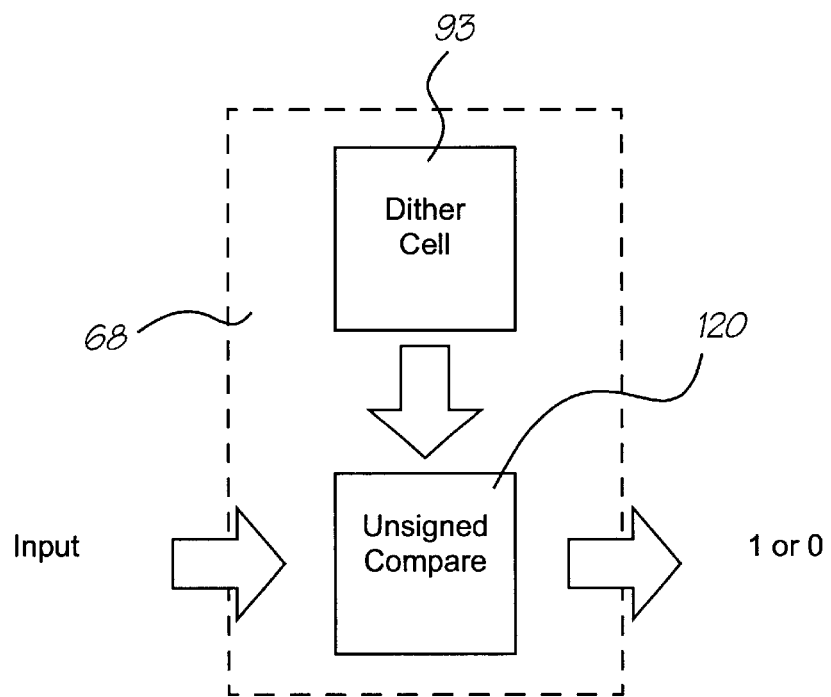
FIG. 31 shows a block diagram of the half-toning process.

The half-toning process can be seen in FIG. 31.

The size of the dither cell 93 depends on the resolution of the output dots. Since we are producing 1600 dpi dots, the cell size should be larger than 32×32. In addition, to allow the dot processing order to match the printhead segments, the size of the dither cell should ideally divide evenly into 800 (since there are 800 dots in each segment of the printhead).

A dither cell size of 50×50 is large enough to produce high quality results, and divides evenly into 800 (16 times). Each entry of the dither cell is 8 bits, for a total of 2500 bytes (approximately 1.5 KB).

3.2.10 Reformat for Printer 69

The final process before being sent to the printer is for the dots to be formatted into the correct order for being sent to the printhead. The dots must be sent to the printhead in the correct order—24 dots at a time as defined in Section 2.2.1.

Figure 32:
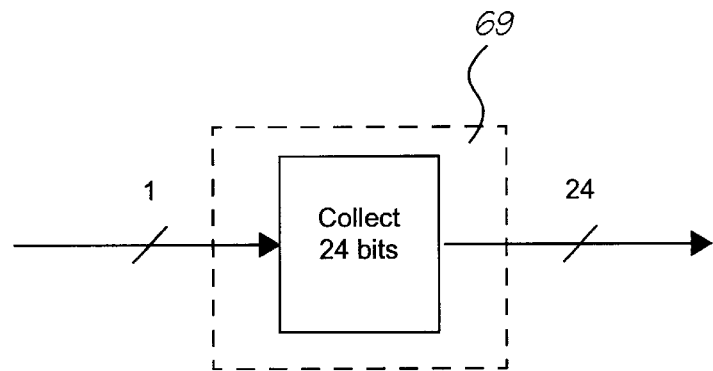
FIG. 32 shows the process of reformatting dots for the printer.

If the dots can be produced in the correct order for printing (i.e. the up-interpolate and dither functions generate their data in the correct order), then those dot values (each value is 1 bit) can simply be collected, and sent off in groups of 24. The process is shown in FIG. 32.

The 24 bit groups can then be sent to the printhead 2 by the Memjet Interface 15.

4 CPU Core and Memory

4.1 CPU Core 10

The PCP 3 incorporates a simple micro-controller CPU core 10 to synchronize the image capture and printing image processing chains and to perform Printcam's general operating system duties including the user-interface. A wide variety of CPU cores are suitable: it can be any processor core with sufficient processing power to perform the required calculations and control functions fast enough to met consumer expectations.

Since all of the image processing is performed by dedicated hardware, the CPU does not have to process pixels. As a result, the CPU can be extremely simple. However it must be fast enough to run the stepper motor during a print (the stepper motor requires a 5 KHz process). An example of a suitable core is a Philips 8051 micro-controller running at about 1 MHz.

There is no need to maintain instruction set continuity between different Printcam models. Different PCP chip designs may be fabricated by different manufacturers, without requiring to license or port the CPU core. This device independence avoids the chip vendor lock-in such as has occurred in the PC market with Intel.

Associated with the CPU Core is a Program ROM 13 and a small Program Scratch RAM 14.

The CPU 10 communicates with the other units within the PCP 3 via memory-mapped I/O. Particular address ranges map to particular units, and within each range, to particular registers within that particular unit. This includes the serial and parallel interfaces.

4.2 Program ROM 13

A small Program Flash ROM 13 is incorporated into the PCP 3. The ROM size depends on the CPU chosen, but should not be more than 16–32 KB.

4.3 Program RAM 14

Likewise, a small scratch RAM area 14 is incorporated into the PCP 3. Since the program code does not have to manipulate images, there is no need for a large scratch area. The RAM size depends on the CPU chosen (e.g. stack mechanisms, subroutine calling conventions, register sizes etc.), but should not be more than about 4 KB.

4.4 CPU Memory Decoder 16

The CPU Memory Decoder 16 is a simple decoder for satisfying CPU data accesses. The Decoder translates data addresses into internal PCP register accesses over the internal low speed bus, and therefore allows for memory mapped I/O of PCP registers.

5 Communication Interfaces

5.1 USB Serial Port Interface 17

This is a standard USB serial port, connected to the internal chip low-speed bus 18. The USB serial port is controlled by the CPU 10. The serial port allows the transfer of images to and from the Printcam, and allows DPOF (Digital Print Order Format) printing of transferred photos under external control.

5.2 QA Chip Serial Interface 19

This is two standard low-speed serial ports, connected to the internal chip low-speed bus 18. The CPU-mediated protocol between the two is used to authenticate the print roll [1,2] and for the following functions:

Acquire ink characteristics

Acquire the recommended drop volume

Track the amount of paper printed and request new print roll when there is insufficient paper to print the requested print format.

The reason for having two ports is to connect to both the on-camera QA Chip 4 and to the print roll's QA Chip 5 using separate lines. The two QA chips are implemented as Authentication Chips [2]. If only a single line is used, a clone print roll manufacturer could usurp the authentication mechanism [1].

5.2.1 Print Roll's QA Chip 5

Each print roll consumable contains its own QA chip 5. The QA chip contains information required for maintaining the best possible print quality, and is implemented using an Authentication Chip[2]. The 256 bits of data are allocated as follows:

TABLE 13

Print roll's 256 bits (16

| M[n] | Access | Description |
|---|---|---|
| 0 | RO[a] | Basic Header, Flags etc. (16 bits) |
| 1 | RO | Serial number (16 bits) |
| 2 | RO | Batch number (16 bits) |
| 3 | DO[b] | Paper remaining in mm (16 bits) |
| 4 | RO | Cyan ink properties (32 bits) |
| 5 | RO | |
| 6 | RO | Magenta ink properties (32 bits) |
| 7 | RO | |
| 8 | RO | Yellow ink properties (32 bits) |
| 9 | RO | |
| 10–12 | RO | For future expansion = 0 (48 bits) |
| 13–15 | RO | Random bits, different in each chip (48 bits) |

[a]Read Only
[b]Decrement Only

Before each print, the amount of paper remaining is checked by the CPU to ensure that there for the currently specified print format. After each print has started, the amount of paper must be decremented in the print roll's QA chip by the CPU.

5.3 Parallel Interfaces 6

The parallel interface 6 connects the PCP 3 to individual static electrical signals. The CPU is able to control each of these connections as memory-mapped I/O via the low-speed bus. (See Section 4.4 for more details on memory-mapped I/O).

Table 14 shows the connections to the parallel interface.

TABLE 14

Connections to Parallel Interface

| Connection | Direction | Pins |
|---|---|---|
| Paper transport stepper motor | Out | 4 |
| Guillotine motor | Out | 1 |
| Focus Motor | Out | 1 |
| Capping solenoid | Out | 1 |
| Flash trigger | Out | 1 |
| Status LCD segment drivers | Out | 7 |
| Status LCD common drivers | Out | 4 |
| Paper pull sensor | In | 1 |
| Buttons | In | 4 |
| TOTAL | | 24 |

5.4 JTAG Interface 7

A standard JTAG (Joint Test Action Group) Interface 7 is included in the PCP 3 for testing purposes. Due to the complexity of the chip, a variety of testing techniques are required, including BIST (Built In Self Test) and functional block isolation. An overhead of 10% in chip area is assumed for overall chip testing circuitry.

6 Image RAM 11

The Image RAM 11 is used to store the captured image 42. The Image RAM is multi-level Flash (2-bits per cell) so that the image is retained after the power has been shut off.

The total amount of memory required for the planarized linear RGB image is 1,500,000 bytes (approximately 1.5 MB) arranged as follows:
  R: 750×500=375,000 bytes
  B: 750×500=375,000 bytes
  G: 750×1000=750,000 bytes The image is written by the Image Capture Unit, and read by both the Image Histogram Unit 8 and the Print Generator Unit 99. The CPU 10 does not have direct random access to this image memory. It must access the image pixels via the Image Access Unit.

7 Image Capture Unit 12

Figure 33:
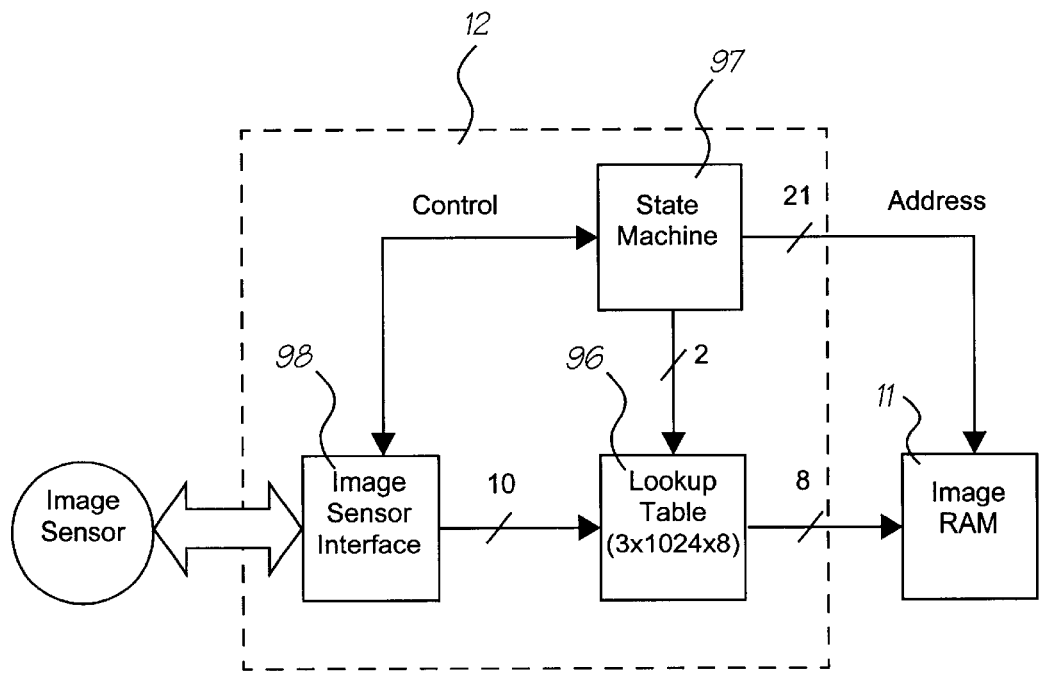
FIG. 33 shows a block diagram of the image capture unit.

The Image Capture Unit contains all the functionality required by the Image Capture Chain, as described in Section 3.1. The Image Capture Unit accepts pixel data via the Image Sensor Interface 98, linearizes the RGB data via a lookup table 96, and finally writes the linearized RGB image out to RAM in planar format. The process is shown in FIG. 33.

7.1 Image Sensor Interface 98

The Image Sensor Interface (ISI) 98 is a state machine that sends control information to the CMOS Image Sensor, including frame sync pulses and pixel clock pulses in order to read the image. Most of the ISI is likely to be a sourced cell from the image sensor manufacturer. The ISI is itself controlled by the Image Capture Unit State Machine 97.

7.1.1 Image Sensor Format

Although a variety of image sensors are available, we only consider the Bayer color filter array (CFA). The Bayer CFA has a number of attributes which are defined here.

The image captured by the CMOS sensor (via a taking lens) is assumed to have been sufficiently filtered so as to remove any aliasing artifacts. The sensor itself has an aspect ratio of 3:2, with a resolution of 1500×1000 samples. The most likely pixel arrangement is the Bayer color filter array (CFA), with each 2×2 pixel block arranged in a 2G mosaic as shown in FIG. 15:

Each contone sample of R, G, or B (corresponding to red, green, and blue respectively) is 10-bits. Note that each pixel of the mosaic contains information about only one of R, G, or B. Estimates of the missing color information must be made before the image can be printed out.

The CFA is considered to perform some amount of fixed pattern noise (FPN) suppression. Additional FPN suppression may required.

7.2 Lookup Table 96

The lookup table 96 is a ROM mapping the sensor's RGB to a linear RGB. It matches the Linearize RGB process 40 described in Section 3.1.2. As such, the ROM is 3 KBytes (3×1024×8-bits). 10 bits of address come from the ISI, while the 2 bits of TableSelect are generated by the Image Capture Unit's State Machine 97.

7.3 State Machine 97

The Image Capture Unit's State Machine 97 generates control signals for the Image Sensor Interface 1, and generates addresses for linearizing the RGB 40 and for planarizing the image data 41.

The control signals sent to the ISI 98 inform the ISI to start capturing pixels, stop capturing pixels etc.

The 2-bit address sent to the Lookup Table 96 matches the current line being read from the ISI. For even lines (0, 2, 4 etc.), the 2-bit address is Red, Green, Red, Green etc. For odd lines (1, 3, 5 etc.), the 2-bit address is Green, Blue, Green, Blue. This is true regardless of the orientation of the camera.

The 21-bit address sent to the Image RAM 11 is the write address for the image. Three registers hold the current address for each of the red, green, and blue planes. The addresses increment as pixels are written to each plane.

7.3.1 Registers

The Image Capture Unit contains a number of registers:

TABLE 15

Registers in Image Capture Unit

| Name | Bits | Description |
| --- | --- | --- |
| MaxPixels | 12 | Number of pixels each row |
| MaxRows | 12 | Number of rows of pixels in image |
| CurrentPixel | 12 | Pixel currently being fetched |
| CurrentRow | 12 | Row currently being processed |
| NextR | 21 | The address in Image RAM to store the next Red pixel. Set to start address of red plane before image capture. After image capture, this register will point to the byte after the red plane. |
| NextG | 21 | The address in Image RAM to store the next Green pixel. Set to start address of green plane before image capture. After image capture, this register will point to the byte after the green plane. |
| NextB | 21 | The address in Image RAM to store the next Blue pixel. Set to start address of blue plane before image capture. After image capture, this register will point to the byte after the blue plane. |
| EvenEven | 2 | Address to use for even rows/even pixels |
| EvenOdd | 2 | Address to use for even rows/odd pixels |
| OddEven | 2 | Address to use for odd rows/even pixels |
| OddOdd | 2 | Address to use for odd rows/odd pixels |
| Go | 1 | Writing a 1 here starts the capture. Writing a 0 here stops the image capture. A 0 is written here automatically by the state machine after MaxRows of MaxPixels have ben captured. |

In addition, the Image Sensor Interface 98 contains a number of registers. The exact registers will depend on the Image Sensor 1 chosen.

8 Image Access Unit 9

The Image Access Unit 9 produces the means for the CPU 10 to access the image in ImageRAM 11. The CPU 10 can read pixels from the image in ImageRAM 11 and write pixels back.

Pixels could be read for the purpose of image storage (e.g. via the USB) 17, or for simple image processing. Pixels could be written to ImageRAM 11 after the image processing, as a previously saved image (loaded via USB), or images for test pattern purposes. Test patterns could be synthetic images, specific test images (loaded via the USB) or could be 24-bit nozzle firing values to be directly loaded into the printhead via the test mode of the Print Generator Unit 99.

The Image Access Unit 9 is a straightforward access mechanism to ImageRAM 11, and operates quite simply in terms of 3 registers as shown in Table 16.

TABLE 16

IAU Registers

| Name | Bits | Description |
| --- | --- | --- |
| ImageAddress | 21 | Address to read or write in ImageRAM |
| Mode | 3 | 0 = Read from ImageAddress into Value. |
| | | 1 = Write Value to ImageAddress. |
| Value | 8 | Value stored at ImageAddress (if Mode = Read) |
| | | Value to store at ImageAddress (if Mode = Write) |

Figure 35:
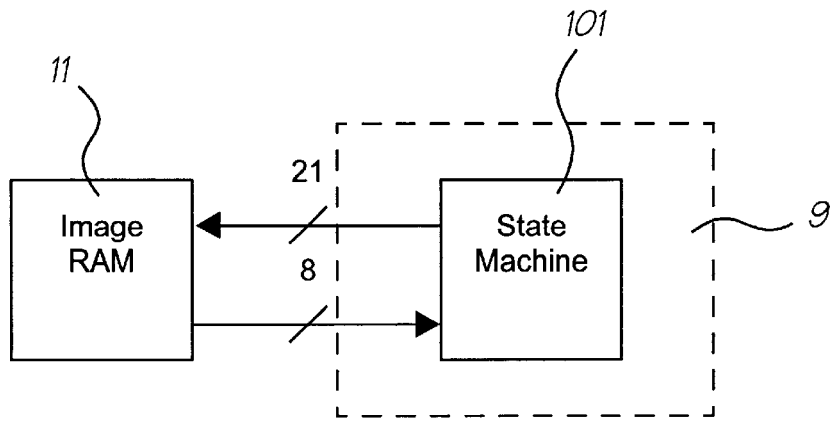
FIG. 35 shows a block diagram of the image access unit.
Figure 36:
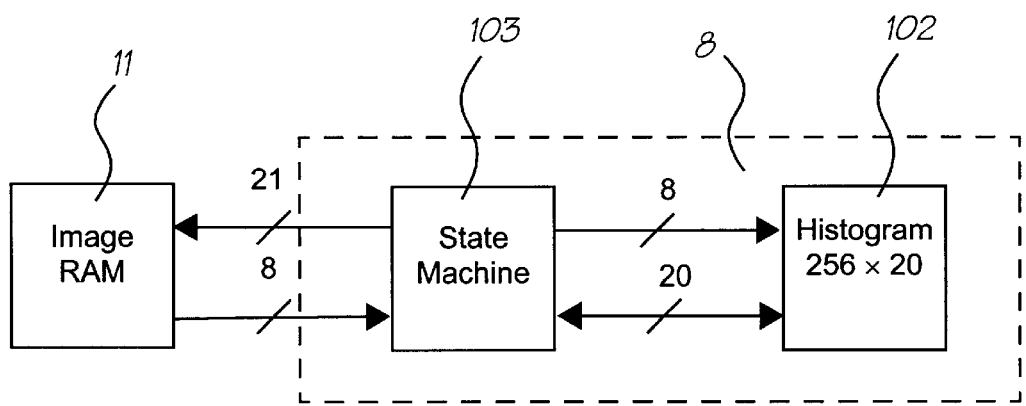
FIG. 36 shows a block diagram of the image histogram unit.

The structure of the Image Access Unit is very simple, as shown in FIG. 35.

The State Machine 101 simply performs the read/write from/to ImageRAM 11 whenever the CPU 10 writes to the Mode register.

9 Image Historian Unit 8

The Image Histogram Unit (IHU) 8 is designed to generate histograms of images as required by the Print Image Processing Chain described in Section 3.2.2. The IHU only generates histograms for planar format images with samples of 8 bits each.

The Image Histogram Unit 8 is typically used three times per print. Three different histograms are gathered, one per color plane. Each time a histogram is gathered, the results are analyzed in order to determine the low and high thresholds, scaling factors etc. for use in the remainder of the print process. For more information on how the histogram should be used, see Section 3.2.2.2 and Section 3.2.4.

9.1 Histogram RAM 102

The histogram itself is stored in a 256-entry RAM 102, each entry being 20 bits. The histogram RAM is only accessed from within the IHU. Individual entries are read from and written to as 20-bit quantities.

9.2 State Machine and Registers 103

The State Machine 103 follows the pseudocode described in Section 3.2.2.1. It is controlled by the registers shown in Table 17.

TABLE 17

Registers in Image Histogram Unit

| Name | Bits | Description |
| --- | --- | --- |
| TotalPixels | 20 | The number of pixels to count (decrements until 0) |
| StartAddress | 21 | Where to start counting from |
| PixelsRemaining | 20 | How many pixels remain to be counted |
| PixelValue | 8 | A write to this register loads PixelCount with the PixelValue entry from the histogram. |
| PixelCount | 20 | The number of PixelValue pixels counted in the current histogram. It is valid after a write to PixelValue. |
| ClearCount | 1 | Determines whether the histogram count will be cleared at the start of the histogram process. A 1 causes the counts to be cleared, and a 0 causes the counts to remain untouched (i.e. the next histogram adds to the existing counts). |
| Go | 1 | Writing a 1 here starts the histogram process. Writing a 0 here stops the histogram process. A 0 is written here automatically by the state machine after TotalPixels has counted down to 0. |

The typical usage of the registers is to set up TotalPixels with the total number of pixels to include in the count (e.g. 375,000 for red), StartAddress with the address of the red plane, ClearCount with 1, and write a 1 to the Go register. Once the count has finished, the individual values in the histogram can be determined by writing 0–255 to PixelValue and reading the corresponding PixelCount.

10 Printhead Interface 105

The Printhead Interface (PHI) 105 is the means by which the PCP 3 loads the Memjet printhead 2 with the dots to be printed, and controls the actual dot printing process. The PHI is a logical wrapper for a number of units, namely:
- a Memjet Interface (MJI) 15, which transfers data to the Memjet printhead, and controls the nozzle firing sequences during a print.
- a Print Generator Unit (PGU) 99 is an implementation of most of the Print Chain described in Section 3.2 on page 24, as well as providing a means of producing test patterns. The PGU takes a planarized linear RGB obtained from a CFA format captured image from the ImageRAM 11, and produces a 1600 dpi dithered CMY image in real time as required by the Memjet Interface 15. In addition, the PGU has a Test Pattern mode, which enables the CPU 10 to specify precisely which nozzles are fired during a print.

The units within the PHI are controlled by a number of registers that are programmed by the CPU.

Figure 37:
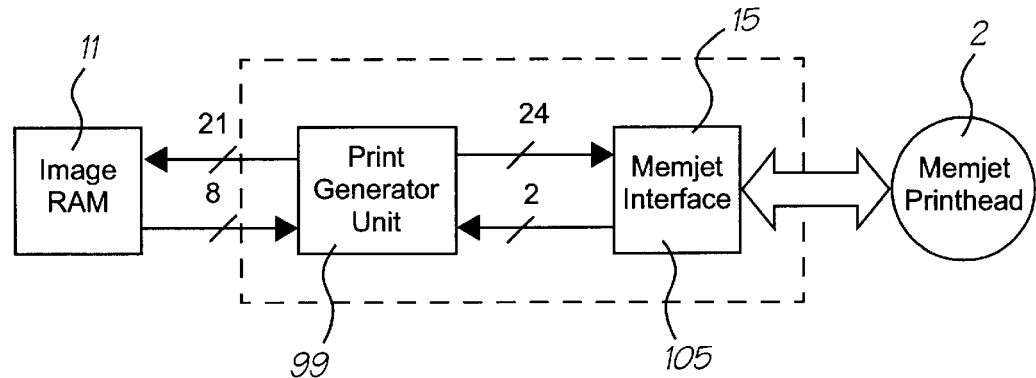
FIG. 37 shows a block diagram of the printed interface.

The internal structure of the Printhead Interface is shown in FIG. 37.

10.1 Memjet Interface 15

The Memjet Interface (MJI) 15 connects the PCP to the external Memjet printhead, providing both data and appropriate signals to control the nozzle loading and firing sequences during a print.

The Memjet Interface 15 is simply a State Machine 106 (see FIG. 38) which follows the printhead loading and firing order described in Section 2.2, and includes the functionality of the Preheat cycle and Cleaning cycle as described in Section 2.4.1 and Section 2.4.2.

The MJI 15 loads data into the printhead from a choice of 2 data sources:

- All 1s. This means that all nozzles will fire during a subsequent Print cycle, and is the standard mechanism for loading the printhead for a Preheat or Cleaning cycle.
- From the 24-bit input held in the Transfer register of the PGU 99. This is the standard means of printing an image, whether it be a captured photo or test pattern. The 24-bit value from the PGU is directly sent to the printhead and a 1-bit 'Advance' control pulse is sent to the PGU. At the end of each line, a 1-bit 'AdvanceLine' pulse is also sent to the PGU.

The MJI 15 must be started after the PGU 99 has already prepared the first 24-bit transfer value. This is so the 24-bit data input will be valid for the first transfer to the printhead.

Figure 38:
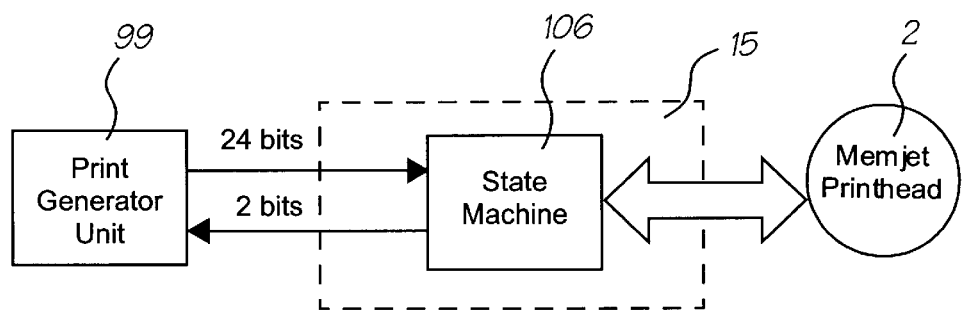
FIG. 38 shows the block diagram of the Memjet interface.

The MJI 15 is therefore directly connected to the Print Generator Unit 99 and the external printhead 2. The basic structure is shown in FIG. 38.

10.1.1 Connections to Printhead

The MJI 15 has the following connections to the printhead 2, with the sense of input and output with respect to the MJI 15. The names match the pin connections on the printhead (see Section 2).

TABLE 18

Printhead Connections

| Name | # Pins | I/O | Description |
| --- | --- | --- | --- |
| ChromapodSelect | 4 | O | Select which chromapod will fire (0–9) |
| NozzleSelect | 4 | O | Select which nozzle from the pod will fire (0–9) |
| AEnable | 1 | O | Firing pulse for phasegroup A |
| BEnable | 1 | O | Firing pulse for phasegroup B |
| CDataIn[0–7] | 8 | O | Cyan output to cyan shift register of segments 0–7 |
| MDataIn[0–7] | 8 | O | Magenta input to magenta shift register of segments 0–7 |
| YDataIn[0–7] | 8 | O | Yellow input to yellow shift register of segments 0–7 |
| SRClock | 1 | O | A pulse on SRClock (ShiftRegisterClock) loads the current values from CDataIn[0–7], MDataIn[0–7] and YDataIn[0–7] into the 24 shift registers of the printhead |
| PTransfer | 1 | O | Parallel transfer of data from the shift registers to the printhead's internal NozzleEnable bits (one per nozzle). |

TABLE 18-continued

Printhead Connections

| Name | # Pins | I/O | Description |
| --- | --- | --- | --- |
| SenseSegEnable | 1 | O | A pulse on SenseSegEnable ANDed with data on CDataIn[n] selects the sense lines for segment n. |
| Tsense | 1 | I | Temperature sense |
| Vsense | 1 | I | Voltage sense |
| Rsense | 1 | I | Resistivity sense |
| Wsense | 1 | I | Width sense |
| TOTAL | 41 | | |

10.1.2 Firing Pulse Duration

The duration of firing pulses on the AEnable and BEnable lines depend on the viscosity of the ink (which is dependent on temperature and ink characteristics) and the amount of power available to the printhead. The typical pulse duration range is 1.3 to 1.8 $\mu$s. The MJI therefore contains a programmable pulse duration table, indexed by feedback from the printhead. The table of pulse durations allows the use of a lower cost power supply, and aids in maintaining more accurate drop ejection.

Figure 39:
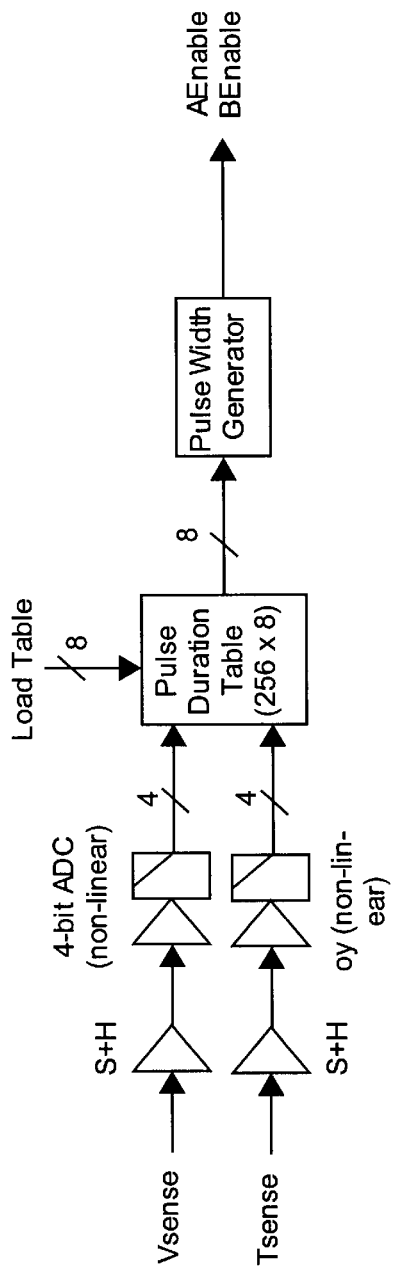
FIG. 39 shows the generation of AEnable and BEnable pulse widths.

The Pulse Duration table has 256 entries, and is indexed by the current Vsense and Tsense settings. The upper 4-bits of address come from Vsense, and the lower 4-bits of address come from Tsense. Each entry is 8 bits, and represents a fixed point value in the range of 0–4 $\mu$s. The process of generating the AEnable and BEnable lines is shown in FIG. 39.

The 256-byte table is written by the CPU 10 before printing the photo. Each 8-bit pulse duration entry in the table combines:

- Brightness settings
- Viscosity curve of ink (from the QA Chip) 5
- Rsense
- Wsense
- Tsense
- Vsense

10.1.3 Dot Counts

The MJI 15 maintains a count of the number of dots of each color fired from the printhead 2. The dot count for each color is a 32-bit value, individually cleared under processor control. Each dot count can hold a maximum coverage dot count of 69 6-inch prints, although in typical usage, the dot count will be read and cleared after each print.

While in the initial Printcam product, the consumable contains both paper and ink, it is conceivable that a different Printcam model has a replaceable ink-only consumable. The initial Printcam product can countdown the amount of millimeters remaining of paper (stored in the QA chip 5—see Section 5.2) to know whether there is enough paper available to print the desired format. There is enough ink for full coverage of all supplied paper. In the alternative Printcam product, the dot counts can be used by the CPU 10 to update the QA chip 5 in order to predict when the ink cartridge runs out of ink. The processor knows the volume of ink in the cartridge for each of C, M, and Y from the QA chip 5. Counting the number of drops eliminates the need for ink sensors, and prevents the ink channels from running dry. An updated drop count is written to the QA chip 5 after each print. A new photo will not be printed unless there is enough ink left, and allows the user to change the ink without getting a dud photo which must be reprinted.

Figure 40:
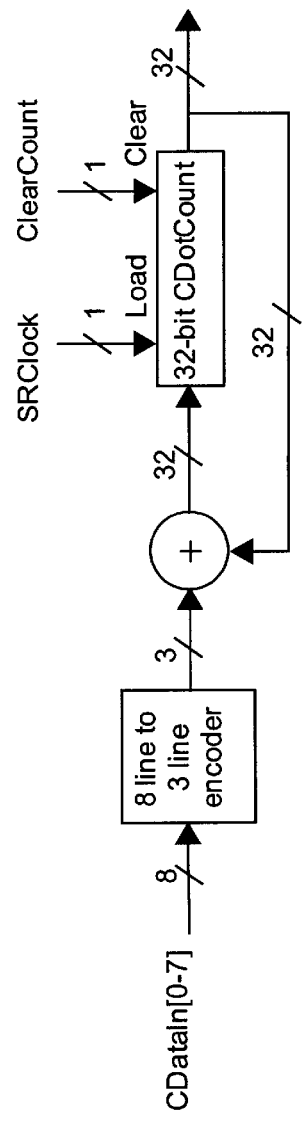
FIG. 40 shows a block diagram of dot count logic.
Figure 42:
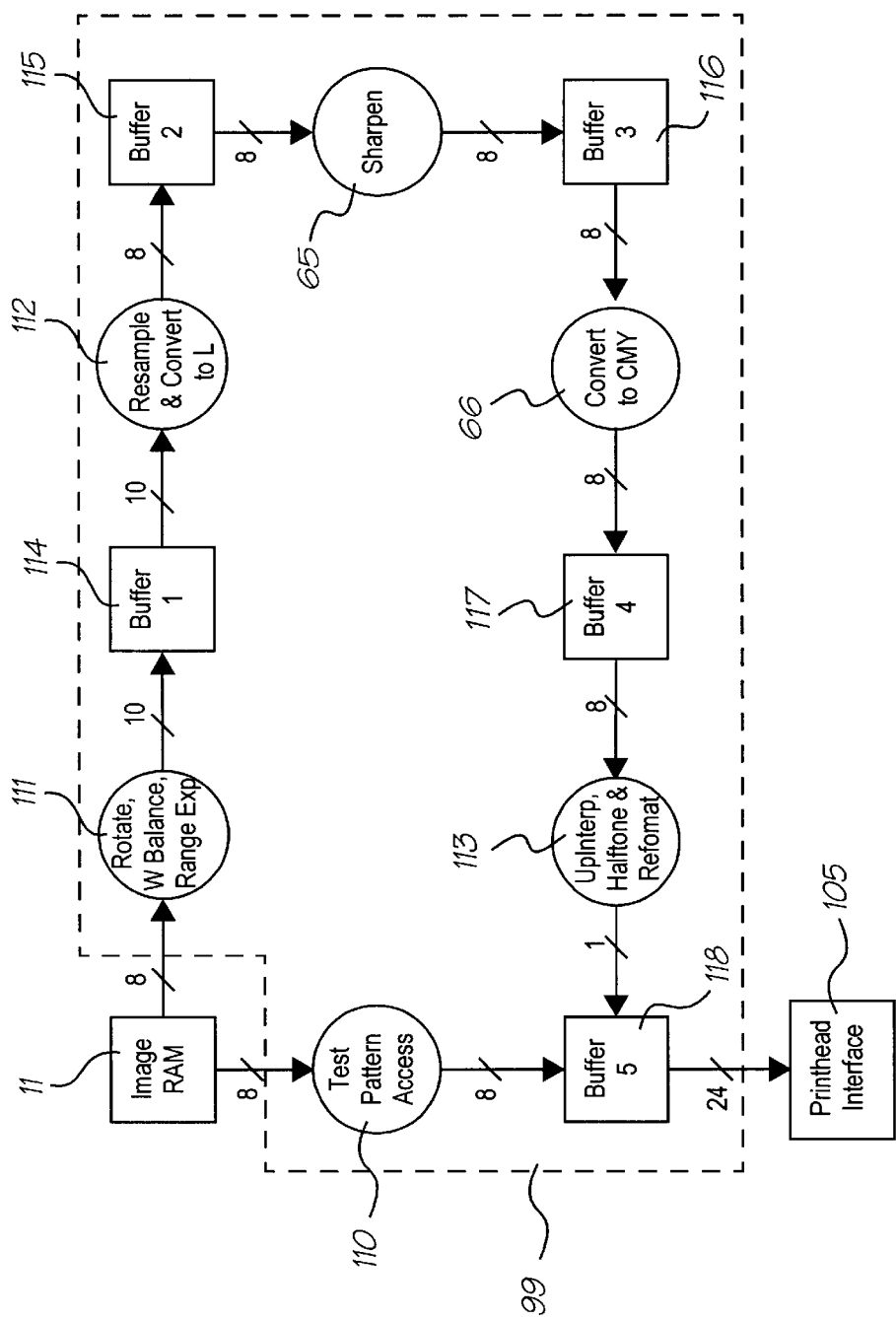
FIG. 42 shows a block diagram of the print generator unit.

The layout of the dot counter for cyan is shown in FIG. 40. The remaining 2 dot counters (MDotCount and YDotCount, for magenta and yellow respectively) are identical in structure.

10.1.4 Registers

The CPU 10 communicates with the MJI 15 via a register set. The registers allow the CPU to parameterize a print as well as receive feedback about print progress.

The following registers are contained in the MJI:

TABLE 19

Memjet Interface Registers

| RegisterName | Description |
|---|---|
| Print Parameters | |
| NumTransfers | The number of transfers required to load the printhead (usually 800). This is the number of pulses on the SRClock and the number of 24-bit data values to transfer for a given line. |
| PulseDuration | Fixed point number to determine the duration of a single pulse on the ColorEnable lines. Duration range = 0–6 $\mu s$. |
| NumLines | The number of Load/Print cycles to perform. |
| Monitoring the Print | |
| Status | The Memjet Interface's Status Register |
| LinesRemaining | The number of lines remaining to be printed. Only valid while Go=1. Starting value is NumLines. |
| TransfersRemaining | The number of transfers remaining before the Printhead is considered loaded for the current line. Only valid while Go=1. |
| SenseSegment | The 8-bit value to place on the Cyan data lines during a subsequent feedback SenseSegSelect pulse. Only 1 of the 8 bits should be set, corresponding to one of the 8 segments. |
| SetAllNozzles | If non-zero, the 24-bit value written to the printhead during the LoadDots process is all 1s, so that all nozzles will be fired during the subsequent PrintDots process. This is used during the preheat and cleaning cycles. If 0, the 24-bit value written to the printhead comes from the Print Generator Unit. This is the case during the actual printing of the photo and any test images. |
| Actions | |
| Reset | A write to this register resets the MJI, stops any loading or printing processes, and loads all registers with 0. |
| SenseSegSelect | A write to this register with any value clears the Feedback bit of the Status register, and sends a pulse on the SenseSegSelect line if the LoadingDots and PrintingDots status bits are all 0. If any of the status bits are set, the Feedback bit is cleared and nothing more is done. Once the various sense lines have been tested, the values are placed in the Tsense, Vsense. Rsense, and Wsense registers, and then the Feedback bit of the Status register is set. The feedback continues during any subsequent print operations. |
| Go | A write of 1 to this bit starts the LoadDots/PrintDots cycles. A total of NumLines lines are printed, each containing NumTransfers 24-bit transfers. As each line is printed, LinesRemaining decrements, and TransfersRemaining is reloaded with NumTransfers again. The status register contains print status information. Upon completion of NumLines, the loading/printing process stops and the Go bit is cleared. During the final print cycle, nothing is loaded into the printhead. A write of 0 to this bit stops the print process, but does not clear any other registers. |

TABLE 19-continued

Memjet Interface Registers

| RegisterName | Description |
|---|---|
| ClearCounts | A write to this register clears the CDotCount, MDotCount, and YDotCount, registers if bits 0, 1, or 2 respectively are set. Consequently a write of 0 has no effect. |
| Feedback | |
| Tsense | Read only feedback of Tsense from the last SenseSegSelect pulse sent to segment SenseSegment. Is only valid if the FeedbackValid bit of the Status register is set. |
| Vsense | Read only feedback of Vsense from the last SenseSegSelect pulse sent to segment SenseSegment. Is only valid if the FeedbackValid bit of the Status register is set. |
| Rsense | Read only feedback of Rsense from the last SenseSegSelect pulse sent to segment SenseSegment. Is only valid if the FeedbackValid bit of the Status register is set. |
| Wsense | Read only feedback of Wsense from the last SenseSegSelect pulse sent to segment SenseSegment. Is only valid if the FeedbackValid bit of the Status register is set. |
| CDotCount | Read only 32-bit count of cyan dots sent to the printhead. |
| MDotCount | Read only 32-bit count of magenta dots sent to the printhead. |
| YDotCount | Read only 32-bit count of yellow dots sent to the printhead. |

The MJI's Status Register is a 16-bit register with bit interpretations as follows:

TABLE 20

MJI Status Register

| Name | Bits | Description |
|---|---|---|
| LoadingDots | 1 | If set, the MJI is currently loading dots, with the number of dots remaining to be transferred in TransfersRemaining. If clear, the MJI is not currently loading dots |
| PrintingDots | 1 | If set, the MJI is currently printing dots. If clear, the MJI is not currentiy printing dots. |
| PrintingA | 1 | This bit is set while there is a pulse on the AEnable line |
| PrintingB | 1 | This bit is set while there is a pulse on the BEnable line |
| FeedbackValid | 1 | This bit is set while the feedback values Tsense, Vsense, Rsense, and Wsense are valid. |
| Reserved | 3 | — |
| PrintingChromapod | 4 | This holds the current chromapod being fired while the PrintingDots status bit is set. |
| PrintingNozzles | 4 | This holds the current nozzle being fired while the PrintingDots status bit is set. |

10.1.5 Preheat and Cleaning Cycles

The Cleaning and Preheat cycles are simply accomplished by setting appropriate registers:

SetAllNozzles=1

Set the PulseDuration register to either a low duration (in the case of the preheat mode) or to an appropriate drop ejection duration for cleaning mode.

Set NumLines to be the number of times the nozzles should be fired

Set the Go bit and then wait for the Go bit to be cleared when the print cycles have completed.

10.2 Print Generator Unit 99

The Print Generator Unit (PGU) 99 is an implementation of most of the Print Chain described in Section 3.2, as well as providing a means of producing test patters.

Figure 41:
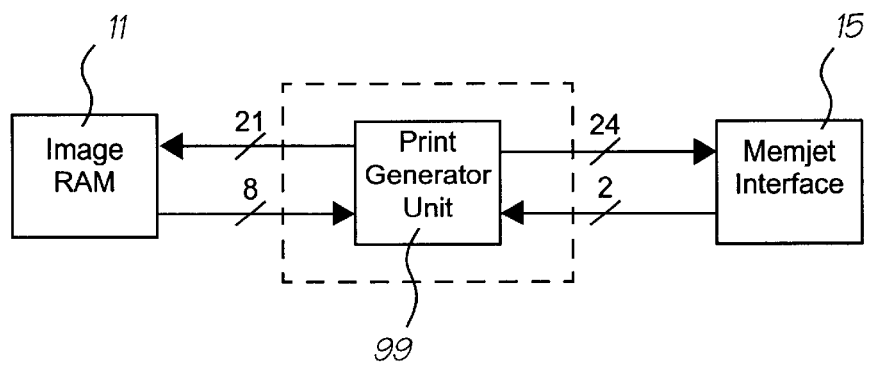
FIG. 41 shows the interface of the print generator unit.

From the simplest point of view, the PGU provides the interface between the Image RAM 11 and the Memjet Interface 15, as shown in FIG. 41. The PGU takes a planarized linear RGB obtained from a CFA format captured image from the ImageRAM, and produces a 1600 dpi dithered CMY image in real time as required by the Memjet Interface. In addition, the PGU 99 has a Test Pattern mode, which enables the CPU 10 to specify precisely which nozzles are fired during a print. The MJI 15 provides the PGU 99 with an Advance pulse once the 24-bits have been used, and an AdvanceLine pulse at the end of the line.

The PGU 99 has 2 image processing chains. The first, the Test Pattern mode, simply reads data directly from Image RAM 11, and formats it in a buffer ready for output to the MJI. The second contains the majority of Print Chain functions (see Section 3.2). The Print Chain shown in FIG. 18 contains the functions:

Gather Statistics 60

Rotate Image 61

White Balance 62

Range Expansion 63

Resample 64

Sharpen 65

Convert to CMY 66

Up-lnterpolate 67

Halftone 68

Reformat for Printer 69

The PGU 99 contains all of these functions with the exception of Gather Statistics 60. To perform the Gather Statistics step, the CPU 10 calls the Image Histogram Unit 8 three times (once per color channel), and applies some simple algorithms. The remainder of the functions are the domain of the PGU 99 for reasons of accuracy and speed: accuracy, because there would be too much memory required to hold the entire image at high accuracy, and speed, because a simple CPU 10 cannot keep up with the real-time high-speed demands of the Memjet printhead 2.

The PGU 99 takes as input a variety of parameters, including RGB to CMY conversion tables, constants for performing white balance and range expansion, scale factors for resampling, and image access parameters that allow for rotation.

The two process chains can be seen in FIG. 20. The most direct chain goes from the Image RAM 11 to Buffer 5 via the Test Pattern Access process 110. The other chain consists of 5 processes, all running in parallel. The first process 111 performs Image Rotation, White Balance and Range Expansion. The second process 112 performs Resampling. The third process 65 performs sharpening, the fourth process 66 performs color conversion. The final process 113 performs the up-interpolation, halftoning, and reformatting for the printer. The processes are connected via buffers, only a few bytes between some processes, and a few kilobytes for others.

We look at these processes and buffers in a primarily reverse order, since the timing for the printhead drives the entire process. Timings for particular processes and buffer size requirements are then more apparent. In summary however, the buffer sizes are shown in Table 21.

TABLE 21

Buffer sizes for Print Generator Unit

| Buffer | Size (bytes) | Composition of Buffer |
|---|---|---|
| Buffer 1 | 188 | Red Buffer = 6 lines of 6 entries @ 10-bits each = 45 bytes<br>Blue Buffer = 6 lines of 6 entries @ 10-bits each = 45 bytes<br>Green Buffer = 13 lines of 6 entries @ 10-bits each = 97.5 bytes |
| Buffer 2 | 24 | 6 × 4 RAM<br>3 lines of 4 entries of L @ 8-bits each = 12 bytes<br>3 colors × 4 entries @ 8-bits each = 12 bytes |
| Buffer 3 | 3 | 3 colors (RGB) @ 8-bits each |
| Buffer 4 | 23,040 | 3 colors (CMY) × 6 lines × 1280 contone pixels @ 8-bits each |
| Buffer 5 | 9 | 3 × 24 bits |
| TOTAL | 23,264 | |

Apart from a number of registers, some of the processes have significant lookup tables or memory components. These are summarized in Table 22.

TABLE 22

Memory requirements within PGU Processes

| Unit | Size (bytes) | Composition of Requirements |
|---|---|---|
| Rotate/White Balance/Range Expand | 0 | |
| Resample/Convert to L | 1,152 | 3 kernels, each 64 × 4 × 12-bits |
| Sharpen | 0 | |
| Convert to CMY | 14,739 | 3 conversion tables, each 17 × 17 × 17 × 8-bits |
| UpInterpolate/Halftone/Reformat | 2,500 | Dither Cell, 50 × 50 × 8-bits |
| Test Pattern Access | 0 | |
| TOTAL | 18,391 | |

10.2.1 Test Pattern Access

The Test Pattern Access process 110 is the means by which test patterns are produced. Under normal user circumstances, this process will not be used. It is primarily for diagnostic purposes.

The Test Pattern Access 110 reads the Image RAM 11 and passes the 8-bit values directly to Buffer 5 118 for output to the Memjet Interface. It does not modify the 8-bit values in any way. The data in the Image RAM 11 would be produced by the CPU 10 using the Image Access Unit 9.

The data read from Image RAM 11 is read in a very simple wraparound fashion. Two registers are used to describe the test data: the start address of the first byte, and the number of bytes. When the end of the data is reached, the data is read again from the beginning.

Figure 43:
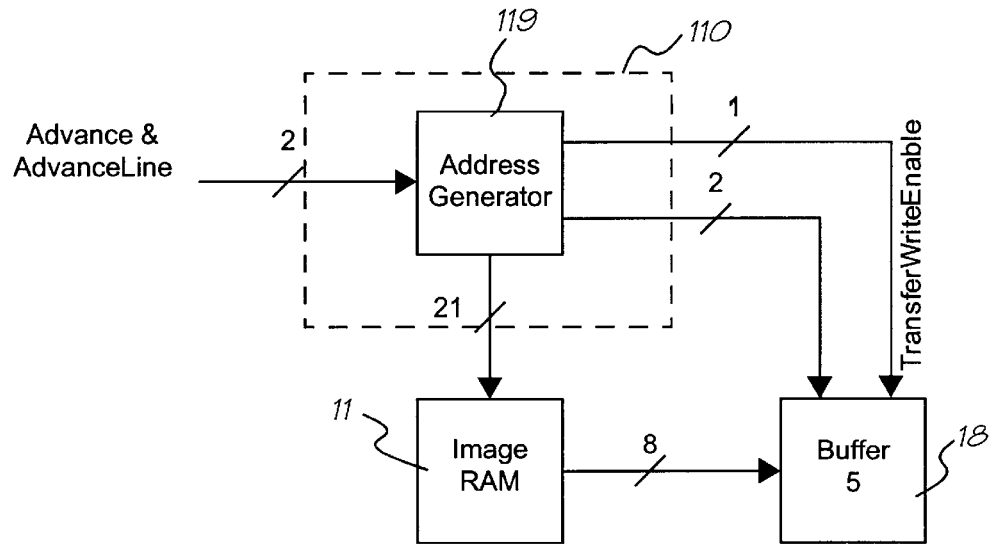
FIG. 43 shows a block diagram of the test pattern access unit.

The structure of the Test Pattern Access Unit 110 is shown in FIG. 43.

As can be seen in FIG. 43, the Test Pattern Access Unit 110 is little more than an Address Generator 119. When started, and with every AdvanceLine signal, the generator reads 3 bytes, produces a TransferWriteEnable pulse, reads the next 3 bytes, and then waits for an Advance pulse. At the Advance pulse, the TransferWriteEnable pulse is given, the next 3 bytes are read, and the wait occurs again. This continues until the AdvanceLine pulse, whereupon the process begins again from the current address.

In terms of reading 3 bytes, the Address Generator 119 simply reads three 8-bit values from ImageRAM 11 and writes them to Buffer 5 118. The first 8-bit value is written to Buffer 5's 8-bit address 0, the next is written to Buffer 5's 8-bit address 1, and the third is written to Buffer 5's 8-bit address The Address Generator 119 then waits for an Advance pulse before doing the same thing again.

The addresses generated for the Image RAM 11 are based on a start address and a byte count as shown in Table 23.

TABLE 23

Test Pattern Access Registers

| Register Name | Description |
| --- | --- |
| TestModeEnabled | If 1, TestMode is enabled. If 0, TestMode is not enabled. |
| DataStart | Start Address of test data in Image RAM |
| DataLength | Number of 3 bytes in test data |

The following pseudocode illustrates the address generation. The AdvanceLine and Advance pulses are not shown.

Do Forever
   Adr=DataStart
   Remaining=DataLength
   Read Adr into Buffer 5 (0), Adr=Adr+1
   Read Adr into Buffer 5 (1), Adr=Adr+1
   Read Adr into Buffer 5 (2), Adr=Adr+1
   Remaining=Remaining−1
   if (Remaining=0)
     Remaining=DataLength
EndDo It is the responsibility of the CPU 10 to ensure that the data is meaningful for the printhead 2. Byte 0 is the nozzle-fire data for the 8 segments of cyan (bit 0=segment 0 etc.), Byte 1 is the same for magenta, and Byte 2 for yellow. Alternate sets of 24 bits are for odd/even pixels separated by 1 horizontal dot line.

10.2.2 Buffer 5 118

Buffer 5 118 holds the generated dots from the entire Print Generation process. Buffer 5 consists of a 24-bit shift register to hold dots generated one at a time from the UHRU 113 (Upinterpolate-Halftone and Reformat Unit), 3 8-bit registers to hold the data generated from the TPAU (Test Pattern AccessUnit), and a 24-bit register used as the buffer for data transfer to the MJI (Memjet Interface). The Advance pulse from the MJI loads the 24-bit Transfer register with all 24-bits, either from the 3 8-bit registers or the single 24-bit shift register.

Figure 44:
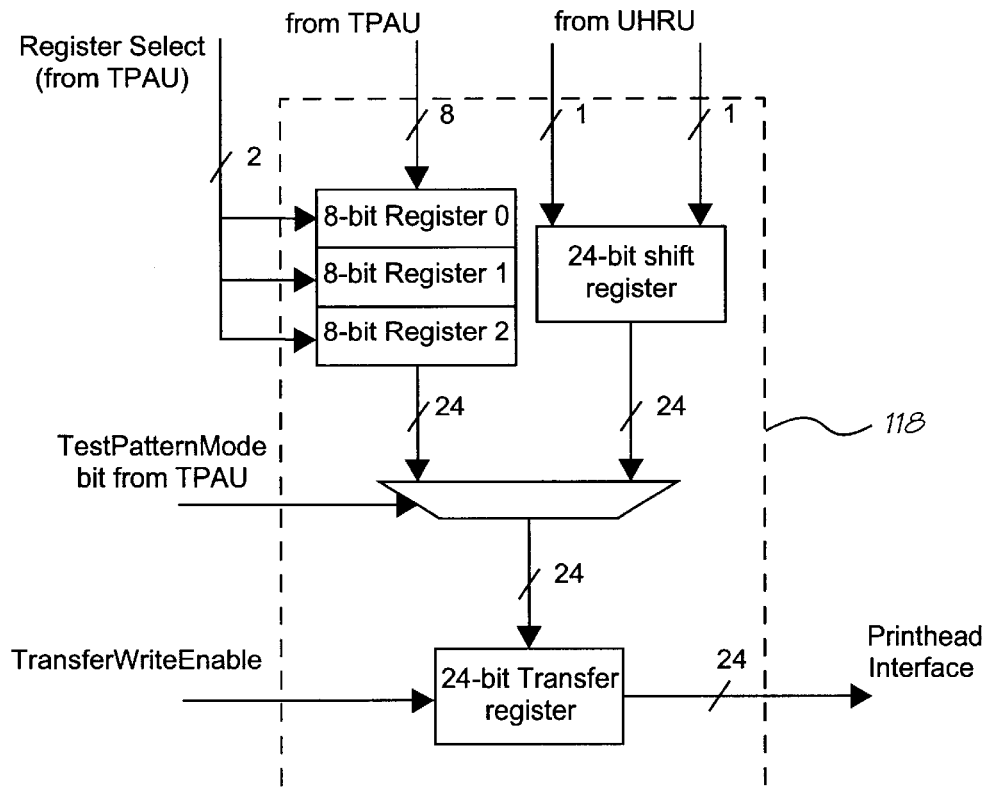
FIG. 44 shows a block diagram of Buffer 5.

Buffer 5 therefore acts as a double buffering mechanism for the generated dots, and has a structure as shown in FIG. 44.

10.2.3 Buffer 4 117

Buffer 4 117 holds the calculated CMY intermediate resolution (1280-res) contone image. Buffer 4 is generated by the Color Conversion process 66, and accessed by the Up-interpolate, Halftone and Reformat process 113 in order to generate output dots for the printer.

The size of the Contone Buffer is dependent on the physical distance between the nozzles on the printhead. As dots for one color are being generated for one physical line, dots for a different color on a different line are being generated. The net effect is that 6 different physical lines are printed at the one time from the printer—odd and even dots from different output lines, and different lines per color. This concept is explained and the distances are defined in Section 2.1.1.

The practical upshot is that there is a given distance in high-res dots from the even cyan dots through the magenta dots to the odd yellow dots. In order to minimize generation of RGB and hence CMY, the medium res contone pixels that generate those high-res dots are buffered in Buffer 4.

Since the ratio of medium-res lines to high-res lines is 1:5, each medium res line is sampled 5 times in each dimension. For the purposes of buffer lines, we are only concerned with 1 dimension, so only consider 5 dot lines coming from a single pixel line. The distance between nozzles of different colors is 4–8 dots (depending on Memjet parameters). We therefore assume 8, which gives a separation distance of 16 dots, or 17 dots in inclusive distance. The worst case scenario is that the 17 dot lines includes the last dot line from a given pixel line. This implies 5 pixel lines, with dot lines generated as 1, 5, 5, 5, 1, and allows an increase of nozzle separation to 10.

To ensure that the contone generation process writing to the buffer does not interfere with the dot generation process reading from the buffer, we add an extra medium-res line per color, for a total of 6 lines per color.

Figure 45:
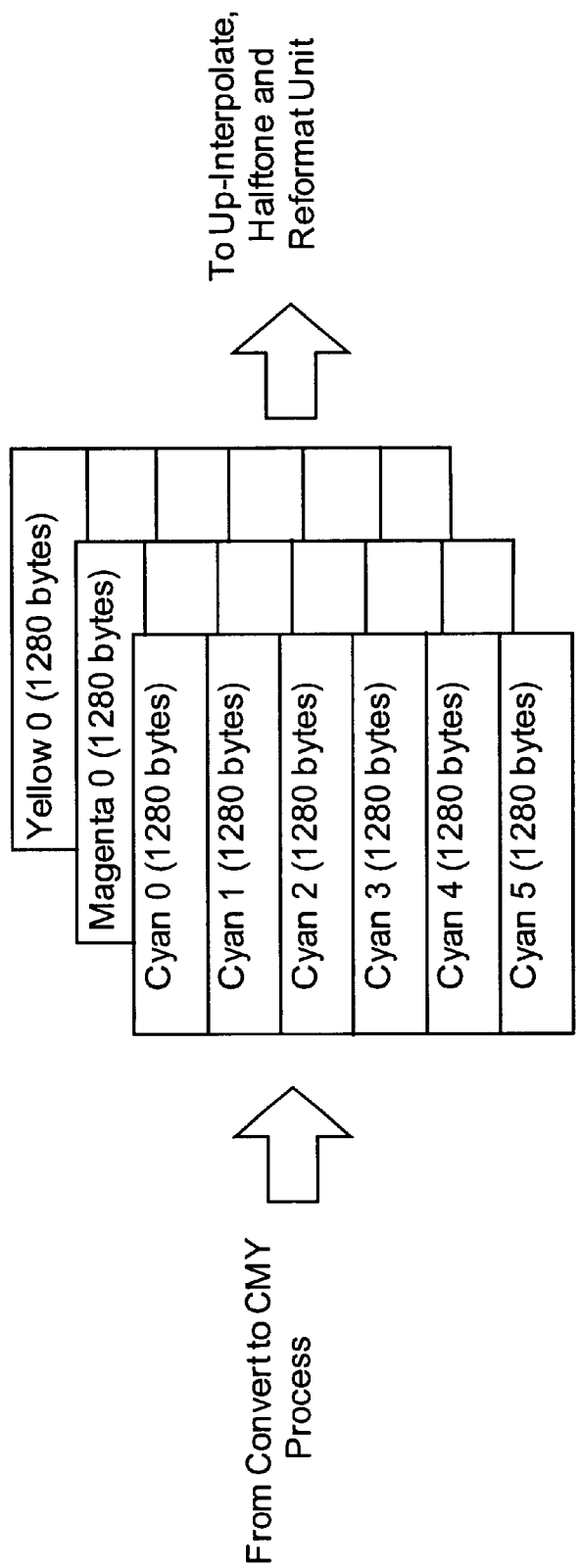
FIG. 45 shows a block diagram of Buffer 4.

The contone buffer is therefore 3 colors of 6 lines, each line containing 1280 8-bit contone values. The total memory required is 3×6×1280=23040 bytes (22.5 KBytes). The memory only requires a single 8-bit read per cycle, and a single 8-bit write every 25 cycles (each contone pixel is read 25 times). The structure of Buffer 4 is shown in FIG. 45.

Buffer 4 can be implemented as single cycle double access (read and write) RAM running at the nominal speed of the printhead dot generation process, or can be implemented as RAM running 4% faster with only a single read or write access per cycle.

Buffer 4 is set to white (all 0) before the start of the print process.

10.2.4 Upinterpolate, Halftone, and Reformat for Printer

Although the Up-Interpolate, Halftone, and Reformat For Printer tasks 113 are defined as separate tasks by Section 3.2.8, Section 3.2.9 and Section 3.2.10 respectively, they are implemented as a single process in the hardware implementation of the PCP 13.

The input to the Up-interpolate, Halftone and Reformat Unit (UHRU) 113 is the contone buffer (Buffer 4) 117 containing the pre-calculated CMY 1280-res (intermediate resolution) image. The output is a set of 24-bit values in the correct order to be sent to the Memjet Interface 15 for subsequent output to the printhead via Buffer 5 118. The 24 output bits are generated 1 bit at a time, and sent to the 24-bit shift register in Buffer 5 118.

The control of this process occurs from the Advance and AdvanceLine signals from the MJI 15. When the UHRU 113 starts up, and after each AdvanceLine pulse, 24 bits are produced, and are clocked into the 24-bit shift register of Buffer 5 by a ShiftWriteEnable signal. After the 24th bit has been clocked in, a TransferWriteEnable pulse is given, and the next 24 bits are generated. After this, the UHRU 113 waits for the Advance pulse from the MJI. When the Advance pulse arrives, the TransferWriteEnable pulse is given to Buffer 5 118, and the next 24 bits are calculated before waiting again. In practice, once the first Advance pulse is given, synchronization has occurred and future Advance pulses will occur every 24 cycles thereafter.

Figure 46:
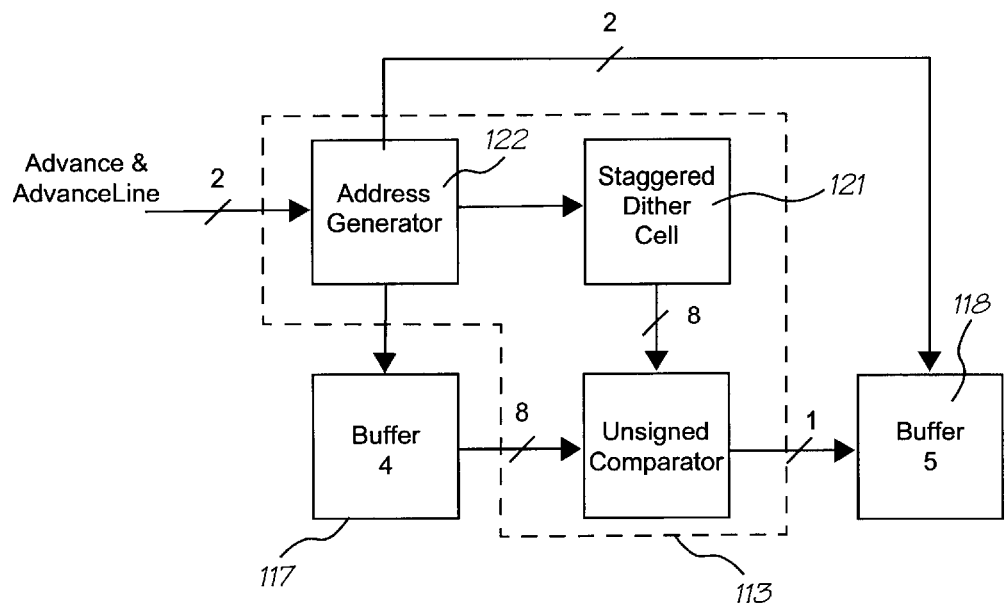
FIG. 46 shows a block diagram of the Upinterpolate, Halftone and Reformat process.
Figure 47:
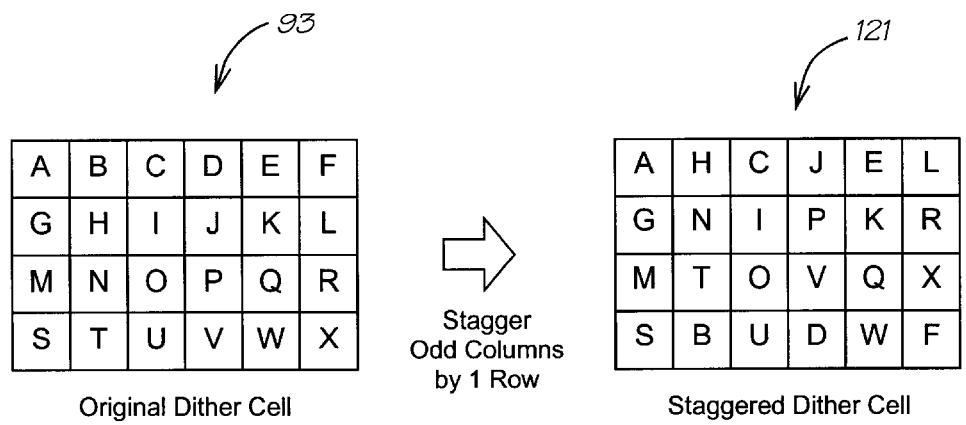
FIG. 47 shows how to map from a standard dither cell and a staggered dither cell.

The Upinterpolate, Halftone and Reformat process can be seen in FIG. 46.

The Halftone task is undertaken by the simple 8-bit unsigned comparator 120. The two inputs to the comparator come from the Staggered Dither Cell 121 and Buffer 4 117. The order that these values are presented to the Unsigned Comparator 120 is determined by the Address Generator State Machine 122, which ensures that the addresses into the 1280-res image match the segment-oriented order required for the printhead. The Address Generator State Machine 122 therefore undertakes the Up-Interpolation and Reformatting for Printer tasks. Rather than simply access an entire line at a time at high resolution, and then reformat the line according to the printer lookup requirements (as described in Section 3.2.10), the reformatting is achieved by the appropriate addressing of the contone buffer (Buffer 4) 117, and ensuring that the comparator 120 uses the correct lookup from the dither cell 121 to match the staggered addresses.

The Halftoning task is the same as described by Section 3.2.9. However, since the dot outputs are generated in the correct order for the printhead, the size of the Dither Cell 121 is chosen so that it divides evenly into 800. Consequently a given position in the dither cell for one segment will be the same for the remaining 7 segments. A 50×50 dither cell provides a satisfactory result. As described in Section 3.2.9, the same position in the dither cell can be used for different colors due to the fact that different lines are being generated at the same time for each of the colors. The addressing for the dither cell is therefore quite simple. We start at a particular row in the Staggered Dither cell (e.g. row 0). The first dither cell entry used is Entry 0. We use that entry 24 times (24 cycles) to generate the 3 colors for all 8 segments, and then advance to Entry 1 of row 0. After Entry 49, we revert back to Entry 0. This continues for all 19,200 cycles in order to generate all 19,200 dots. The Halftone Unit then stops and waits for the AdvanceLine pulse which causes the address generator to advance to the next row in the dither cell.

The Staggered Dither cell 121 is so called because it differs from a regular dither cell by having the odd and even lines staggered. This is because we generate odd and even pixels (starting from pixel 0) on different lines, and saves the Address Generator 122 from having to advance to the next row and back again on alternative sets of 24 pixels. FIG. 25 shows a simple dither cell 93, and how to map it to a staggered dither cell 121 of the same size. Note that for determining the "oddness" of a given position, we number the pixels in a given row 0, 1, 2 etc.

The 8-bit value from Buffer 4 117 is compared (unsigned) to the 8-bit value from the Staggered Dither Cell 121. If the Buffer 4 pixel value is greater than or equal to the dither cell value, a "1" bit is output to the shift register of Buffer 5 118. Otherwise a "0" bit is output to the shift register of Buffer 5.

In order to halftone 19,200 contone pixels, 19,200 contone pixels must be read in. The Address Generator Unit 122 performs this task, generating the addresses into Buffer 4 117, effectively implementing the Upinterpolate task. The address generation for reading Buffer 4 is slightly more complicated than the address generation for the dither cell, but not overly so.

The Address Generator for reading Buffer 4 only begins once the first row of Buffer 4 has been written. The remaining rows of Buffer 4 are 0, so they will effectively be white (no printed dots).

Each of the 6 effective output lines has a register with an integer and fractional component. The integer portion of the register is used to select which Buffer line will be read to effectively upinterpolate the color for that particular color's odd and even pixels. 3 pixel counters are used to maintain the current position within segment 0, and a single temporary counter P_ADR (pixel address) is used to offset into the remaining 7 segments.

In summary then, address generation for reading Buffer 4 requires the following registers, as shown in Table 24.

TABLE 24

Registers Required for Reading Buffer 4

| Register Name | Size |
|---|---|
| CyanEven | 6 bits (3:3) |
| CyanOdd | 6 bits (3:3) |
| MagentaEven | 6 bits (3:3) |
| MagentaOdd | 6 bits (3:3) |
| YellowEven | 6 bits (3:3) |
| YellowOdd | 6 bits (3:3) |
| Cyan_P_ADR | 14 bits (11:3 |
| Magenta_P_ADR | 14 bits (11:3 |
| Yellow_P_ADR | 14 bits (11:3 |
| P_ADR | 11 bits (only holds integer portion of X_P_ADR) |

The initial values for the 6 buffer line registers is the physical dot distance between nozzles (remember that the fractional component is effectively a divide by 5). For example, if the odd and even output dots of a color are separated by a distance of 1 dot, and nozzles of one color are separated from the nozzles of the next by 8 dots, the initial values would be as shown in First Line column in Table 25. Once each set of 19,200 dots has been generated, each of these counters must increment by 1 fractional component, representing the fact that we are sampling each pixel 5 times in the vertical dimension. The resultant values will then be as shown in Second Line column in Table 25. Note that 5:4+1=0:0 since there are only 6 buffer lines.

TABLE 25

Example Initial Setup and Second Line Values for the 6 Buffer Line Registers

| Name | Calculation | First Line Value | First Line Buff | Second Line Value | Second Line Buff |
|---|---|---|---|---|---|
| CyanEven | Initial Position | 0:0 | 0 | 0:1 | 0 |
| CyanOdd | CyanEven + 0:1 | 0:1 | 0 | 0:2 | 0 |
| MagentaEven | CyanOdd + 1:3 (8) | 1:4 | 1 | 2:0 | 2 |
| MagentaOdd | MagentaEven + 0:1 | 2:0 | 2 | 2:1 | 2 |
| YellowEven | MagentaOdd + 1:3 (8) | 3:3 | 3 | 3:4 | 3 |
| YellowOdd | YellowEven + 0:1 | 3:4 | 3 | 4:0 | 4 |

The 6 buffer line registers then, determine which of the buffer lines is to be read for a given color's odd or even pixels. To determine which of the 1280 medium res pixels are read from the specific line of Buffer 4, we use 3 Pixel Address counters, one for each color, and a single temporary counter (P_ADR) which is used to index into each segment. Each segment is separated from the next by 800 dots. In medium res pixels this distance is 160. Since 800 is divisible exactly by 5, we only need use the integer portion of the 3 Pixel Address counters. We generate the 8 addresses for the even cyan pixels, then the 8 addresses for the even magenta, and finally the 8 addresses for the even yellow. We then do the same for the odd cyan, magenta, and yellow pixels. This process of two sets of 24 bits—24 even then 24 odd, is performed 400 times. We can then reset the Pixel Address counters (X_P_ADR) to 0 and advance the 6 buffer line registers. Every 5 line advances, the next buffer line is now free and ready for updating (by the Convert to CMY process). Table 26 lists the steps in a simple form.

TABLE 26

Address Generation for Reading Buffer 4

| # | Address | Calculation | Comment |
|---|---|---|---|
| — |  | P_ADR = Cyan_P_ADR<br>Cyan_P_ADR += 1<br>(mod5) | Generate address for even pixel in Cyan segment 0 and advance to next pixel for cyan |
| 1 | CyanEven:P_ADR | P_ADR += 160 | Advance to segment 1 (cyan) |
| 2 | CyanEven:P_ADR | P_ADR += 160 | Advance to segment 2 (cyan) |
| 3 | CyanEven:P_ADR | P_ADR += 160 | Advance to segment 3 (cyan) |
| 4 | CyanEven:P_ADR | P_ADR += 160 | Advance to segment 4 (cyan) |
| 5 | CyanEven:P_ADR | P_ADR += 160 | Advance to segment 5 (cyan) |
| 6 | CyanEven:P_ADR | P_ADR += 160 | Advance to segment 6 (cyan) |
| 7 | CyanEven:P_ADR | P_ADR += 160 | Advance to segment 7 (cyan) |
| 8 | CyanEven:P_ADR | P_ADR = Magenta_P_ADR<br>Magenta_P_ADR += 1<br>(mod5) | Generate address for even pixel in Magenta segment 0 and advance to next pixel for magenta |
| 9 | MagentaEven:P_ADR | P_ADR += 160 | Advance to segment 1 (magenta) |
| 10 | MagentaEven:P_ADR | P_ADR += 160 | Advance to segment 2 (magenta) |
| 11 | MagentaEven:P_ADR | P_ADR += 160 | Advance to segment 3 (magenta) |
| 12 | MagentaEven:P_ADR | P_ADR += 160 | Advance to segment 4 (magenta) |
| 13 | MagentaEven:P_ADR | P_ADR += 160 | Advance to segment 5 (magenta) |
| 14 | MagentaEven:P_ADR | P_ADR += 160 | Advance to segment 6 (magenta) |
| 15 | MagentaEven:P_ADR | P_ADR += 160 | Advance to segment 7 (magenta) |
| 16 | MagentaEven:P_ADR | P_ADR = Yellow_P_ADR<br>Yellow_P_ADR += 1<br>(mod 5) | Generate address for even pixel in Yellow segment 0 and advance to next pixel for yellow |
| 17 | YellowEven:P_ADR | P_ADR += 160 | Advance to segment 1 (yellow) |
| 18 | YellowEven:P_ADR | P_ADR += 160 | Advance to segment 2 (yellow) |
| 19 | YellowEven:P_ADR | P_ADR += 160 | Advance to segment 3 (yellow) |
| 20 | YellowEven:P_ADR | P_ADR += 160 | Advance to segment 4 (yellow) |
| 21 | YellowEven:P_ADR | P_ADR += 160 | Advance to segment 5 (yellow) |
| 22 | YellowEven:P_ADR | P_ADR += 160 | Advance to segment 6 (yellow) |
| 23 | YellowEven:P_ADR | P_ADR += 160 | Advance to segment 7 (yellow) |
| 24 | YellowEven:P_ADR | P_ADR = Cyan_P_ADR<br>Cyan_P_ADR += 1<br>(mod5) | Generate address for even pixel in Cyan segment 0 and advance to next pixel for cyan |
| 25 etc. | CyanOdd:P_ADR | P_ADR += 160 | Advance to segment 1 (cyan) |

The pseudocode for generating the Buffer 4 117 addresses is shown here. Note that it is as a sequential set of steps. Table 26 shows a better view of the parallel nature of the operations during the address generation.

```
% Calculate start positions
CyanEven=0:0
CyanOdd=CyanEven+0:1
MagentaEven=CyanOdd+1:3
MagentaOdd=MagentaEven+0:1
YellowEven=MagentaOdd+1:3
Yellowodd=YellowEven+0:1
Do N times (depends on print size)
   Cyan_P_ADR=0
   Magenta_P_ADR=0
   Yellow_P_ADR=0
   Do 400 times
      % generate the even pixels for the first set of 24 bits
      P_ADR=Integer portion of Cyan_P_ADR
      Cyan_P_ADR+=0:1
      Do 8 times
         ReadBuffer4 (line=CyanEven, pixel=P_ADR)
         P_ADR+=160
      EndDo
      P_ADR=Integer portion of Magenta_P_ADR
      Magenta_P_Adr+=0:1
      Do 8 times
         ReadBuffer4 (line=MagentaEven, pixel=P_ADR)
         P_ADR+=160
      EndDo
      P_ADR=Integer portion of Yellow_P_ADR
      Yellow_P_Adr+=0:1
      Do 8 times
         ReadBuffer4 (line=YellowEven, pixel=P_ADR)
         P_ADR+=160
      EndDo
      % generate the odd pixels for the first set of 24 bits
      P_ADR=Integer portion of Cyan_P_ADR
      Cyan_P_ADR+=0:1
      Do 8 times
         ReadBuffer4 (line=Cyanodd, pixel=P_ADR)
         P_ADR+=160
      EndDo
      P_ADR=Integer portion of Magenta_P_ADR
      Magenta_P_Adr+=0:1
      Do 8 times
         ReadBuffer4 (line=MagentaOdd, pixel=P_ADR)
         P_ADR+=160
      EndDo
      P_ADR=Integer portion of Yellow_P_ADR
      Yellow_P_Adr+=0:1
      Do 8 times
         ReadBuffer4 (line=YellowOdd, pixel=P_ADR)
         P_ADR+=160
      EndDo
      % Now can advance to next "line"
      CyanEven+=0:1
      CyanOdd+=0:1
      MagentaEven+=0:1
```

MagentaOdd+=0:1
YellowEven+=0:1
YellowOdd+=0:1
    EndDo
EndDo

10.2.5 Buffer 3 116

Buffer 3 is a straightforward set of 8-bit R, G, B values. These RGB values are the sharpened medium res (1280-res) pixels generated by the Sharpen process 65, and read by the Convert to CMY process 66.

It is not necessary to double buffer Buffer 3 116. This is because the read (Convert to CMY) process 66 only requires the RGB values for the first 39 cycles, while the write (Sharpen) process 65 takes 49 cycles before being ready to actually update the RGB values.

10.2.6 Convert to CMY 66

The conversion from RGB to CMY is performed in the medium resolution space (1280-res) as described in Section 3.2.7.

The conversion process 66 must produce the contone buffer pixels (Buffer 4) 117 at a rate fast enough to keep up with the Upinterpolate-Halftone-Reformat process 113. Since each contone value is used for 25 cycles (5 times in each of the x and y dimensions), the conversion process can take up to 25 cycles. This totals 75 cycles for all 3 color components.

The process as described here only requires 14 cycles per color component, with the input RGB values actually freed after 39 cycles. If the process is implemented with logic that requires access to the input RGB values for more than 49 cycles, then Buffer 3 116 will require double-buffering, since they are updated by the Sharpening process 65 after this time. The conversion is performed as tri-linear interpolation. Three 17×17×17 lookup tables are used for the conversion process: RGB to Cyan 90, RGB to Magenta 91, and RGB to Yellow 92. However, since we have 25 cycles to perform each tri-linear interpolation, there is no need for a fast tri-linear interpolation unit. Instead, 8 calls to a linear interpolation process 130 is more than adequate.

Address generation for indexing into the lookup tables is straightforward. We use the 4 most significant bits of each 8-bit color component for address generation, and the 4 least significant bits of each 8bit-color component for interpolating between values retrieved from the conversion tables. The addressing into the lookup table requires an adder due to the fact that the lookup table has dimensions of 17 rather than 16. Fortunately, multiplying a 4-bit number X by 17 is an 8-bit number XX, and therefore does not require an adder or multiplier, and multiplying a 4 bit number by $17^2$ (289) is only slightly more complicated, requiring a single add.

Although the interpolation could be performed faster, we use a single adder to generate addresses and have a single cycle interpolation unit. Consequently we are able to calculate the interpolation ion for generating a single color component from RGB in 14 cycles, as shown in Table 27. The process must be repeated 3 times in order to generate cyan, magenta, and yellow. Faster methods are possible, but not necessary.

TABLE 27

Trilinear interpolation for color conversion

| Cycle | Load | Effective Fetch | Adjust ADR register | Interpolate |
|---|---|---|---|---|
| 1 | | | ADR = 289R | |
| 2 | | | ADR = ADR + 17G | |

TABLE 27-continued

Trilinear interpolation for color conversion

| Cycle | Load | Effective Fetch | Adjust ADR register | Interpolate |
|---|---|---|---|---|
| 3 | | | ADR = ADR + B | |
| 4 | P1 | RGB | ADR = ADR + 1 | |
| 5 | P2 | RGB + 1 | ADR = ADR + 16 | |
| 6 | P1 | RG + 1B | ADR = ADR + 1 | P3 = P1 to P2 by B |
| 7 | P2 | RG + 1B + 1 | ADR = ADR + 271 | |
| 8 | P1 | R + 1GB | ADR = ADR + 1 | P4 = P1 to P2 by B |
| 9 | P2 | R + 1GB + 1 | ADR = ADR + 16 | P5 = P3 to P4 by G |
| 10 | P1 | R + 1G + 1B | ADR = ADR + 1 | P3 = P1 to P2 by B |
| 11 | P2 | R + 1G + 1B + 1 | | |
| 12 | | | | P4 = P1 to P2 by B |
| 13 | | | | P6 = P3 to P4 by G |
| 14 | | | | V = P5 to P6 by R |

As shown in Table 27, a single ADR register and adder can be used for address generation into the lookup tables. 6 sets of 8-bit registers can be used to hold intermediate results—2 registers hold values loaded from the lookup tables, and 4 registers are used for the output from the interpolation unit. Note that the input to the linear interpolation unit is always a pair of 8-bit registers P1/P2, P3/P4, and P5/P6. This is done deliberately to reduce register selection logic. In cycle 14, the "V" register 131 holds the 8-bit value finally calculated. The 8-bit result can be written to the appropriate location in Buffer 4 117 during the next cycle.

Figure 48:
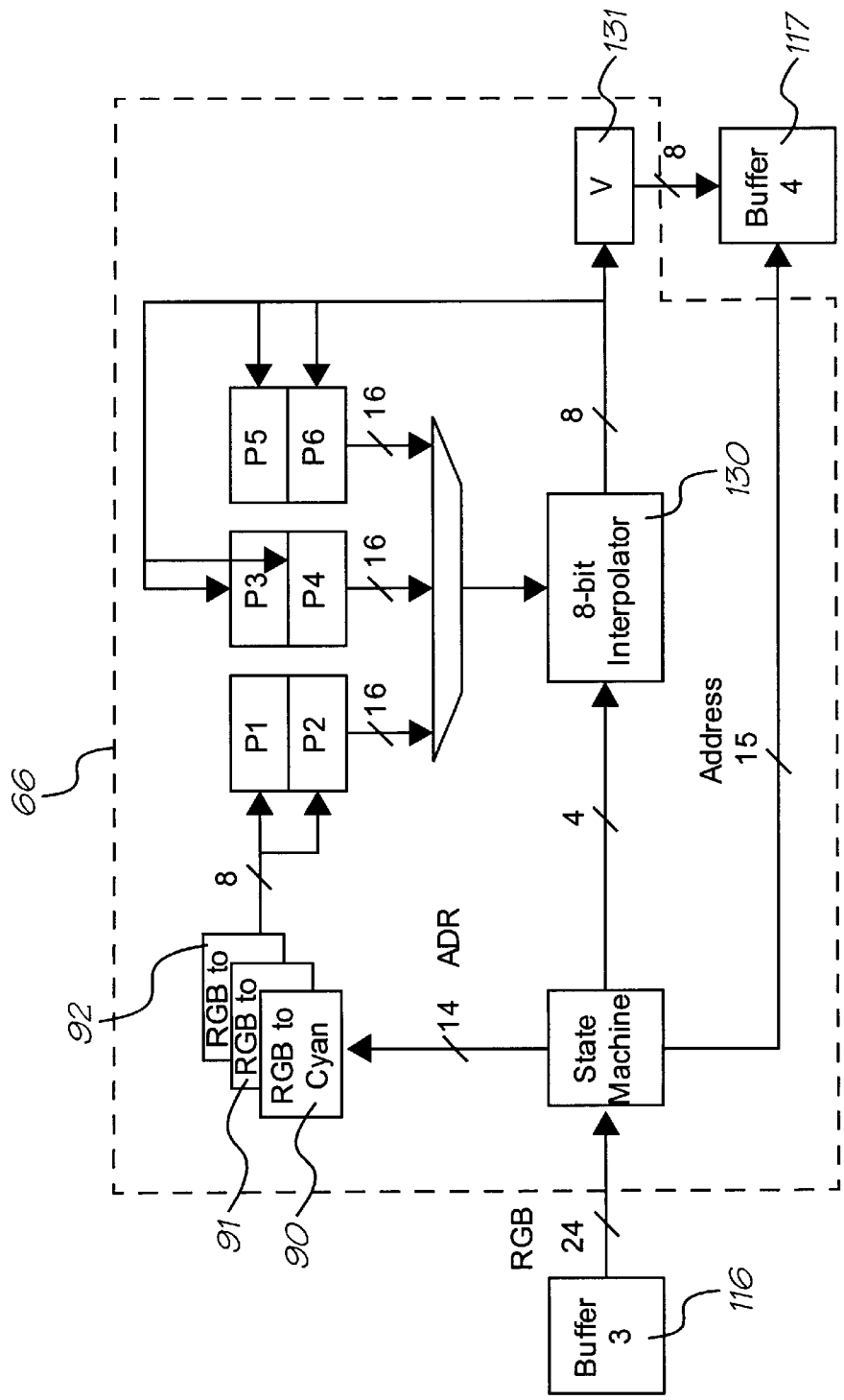
FIG. 48 shows a block diagram of the Convert RGB to CMY process/

A block diagram of the Convert to CMY process 66 can be seen in FIG. 48.

Assuming the process is first run to generate cyan, the resultant cyan contone pixel is stored into the cyan 1280-res contone buffer. The process is then run again on the same RGB input to generate the magenta pixel. This magenta contone pixel is stored into the magenta 1280-res contone buffer. Finally, the yellow contone pixel is generated from the same RGB input, and the resultant yellow pixel is stored into the yellow 1280-res contone buffer).

The address generation for writing to the contone buffer (Buffer 4) 117 is straightforward. A single address (and accompanying ColorSelect bits) is used to write to each of the three color buffers. The Cyan buffer is written to on cycle 15, the Magenta on cycle 30, and Yellow on cycle 45. The pixel address is incremented by 1 every 75 cycles (after all 3 colors have been written). The line being written to increments with wrapping once every 5 AdvanceLine pulses. The order of lines being written to is simply 0-1-2-3-4-5-0-1-2-3 etc. . . . Thus the writes (25×1280×3) balance out with the reads (19200×5).

10.2.7 Buffer 2 115

Buffer 2 accepts the output from the Resample-CreateLuminance process 112, where a complete RGB and L pixel is generated for a given pixel coordinate. The output from Buffer 2 115 goes to the Sharpen process 65, which requires a 3×3 set of luminance values 135 centered on the pixel being sharpened.

Figures 49, 50:
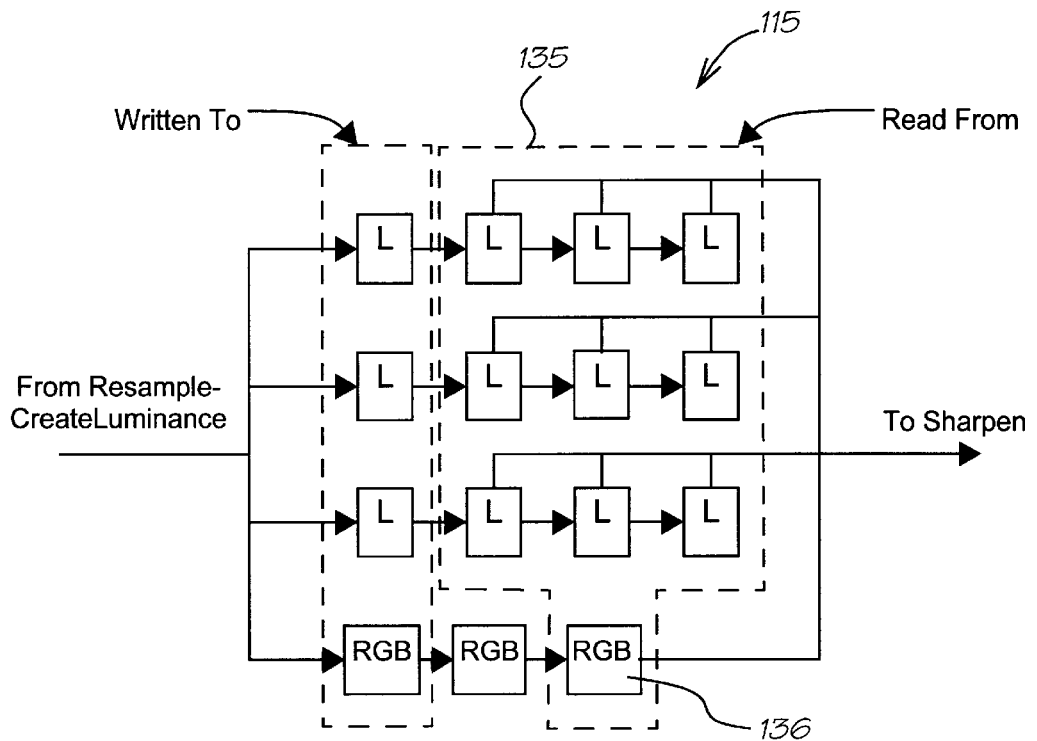
FIG. 49 shows a block diagram of Buffer 2.
FIG. 50 shows a basic high-pass spatial filter using a 3×3 kernel.

Consequently, during the sharpening process 65, there is need for access to the 3×3 array of luminance values, as well as the corresponding RGB value 136 for the center luminance pixel. At the same time, the next 3 luminance values and the corresponding RGB center value must be calculated by the Resample-CreateLuminance process 112. The logical view of accesses to Buffer 2 115 is shown in FIG. 49.

The actual implementation of Buffer 2 115 is simply as a 4×6 (24 entry) 8-bit RAM, with the addressing on read and write providing the effective shifting of values. A 2-bit column counter can be incremented with wrapping to provide a cyclical buffer, which effectively implements the equivalent of shifting the entire buffer's data by 1 column position. The fact that we don't require the fourth column of RGB data is not relevant, and merely uses 3 bytes at the saving of not having to implement complicated shift and read/write logic. In a given cycle, the RAM can either be written to or read from. The read and write processes have 75 cycles in which to complete in order to keep up with the printhead.

10.2.8 Sharpen

The Sharpen Unit 65 performs the sharpening task described in Section 3.2.6. Since the sharpened RGB pixels are stored into Buffer 3 116, the Sharpen Unit 65 must keep up with the Convert to CMY process 66, which implies a complete RGB pixel must be sharpened within 75 cycles.

The sharpening process involves a highpass filter of L (a generated channel from the RGB data and stored in Buffer 2) and adding the filtered L back into the RGB components, as described in Table 12 within Section 3.2.6.2 on page 35. The highpass filter used is a basic highpass filter using a 3×3 convolution kernel, as shown in FIG. 50.

The high pass filter is calculated over 10 cycles. The first cycle loads the temporary register 140 with 8 times the center pixel value (the center pixel shifted left by 3 bits). The next 8 cycles subtract the remaining 8 pixel values, with a floor of 0. Thus the entire procedure can be accomplished by an adder. Cycle 10 involves the multiplication of the result by a constant 141. This constant is the representation of 1/9, but is a register to allow the amount to altered by software by some scale factor.

The total amount is then added to the R, G, and B values (with a ceiling of 255) and written to Buffer 3 during cycles 72, 73, and 74. Calculating/writing the sharpened RGB values during the last 3 cycles of the 75 cycle set removes the need for double buffering in Buffer 3.

Figure 51:
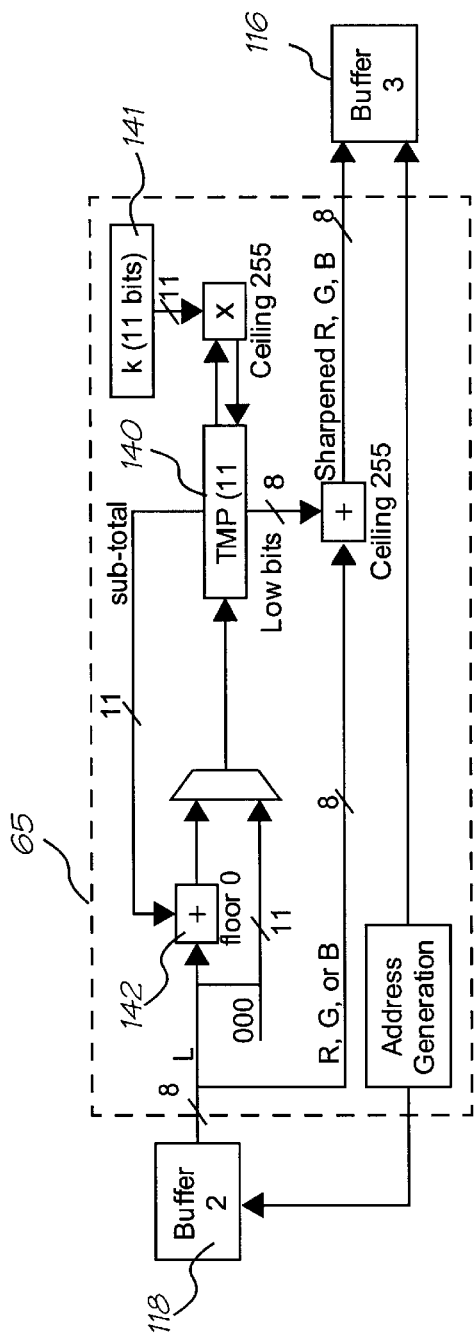
FIG. 51 shows a block diagram of the sharpen unit.

The structure of the Sharpen unit can be seen in FIG. 51.

The adder unit 142 connected to Buffer 2 115 is a subtractor with a floor of 0. TMP 140 is loaded with 8× the first L value during cycle 0 (of 75), and then the next 8 L values are subtracted from it. The result is not signed, since the subtraction has a floor of 0.

During the 10th cycle (Cycle 9), the 11 bit total in TMP 140 is multiplied by a scale factor (typically 1/9, but under software control so that the factor can be adjusted) and written back to TMP 140. Only 8 integer bits of the result are written to TMP (the fraction is truncated), so the limit from the multiply unit is 255. If a scale factor of ⅑ is used, the maximum value written will be 226 (255×⅞). The scale factor is 8 bits of fraction, with the high bit representing ⅛. The variable scale factor can take account of the fact that different print formats are the result of scaling the CFA image by a different amount (and thus the 3×3 convolution will produce correspondingly scaled results).

The sharpened values for red, green, and blue are calculated during Cycle 72, Cycle 73, and Cycle 74, and written to the R, G, and B registers of Buffer 3 116, one write per cycle. The calculation performed in these 3 cycles is simply the addition of TMP to Buffer 2's R, G, and B corresponding to the center pixel.

Address Generation is straightforward. Writing to Buffer 3 116 is simply R, G, and B in cycles 72, 73, and 74 respectively. Reading from Buffer 2 115 makes use of the cyclical nature of Buffer2. The address consists of a 2-bit column component (representing which of the 4 columns should be read), and a 3-bit value representing L1, L2, L3, R, G, or B. The column number starts at 1 each line and increments (with wrapping) every 75 cycles. The order of reading Buffer 2 is shown in Table 28. The C register is the 2-bit column component of the address. All addition on C is modulo 4 (wraps within 2 bits.

TABLE 28

| Read Access to Buffer 2 during 75 Cycle set | | |
|---|---|---|
| Cycle | Address | Update C |
| 0 | C, L2 | C = C − 1 |
| 1 | C, L1 | |
| 2 | C, L2 | |
| 3 | C, L3 | C = C + 1 |
| 4 | C, L1 | |
| 5 | C, L3 | C = C + 1 |
| 6 | C, L1 | |
| 7 | C, L2 | |
| 8 | C, L3 | C = C − 1 |
| 9–71 | No access | |
| 72 | C, R | |
| 73 | C, G | |
| 74 | C, B | C = C − 1 |

After Cycle 74, the C register holds the column number for the next calculation set, thus making the fetch during the next Cycle 0 valid.

Sharpening can only begin when there have been sufficient L and RGB pixels written to Buffer 2 (so that the highpass filter is valid). The sharpen process must therefore stall until the Buffer 2 write process has advanced by 3 columns.

10.2.9 Buffer 1 114

Buffer 1 holds the white-balanced and range-expanded pixels at the original capture spatial resolution. Each pixel is stored with 10 bits of color resolution, compared to the image RAM image storage color resolution of 8 bits per pixel.

Figure 52:
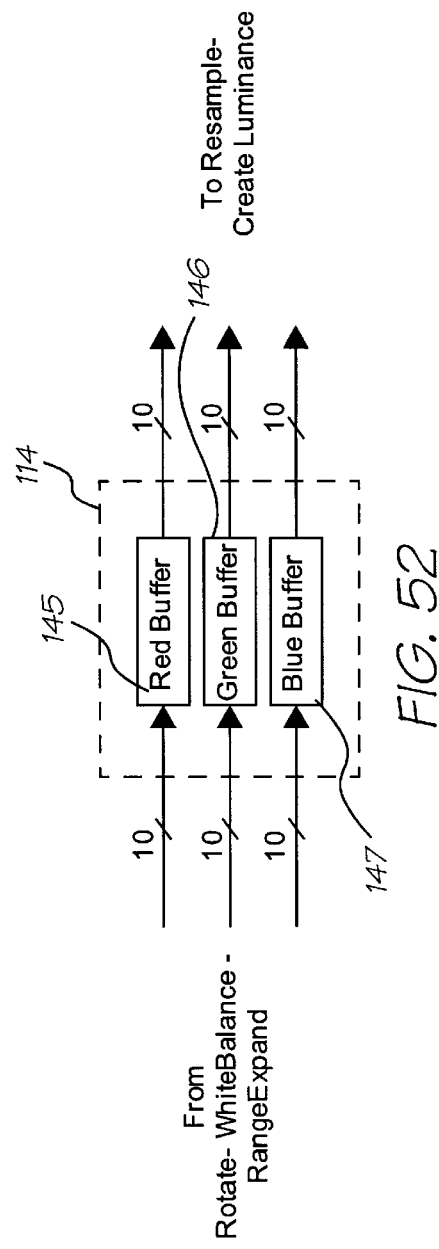
FIG. 52 shows the structure of Buffer 1.

Buffer 1 is arranged as 3 separately addressable buffers—one for each color plane of red 145, green 146, and blue 147. A simple overview of the buffers is shown in FIG. 52.

During the course of 75 cycles, 16 entries are read from each of the 3 buffers 3 times by the Resampling process 112, and up to 29 new values are written to the 3 buffers (the exact number depends on the scale factor and the current sub-pixel position during resampling).

The buffers must be wide enough so that the reading and writing can occur without interfering with one another. During the read process, 4 pixels are read from each of 6 rows. If the scale factor is very large (e.g. we are scaling up to Panoramic), the same input pixels can be read multiple times (using a different kernel position for resampling). Eventually, however, the next pixels will be required. If we are not scaling up so much, the new pixels may be required before the next pixel generation cycle (i.e. within 75 clock cycles).

Looking at the scale factors in Table 9 and Table 11, the worst case for scaling is the Passport format 31:

The green plane has a Δ value for Passport of 1.5625, indicating that 4 locations can be contained within 6 CFA pixel positions. However, each row of green samples only holds every alternate pixel. This means that only 4 samples are required per row (worst case is 4, not 3, due to a worst case initial position). Movement in Y indicates the requirement of an additional sample column, making 5. Finally, an additional sample column is required for writing. This gives a total of 6 samples per row. 7 rows are required for a single sample. To generate the 3 sets of RGB pixels for each x position, the maximum movement in y will be 4 rows (3.125=2×1.5625). Movement X adds one sample row above and below. Consequently a total of 13 rows are required. For more details see Section 10.2.10.

The red and blue planes have a Δ value for Passport of 0.78125, indicating that 4 locations can be contained within 4 samples. An additional sample is required for writing while the remaining 4 are being read. This gives a total of 5 samples per row, which is further increased to 6 samples to match the green plane (for startup purposes). 6 rows are required to cater for movement in y. For more details see Section 10.2.10.

Each sub-buffer is implemented as a RAM with decoding to read or write a single 10-bit sample per cycle. The sub-buffers are summarized in Table 29, and consume less than 200 bytes.

TABLE 29

Sub-Buffer Summary

| Buffer | Composition | Bits |
| --- | --- | --- |
| Red Buffer | 6 rows × 6 samples × 10-bits | 360 |
| Blue Buffer | 6 rows × 6 samples × 10-bits | 360 |
| Green Buffer | 13 rows × 6 samples × 10 bits | 780 |
| TOTAL | | 1500 |

10.2.10 Resample and Create Luminance Channel

The Resample and Create Luminance Channel process 112 is responsible for generating the RGB pixel value in medium resolution space by appropriate resampling the white-balanced and range-expanded R, G, and B planar images, as described in Section 3.2.5 on page 28. In addition, the luminance values for the given RGB pixel, as well as the luminance values for the pixel above and below the RGB pixel must be generated for use in the later sharpening process.

The time allowed for producing the RGB value and 3 L values is 75 cycles. Given that L is simply the average of the minimum and maximum of R, G, and B for a given pixel location (see Section 3.2.6.1), we must effectively produce RGB values for 3 pixel coordinates—the pixel in question, and the pixel above and below. Thus we have 75 cycles in which to calculate the 3 medium res RGB samples and their corresponding L values.

Buffering L values (and hence RGB values) to save recalculation requires too much memory, and in any case, we have sufficient time to generate the RGB values. Buffer 4 117 contains medium res pixels, but cannot be used since it holds sharpened CMY pixels (instead of unsharpened RGB pixels).

10.2.10.1 Resampling

The resampling process can be seen as 3 sets of RGB generation, each of which must be completed within 25 cycles (for a total maximum elapsed time of 75 cycles). The process of generating a single RGB value can in turn be seen as 3 processes performed in parallel: the calculation of R, the calculation of G, and the calculation of B, all for a given medium resolution pixel coordinate. The theory for generating each of these values can be found in Section 3.2.5, but the upshot is effectively running three image reconstruction filters, one on each channel of the image. In the case of the PCP, we perform image reconstruction with 5 sample points, requiring 4 coefficients in the convolution kernel (since one coefficient is always 0 and thus the sample point is not required).

Figure 53:
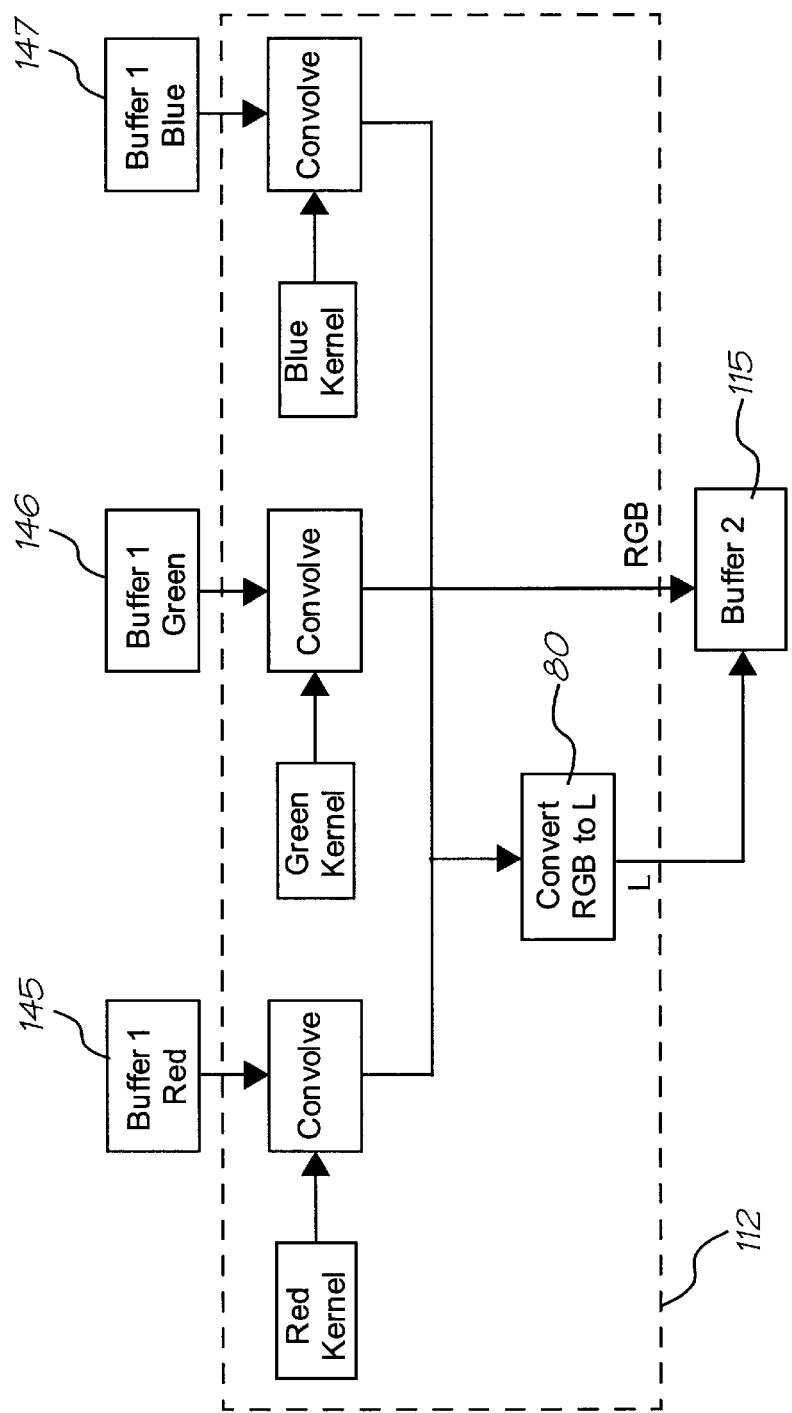
FIG. 53 shows a block diagram of the Resample and Create Luminance Channel process.

Consequently, calculation of the medium resolution R pixel is achieved by running an image reconstruction filter on the R data. Calculation of the medium resolution G pixel is achieved by running an image reconstruction filter on the G data, and calculation of the medium resolution B pixel is achieved by running an image reconstruction filter on the B data. Although the kernels are symmetric in x and y, they are not the same for each color plane. R and B are likely to be the same kernel due to their similar image characteristics, but the G plane, due to the rotation required for image reconstruction, must have a different kernel. The high level view of the process can be seen in FIG. 53. Address generation is not shown.

The resampling process can only begin when there are enough pixels in Buffer1 for the current pixel line being generated. This will be the case once 4 columns of data have been written to each of the color planes in Buffer 1 114. The Resampling process 112 must stall until that time.

To calculate a given color plane's medium resolution pixel value, we have 25 cycles available. To apply the kernel to the 4×4 sample area, we apply the 1D kernel (indexed by x) on each of the 4 rows of 4 input samples. We then apply the 1D kernel (indexed by y) on the resultant 4 pixel values. The final result is the output resampled pixel. Applying a single coefficient each cycle gives a total of 16 cycles to generate the 4 intermediate values, and 4 cycles to generate the final pixel value, for a total of 20 cycles.

With regards to precision, the input pixels are each 10 bits (8:2), and kernel coefficients are 12 bits. We keep 14 bits of precision during the 4 steps of each application of the kernel (8:6), but only save 10 bits for the result (8:2). Thus the same convolve engine can be used when convolving in x and y. The final output or R, G, or B is 8 bits.

Figure 54:
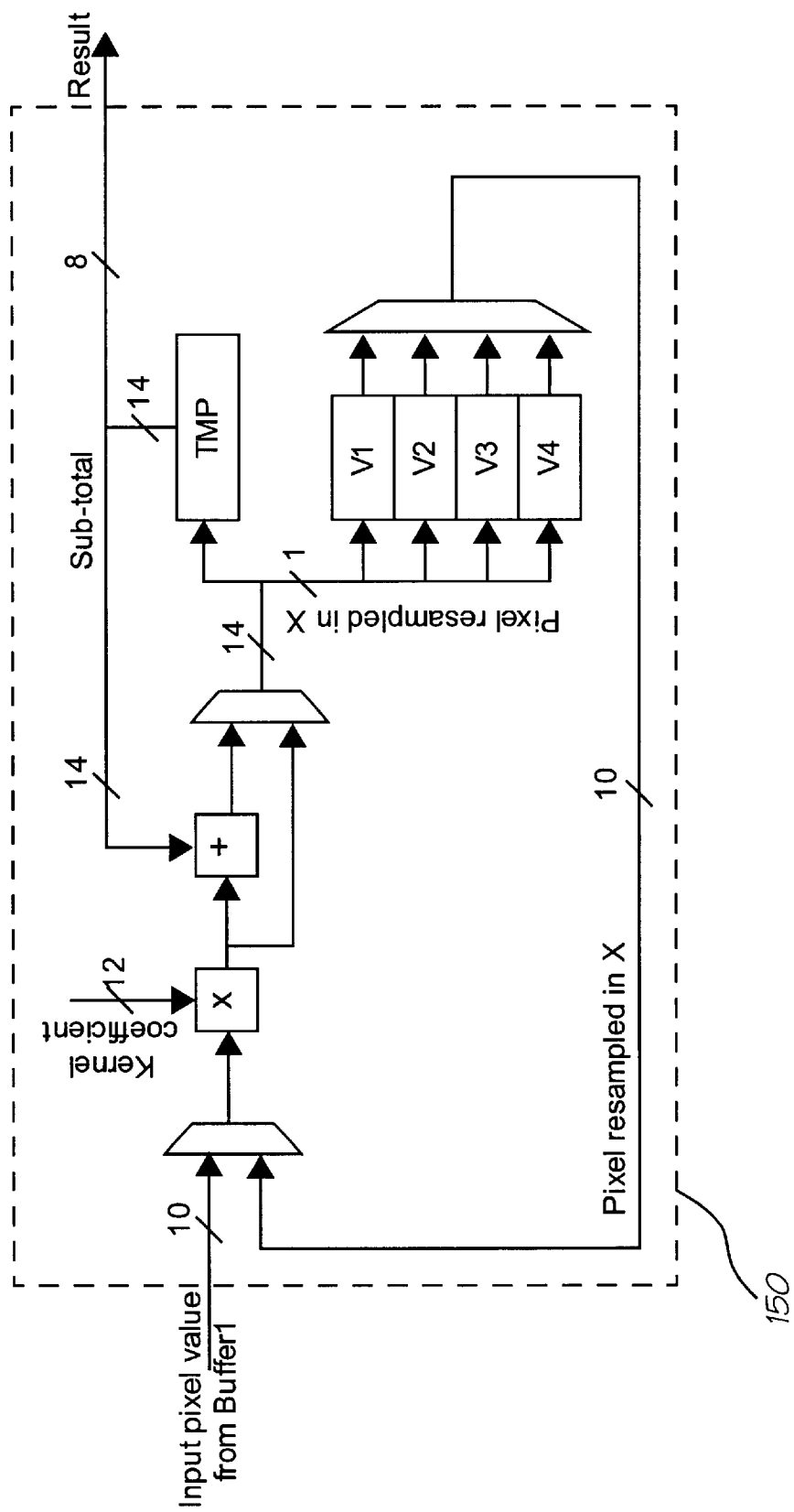
FIG. 54 shows a block diagram of the Convolve Unit.

The heart of the resampling process is the Convolve Unit 150, as shown in FIG. 54.

The process of resampling then, involves 20 cycles, as shown in Table 30. Note that the Row 1, Pixel 1 etc. refers to the input from Buffer 1 114, and is taken care of by the addressing mechanism (see below).

TABLE 30

The 20 Cycle Resample

| Cycle | Kernel | Apply Kernel to: | Store Result in |
| --- | --- | --- | --- |
| 1 | X[1] | Row 1, Pixel 1 | TMP |
| 2 | X[2] | Row 1, Pixel 2 | TMP |
| 3 | X[3] | Row 1, Pixel 3 | TMP |
| 4 | X[4] | Row 1, Pixel 4 | TMP, V1 |
| 5 | X[1] | Row 2, Pixel 1 | TMP |
| 6 | X[2] | Row 2, Pixel 2 | TMP |
| 7 | X[3] | Row 2, Pixel 3 | TMP |
| 8 | X[4] | Row 2, Pixel 4 | TMP, V2 |
| 9 | X[1] | Row 3, Pixel 1 | TMP |
| 10 | X[2] | Row 3, Pixel 2 | TMP |
| 11 | X[3] | Row 3, Pixel 3 | TMP |
| 12 | X[4] | Row 3, Pixel 4 | TMP, V3 |
| 13 | X[1] | Row 4, Pixel 1 | TMP |
| 14 | X[2] | Row 4, Pixel 2 | TMP |
| 15 | X[3] | Row 4, Pixel 3 | TMP |
| 16 | X[4] | Row 4, Pixel 4 | TMP, V4 |
| 17 | Y[1] | V1 | TMP |
| 18 | Y[2] | V2 | TMP |
| 19 | Y[3] | V3 | TMP |
| 20 | Y[4] | V4 | TMP (for output) |

10.2.10.2 Generation of L 8-

As described in Section 3.2.6.1, we must convert 80 from RGB to L for the subsequent sharpening process. We consider the CIE 1976 L*a*b* color space, where L is perceptually uniform. To convert from RGB to L (the luminance channel) we average the minimum and maximum of R, G, and B as follows:

$$L = \frac{\text{MIN}(R, G, B) + \text{MAX}(R, G, B)}{2}$$

The generation of a given pixel's R, G, and B values is performed in parallel, taking 20 cycles. The total time for the generation of L as described here, is 4 cycles. This makes the total time of generating an RGBL pixel set 24 cycles, with 1 cycle to spare (since the process must be completed within 25 cycles).

The value for L can thus be safely written out to Buffer 2 115 in the 25th cycle. Address generation is described below.

A single 8-bit comparator can produce 3 bits in 3 cycles, which can subsequently be used for selecting the 2 inputs to the adder, as shown in Table 31. The division by 2 can simply be incorporated in the adder.

TABLE 31

Selection of Min and Max based on 3 comparisons

| MIN | MAX | R > G | G > B | R > B |
|-----|-----|-------|-------|-------|
| R | B | 1 | 1 | x[a] |
| R | G | 1 | 0 | 1 |
| G | R | 0 | 1 | 0 |
| G | B | 0 | 1 | 1 |
| B | R | 0 | 0 | x |
| B | G | 1 | 0 | 0 |

[a]Don't care state

Since the add merely adds the minimum to the maximum value, the order is unimportant. Consequently, of the 2 inputs to the adder, Input1 can be a choice between R and G, while Input2 is a choice of G and B. The logic is a minimization of the appropriate bit patterns from Table 31.

10.2.10.3 Address Generation for Buffer 2

The output from the Resampler is a single RGB pixel, and 3 luminance (L) pixels centered vertically on the RGB pixel. The 3 L values can be written to Buffer2, one each 25 cycles. The R, G, and B values must be written after cycle 45 and before cycle 50, since the second pixel generated is the center pixel whose RGB values must be kept. The Buffer2 address consists of a 2-bit column component (representing which of the 4 columns is to be written to), and a 3 bit value representing L1, L2, L3, R, G, or B. The column number starts at 0 each line, and increments (with wrapping) every 75 cycles (i.e. after writing out L3).

10.2.10.4 Address Generation for Kernel Lookup

The method of calculating the kernel address is the same as described at the end of Section 3.2.5 on page 28. Each kernel is 1 dimensional, with 64 entries in the table. The 6 most significant bits (truncated) of the fractional component in the current kernel space are used to index into the kernel coefficients table. For the first 16 cycles, the X ordinate is used to index the kernel, while in the next 4 cycles, the Y ordinate is used. Since the kernel is symmetric, the same kernel can be used for both X and Y.

Figures 55, 57:
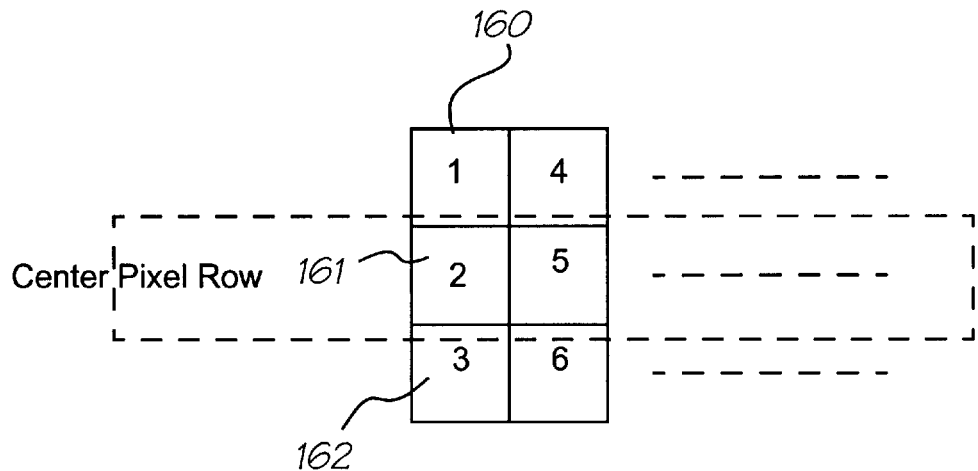
FIG. 55 shows the order of pixels generated from the receptor.
FIG. 57 shows the address of entries in Buffer 1's green sub-buffer.

For each of the 1280 resampled values, we need to produce 3 pixels—the pixel in question 161, and the pixels above 160 and below 162 that pixel. Rather than generate a center pixel and then move up and down from that center pixel, we generate a pixel 160 and generate the two pixels 161, 162 below it. The second pixel 161 generated is taken to be the center pixel. We then return to the original row and generate the next 3 pixels in the next output position. In this way, as shown in FIG. 55, we generate 3 pixels for each of the 1280 positions.

Figure 56:
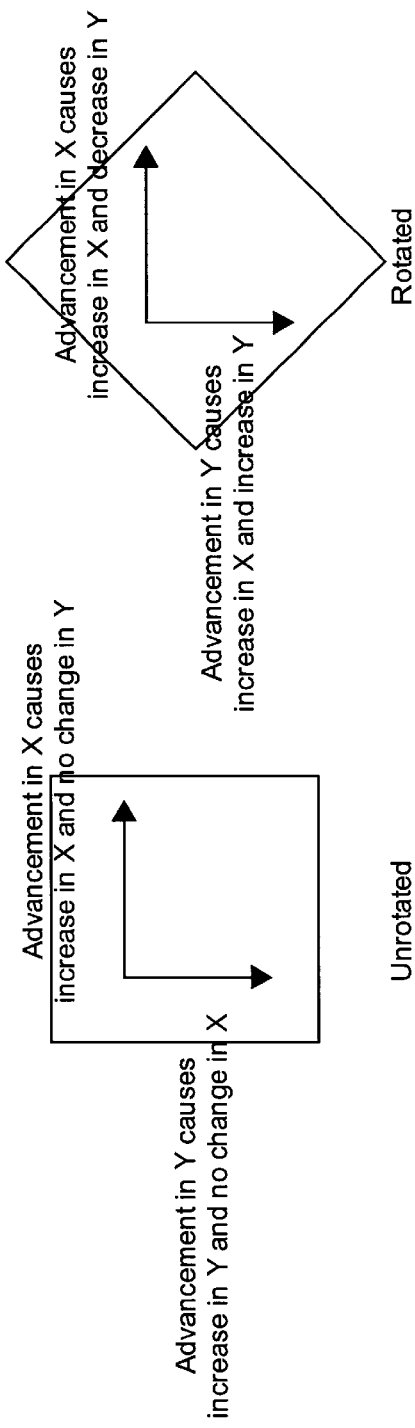
FIG. 56 shows movement in x or y in rotated and unrotated space.

Thus we have a current position in kernel space. As we advance to the next pixel in X or Y in original input space, we add appropriate delta values to these kernel coordinates. Looking at FIG. 56, we see the two cases for rotated and unrotated input space.

We consider the movement in X and Y as $\Delta X$ and $\Delta Y$, with their values dependent on the print format, and hence the value of mps (see Section 3.2.5). For the green channel, $\Delta X = \Delta Y = \frac{1}{2}$ mps. For the red and blue channels, $\Delta X = 1/\text{mps}$ and $\Delta Y = 0$. See Table 9 and Table 11 for appropriate values of $\Delta X$ and $\Delta Y$.

We can now apply the $\Delta X$ and $\Delta Y$ values to movement within the kernel. Consequently, when we advance in X, we add $\Delta X$ to X and subtract $\Delta Y$ from Y. In the unrotated case, this merely subtracts 0 from Y. Likewise, when we advance in Y, we add $\Delta Y$ to X and $\Delta X$ to Y. We can do this because movement in X and Y differs by 90 degrees.

The address generation for kernel lookup assumes a starting position set by software, and two deltas $\Delta X$ and $\Delta Y$ with respect to movement in Y in kernel space. The address generation logic is shown in the following pseudocode:

```
ColumnKernelY=StartKernelY
ColumnKernelX=StartKernelX
Do NLines times (however many output lines there are to
    process)
   KernelX=ColumnKernelX
   KernelY=ColumnKernelY
   Do 1280 times
      GeneratePixel
      KernelX=KernelX+DeltaY (movement in Y)
      KernelY=KernelY+DeltaX (movement in Y)
      Generate Pixel
      KernelX=KernelX+DeltaY (movement in Y)
      KernelY=KernelY+DeltaX (movement in Y)
      GeneratePixel
      KernelX=ColumnKernelX+DeltaX (movement in
         X)
      KernelY=ColumnKernelY-DeltaY (movement in
         X)
   EndDo
   ColumnKernelY=ColumnKernelY+Deltax (movement
      in Y)
   ColumnKernelX=ColumnKernelX+DeltaY
      (movement in Y)
EndDo
```

As shown in the pseudocode, the generation of 3 pixels occurs 1280 times. Associated with the generation of each pixel is 2 additions, which can be performed during the course of the GeneratePixel 25 cycle task. Each GeneratePixel task is 25 cycles, consisting of 4 sets of 4 cycles indexing the kernel Via KernelX (coefficients 0, 1, 2, 3), followed by 4 cycles indexing the kernel via KernelY (coefficients 0, 1, 2, 3), followed by 9 wait cycles.

Note that all values are positive and fractional only. The two carry outs from the updating of the X and Y kernel values are output to the address generation of Buffer 1 (see Section 10.2.10.5 on page 71 below). These carry out flags simply indicate whether or not the particular ordinates for the kernel wrapped during the mathematical operation. Wrapping can be either above 1 or below 0, but the result is always positive.

The two carry out bits are also sent to the Rotate/WhiteBalance/RangeExpansion Unit for use in determining the relative input lines from the image.

10.2.10.5 Address Generation for Buffer 1

The Resampler 112 reads from Buffer 1 114, which consists of 3 individually addressable buffers 145, 146 and 147—one for each color plane. Each buffer can either be read from or written to during each cycle.

$$L = \frac{\text{MIN}(R, G, B) + \text{MAX}(R, G, B)}{2}$$

The reading process of 75 cycles is broken down into 3 sets of 25 cycles, one set of 25 cycles for the generation of each pixel. Each 25 cycle set involves 16 reads from Buffer 1 followed by 9 cycles with no access. Buffer 1 is written to during these 9 cycles. The 16 reads from Buffer 1 114 are effectively 4 sets of 4 reads, and coincide with 4 groups of 4 reads to the kernel for each color plane.

The address generation then, involves generating 16 addresses for calculating the first pixel (followed by 9 wait cycles), generating 16 addresses for calculating the second pixel (followed by 9 wait cycles), and finally generating the 16 addresses for the third pixel (followed by 9 wait cycles).

Each color plane has its own starting Buffer1 address parameters. As the 3 sets of 16 addresses are generated for each of the 1280 positions along the line, and as the sampler advances from one line of 1280 samples to the next, the two carry out bits from the Kernel Address Generation Unit are used to update these Buffer 1 address parameters.

10.2.10.6 Green Buffer 146

Address generation for the green sub-buffer 146 within Buffer 1 114 is more complicated than the red sub-buffer 145 and blue sub-buffer 147 for two main reasons:

the green channel represents a checkerboard pattern in the CFA. Alternate lines consist of odd or even pixels only. To resample the green channel, we must effectively rotate the channel by 45 degrees.

there are twice as many green pixels than red or blue pixels. Resampling means the reading of more samples in the same amount of time—there are still 16 samples read to generate each pixel in medium res space, but there is a higher likelihood of advancing the buffer each time. The exact likelihood depends on the scale factor used.

However, the same concept of using a RAM as a cyclical buffer is used for the green channel. The green sub-buffer is a 78 entry RAM with a logical arrangement of 13 rows, each containing 6 entries. The relationship between RAM address and logical position is shown in FIG. 57.

Figure 58:
FIG. 58 shows the relationship between green entries dependent on rotation.

The samples in Buffer 1 146 represent a checkerboard pattern in the CFA. Consequently, samples in one row (e.g. addresses 0, 13, 26, 39, 52, 65) may represent odd or even pixels, depending on the current line within the entire image, and whether or not the image had been rotated by 90 degrees or not. This is illustrated in FIG. 58.

Consequently, when we map a 4x4 sampling area onto the buffer, there are two possibilities for the interpretation of the samples. As a result there are two types of addressing, depending on whether the current line is represented by odd or even pixels. This means that even rows with image rotation 0 will have the same addressing as odd rows with image rotation 90 since they both hold odd pixels. Likewise, the odd rows with image rotation 0 will have the same addressing as even rows with image rotation 90 since they both hold even pixels. The decision is summarized in Table 32.

TABLE 32

Determining Sampling Type

| Rotation | Current Line | Pixels | Type |
| --- | --- | --- | --- |
| 0 | Even Line | 8 Odd | Type 2 |
| 0 | Odd Line | 8 Even | Type 1 |
| 90 | Even Line | 8 Even | Type 1 |
| 90 | Odd Line | 8 Odd | Type 2 |

The actual 4x4 sampling window is the way we effectively rotate the buffer by 45 degrees. The 45 degree rotation is necessary for effective resampling, as described in Section 3.2.5.

Assuming for the moment that we only need to generate a single resample, we consider the buffer addressing by examining the two types of 4x4 sampling windows as shown in FIG. 59.

Although the two 4x4 sampling types look similar, the difference comes from the way in which the 4x4 mapping is represented in the planar image. FIG. 60 illustrates the mapping of the Type 1 4x4 sampling to the green sub-buffer. Only the top 7 rows and right-most 4 columns are shown since the 4x4 sample area is contained wholly within this area.

The mapping of buffer pixels to sample rows for the Type 2 sampling process is very similar, and can be seen in FIG. 61.

Figures 62, 63, 64:
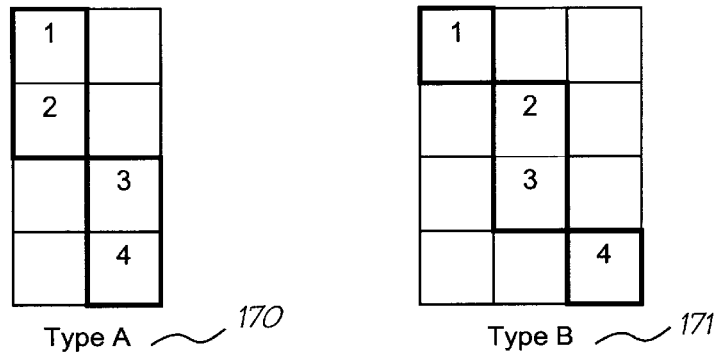
FIG. 62 shows the two types of row addressing for green.
FIG. 63 shows the addressing of entries in buffer 1's red and blue sub-buffers.
FIG. 64 shows the first 16 samples read for calculating first pixel.

In both Type 1 and Type 2 addressing of the 16 samples there are two ways of processing a row. Processing of Rows 1 and 3 of Type 1 addressing is the same (relatively speaking) as processing rows 2 and 3 of Type 2. Likewise, processing rows 2 and 4 of Type 1 is the same (relatively speaking) as processing rows 1 and 3 of Type 2. We will call these row addressing methods Type A 170 and Type B 171, as shown in FIG. 62.

Given a starting position for the 4x4 window (WindowStartAdr) and a starting type (WindowstartType), we can generate the addresses for the 16 samples by means of an 8 entry table (for traversing the two sets of 4 samples). When we read the first sample value we add an offset from the table to arrive at the next sample position. The offset will depend on the type (A, B=0, 1). The offset from the fourth sample is the amount needed to arrive at the first sample point for the next line (and must take account of the number of sample columns). After generating each row of 4 samples, we swap between TypeA and TypeB. The logic for generating the addresses for a single set of 16 samples is shown in the following pseudocode. The addition modulo 78 caters for the cyclical buffer.

```
Adr=WindowStartAdr
TypeAB=WindowStartType
Do 4 times
   For N=0 to 4
      Fetch Adr
      Adr=(Adr+Table[TypeAB,N]) mod 78
   EndFor
   TypeAB=NOT TypeAB
EndDo
```

The lookup table consists of 8 entries—4 for Type A 170, and 4 for Type B 171 address offset generation. The offsets are all relative to the current sample position (Adr).

TABLE 33

Offset Values for 16-Sample Address Generation

| TypeAB | N | Offset |
|---|---|---|
| 0 | 0 | 14 |
| 0 | 1 | 1 |
| 0 | 2 | 14 |
| 0 | 3 | 37 |
| 1 | 0 | 1 |
| 1 | 1 | 14 |
| 1 | 2 | 1 |
| 1 | 3 | 37 |

At the end of the 16 reads, the TypeAB bit will be the same as the original value (loaded from WindowStartType).

Reading a single set of 16 samples is not enough. Three sets of 16 samples must be read (representing 3 different positions in Y in unrotated input space). At the end of the first and second set of 16 samples, the kernel positions are updated by the kernel address generator. The carry bits from this update are used to set the window for the next set of 16 samples. The two carry bits index into a table containing an offset and a 1-bit flag. The offset is added to the WindowStartAdr, and the flag is used to determine whether or not to invert WindowStartType. The values for the table are shown in Table 34.

TABLE 34

Updating WindowStartAdr and WindowStartType

| KernelX CarryOut | KernelY CarryOut | Offset* | Type |
|---|---|---|---|
| 0 | 0 | 0 | No change |
| 0 | 1 | 1 | Invert |
| 1 | 0 | 14 | Invert |
| 1 | 1 | 2 | No change |

At the end of the third set of 16 samples, the kernel positions are updated to compensate for advancement in X in unrotated input space. This time, a different motion direction is produced, so a different Offset/TypeAB modifying table is used. We cannot add these offsets to the current WindowStartAdr value, because that represents a position two movements in Y away from where we want to start the movement. Consequently we load WindowStartAdr and WindowStartType from another set of variables: TopStartAdr and TopStartAdr, representing the first entry in the current line of 1280. The two carry out flags from the Kernel address generator are used to lookup Table 35 to determine the offset to add to TopStartAdr and whether or not to invert TopStartType. As before, the addition is modulo 78 (the size of the green RAM). The results are copied to WindowStartAdr and WindowStartType for use in generating the next 3 sets of 16 samples.

TABLE 35

Updating TopStartAdr and TopStartType

| KernelX CarryOut | KernelY CarryOut | Offset* | Type |
|---|---|---|---|
| 0 | 0 | 0 | No change |
| 0 | 1 | 12 | Invert |
| 1 | 0 | 14 | Invert |
| 1 | 1 | 13 | No change |

After processing the 1280 sets of 3 sets of 16 samples, the next line of 1280 begins. However the address of the first sample for position 0 within the next line must be determined. Since the samples are always loaded into the correct places in Buffer 1, we can always start from exactly the same position in Buffer 1 (i.e. TopStartAdr can be loaded from a constant PositionOAdr). However, we must worry about which type we are dealing with, since the type depends on how much we advanced. Consequently we have an initial PositionOType which must be updated depending on the carry out flags from the kernel address generator. Since we are moving in unrotated Y input space, the logic used is the same as for updating WindowStartType, except that it is performed on PositionOType instead. The new value for PositionOType is copied into TopStartType, and WindowStartAdr to begin sampling of the first position of the new line.

The sampling process for a given 1280 position line cannot begin until there are enough entries in Buffer 1, placed there by the Rotate/WhiteBalance/RangeExpansion Unit. This will occur 128 cycles after the start of each new line (see Section 10.2.11).

10.2.10.7 Red and Blue Buffers

Buffer 1's red sub-buffer 145 and blue sub-buffer 147 are simply 2 RAMs accessed as cyclical buffers. Each buffer is 30 bytes, but has a logical arrangement of 6 rows, each containing 6 entries. The relationship between RAM address and logical position is shown in FIG. 63.

For red and blue, the first 16 samples to be read are always the top 4×4 entries. The remaining two columns of samples are not accessed by the reading algorithm at this stage.

The address generation for these first 16 samples is simply a starting position (in this case 0) followed by 16 steps of addition modulo 36, as shown in the following pseudocode:

ADR=StartADR
Do 4 times
  Do 4 times
    ADR=ADR+6 MOD 36
  End Do
  ADR=ADR+13 MOD 36
End Do However, this address generation mechanism is different from the green channel. Rather than design two addressing mechanisms, it is possible to apply the green addressing scheme to the red and blue channels, and simply use different values in the tables. This reduces design complexity. The only difference then, becomes the addition modulo 36, instead of addition modulo 78. This can be catered for by a simple multiplexor.

Looking at the various address generation tables for green, and considering them as applied to red and blue, it is apparent that there is no requirement for a Type, since both the red and the blue channels do not need to be rotated 45 degrees. So that we can safely ignore the Type value, the red/blue equivalent of Table 33, shown in Table 36, has two sets of identical 4 entries.

TABLE 36

Offset Values for 16-Sample Address Generation (Red/Blue)

| TypeAB | N | Offset |
|---|---|---|
| 0 | 0 | 6 |
| 0 | 1 | 6 |
| 0 | 2 | 6 |
| 0 | 3 | 13 |

TABLE 36-continued

Offset Values for 16-Sample Address Generation (Red/Blue)

Figure 65:
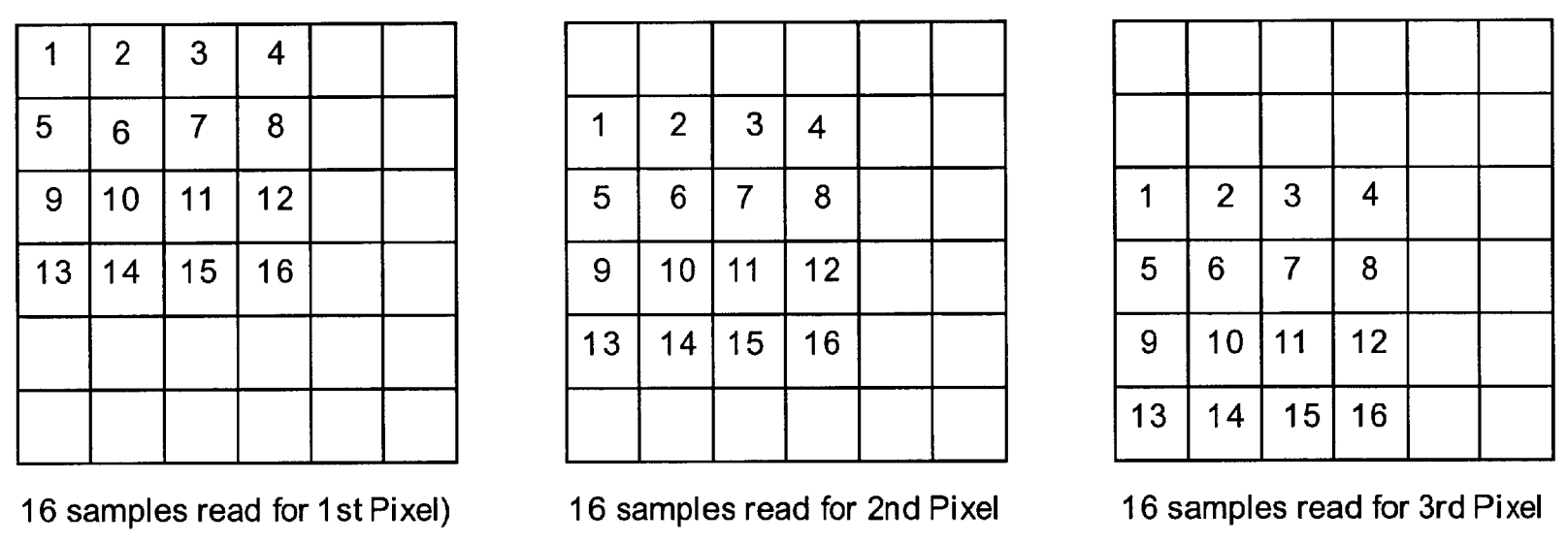

| TypeAB | N | Offset |
|---|---|---|
| 1 | 0 | 6 |
| 1 | 1 | 6 |
| 1 | 2 | 6 |
| 1 | 3 | 13 | s with green address generation, we move twice in Y before advancing to the next entry of 1280. For red and blue there is no scaling between movement in kernel space and movement in the input space. There is also no rotation. As we move in Y, the ΔY of 0 is added to KernelX (see kernel address generation in section 10.2.10.4 on page 69). As a result, the carry out from Kernelx will never be set. Looking at Table 34, the only possible occurrences are KernelX/KernelY values of 00 or 01. In the case of 00, the green solution is no change to either WindowStartAdr or WindowStartType, so this is correct for red and blue also. In the case of 01, we want to add 1 to WindowStartAdr, and don't care about WindowStartType. The green values can therefore be safely used for red and blue. The worst case is advancement by 1 in address both times, resulting in an overlapping worst case as shown in FIG. 65.

At the end of the third set of 16 samples, TopStartAdr and TopStartType must be updated. Since we are moving in X (and adding ΔY=0 to KernelY), the carry out from KernelY will always be 0. The red/blue equivalent of Table 35 is shown here in Table 37. Note that there is no Type column, since Type is not important for Red or Blue.

TABLE 37

Updating TopStartAdr and TopStartType (Red/Blue)

| KernelX CarryOut | KernelY CarryOut | Offset' |
|---|---|---|
| 0 | 0 | 0 |
| 0 | 1 | — |
| 1 | 0 | 6 |
| 1 | 1 | — |

The process of advancing from one line of 1280 sets of 3 pixels to the next is the same as for green. The PositionOAdr will be the same for the first set of 16 samples for a given line (PositionOAdr=0 for red and blue), and Type is irrelevant. Generation of the next line cannot begin until there are enough samples in Buffer1. Red and blue generation must start at the same time as green generation, so cannot begin until 128 cycles after the start of a new line (see Section 10.2.11).

10.2.11 Rotate, White Balance and Range Expansion 111

The actual task of loading Buffer1 114 from the Image RAM 11 involves the steps of rotation, white balance, and range expansion 111, as described by Section 3.2.3 and Section 3.2.4. The pixels must be produced for Buffer1 fast enough for their use by the Resampling process 112. This means that during a single group of 75 cycles, this unit must be able to read, process, and store 6 red pixels, 6 blue pixels, and 13 green pixels.

Figure 66:
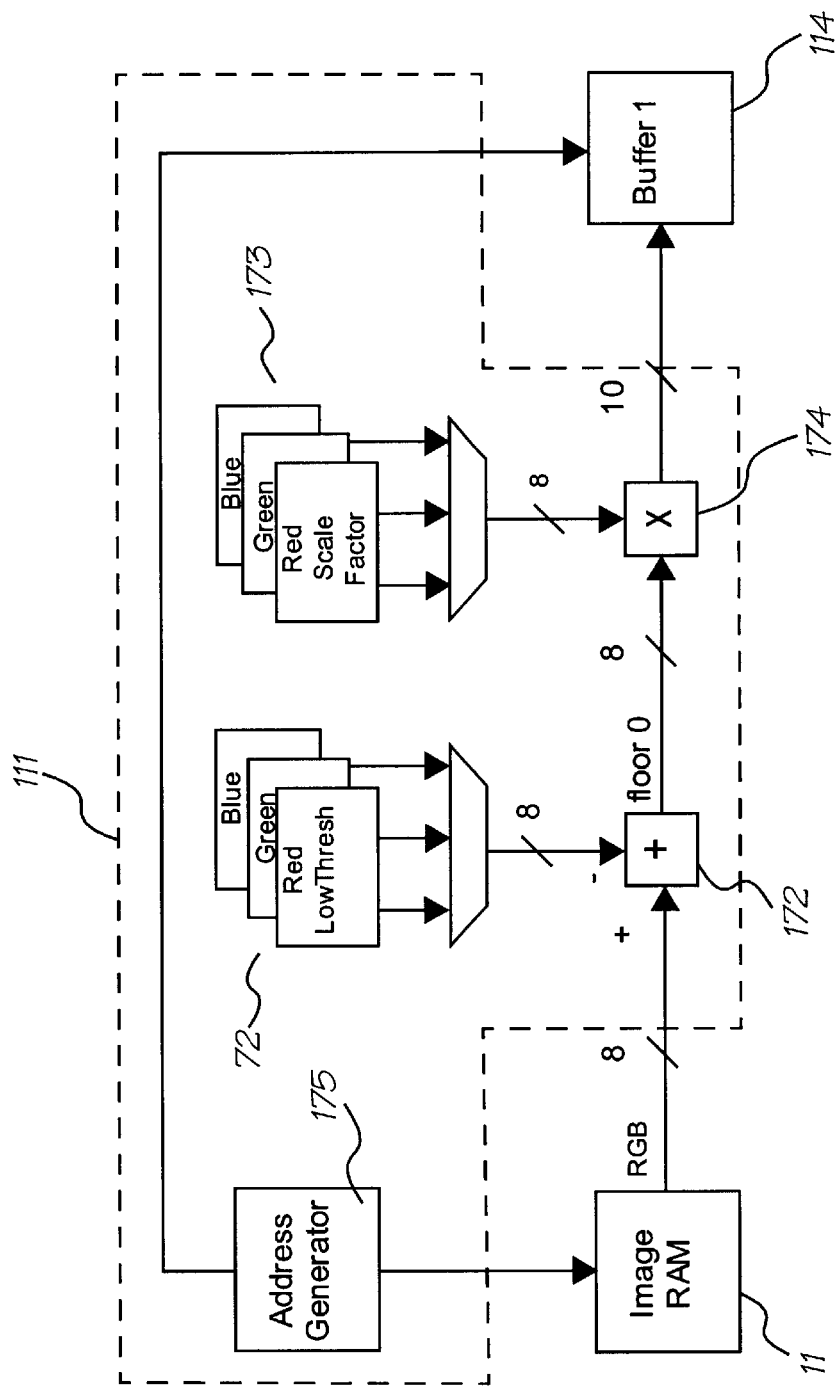
FIG. 66 shows a block diagram of the rotate, white balance and range expansion unit.

The optional rotation step is undertaken by reading pixels in the appropriate order. Once a given pixel has been read from the appropriate plane in the image store, it must be white balanced and its value adjusted according to the range expansion calculation defined in Section 3.2.4. The process simply involves a single subtraction (floor 0), and a multiply (255 ceiling), both against color specific constants. The structure of this unit is shown in FIG. 66.

The red, green and blue low thresholds 72, together with the red, green, and blue scale factors 173 are determined by the CPU 10 after generating the histograms for each color plane via the Image Histogram unit 8 (see Section 9).

Depending on whether the current pixel being processed in the pipeline is red, green, or blue, the appropriate low threshold and scale factor is multiplexed into the subtract unit and multiply unit, with the output written to the appropriate color plane in Buffer 1.

The Subtract unit 172 subtracts the 8-bit low Threshold value from the 8-bit Image RAM pixel value, and has a floor of 0. The 8-bit result is passed on to the specialized 8×8 multiply unit, which multiplies the 8-bit value by the 8-bit scale factor (8 bits of fraction, integer=1). Only the top 10 bits of the result are kept, and represent 8 bits of integer and 2 bits of fraction. The multiplier 174 has a result ceiling of 255, so if any bit higher than bit 7 would have been set as a result of the multiply, the entire 8-bit integer result is set to 1s, and the fractional part set to 0.

Apart from the subtraction unit 172 and multiply unit 174, the majority of work in this unit is performed by the Address Generator 175, which is effectively the state machine for the unit. The address generation is governed by two factors: on a given cycle, only one access can be made to the Image RAM 11, and on a given cycle, only one access can be made to Buffer 1 114. Of the 75 available cycles, 3 sets of 16 cycles are used for reading Buffer 1. The actual usage is 3 sets of 25 cycles, with 16 reads followed by 9 wait cycles. That gives a total of 27 available cycles for 25 writes (6 red, 6 blue, 6 green). This means the two constraints are satisfied if the timing of the writes to Buffer1 coincide with the wait cycles of the Resampler 112.

10.2.11.1 Address Generation for Buffer1

Once the resampling process is running, we are only concerned with writing to Buffer1 during the period when the Resampler 112 is not reading from it. Since the Resampler has 3 sets of 16 reads each 75 cycle period, there are 27 cycles available for writing. When the resampler is not running, we want to load up Buffer 1 as fast as possible, which means a write to Buffer1 114 each cycle. Address Generation for Buffer1 consequently runs off a state machine that takes these two cases into account. Whenever a value is loaded from ImageRAM 11, the adjusted value is written to the appropriate color in Buffer1 one cycle later.

Address Generation for Buffer1 therefore involves a single address counter for each of the red, blue and green sub-buffers. The initial address for RedAdr, BlueAdr and GreenAdr is 0 at the start of each line in each case, and after each write to Buffer1, the address increments by 1, with wrapping at 36 or 78, depending on whether the buffer being written to is red, green or blue. Not all colors are written each 75-cycle period. A column of green will typically require replenishing at twice the rate of red or blue, for example.

The logic is shown in the following pseudocode:

If the color to write is Red
   Write to Red Buffer1 at RedAdr
   RedAdr=RedAdr+1 mod 36
Else
If the color to write is Blue
   Write to Blue Buffer1 at BlueAdr
   BlueAdr=BlueAdr+1 mod 36

Else
  If the color to write is Green
    Write to Green Buffer1 at GreenAdr
    GreenAdr=GreenAdr+1 mod 78
  EndIf

10.2.11.2 Address Generation for Image RAM

Each plane can be read in one of two orientations—rotated by 0 or 90 degrees (anti-clockwise). This translates effectively as row-wise or column-wise read access to the planar image. In addition, we allow edge pixel replication or constant color for reads outside image bounds, as well as image wrapping for such print formats as Passport 31.

At the start of each print line we must read the ImageRAM 11 to load up Buffer1 114 as fast as possible. This equates to a single access to a sample each cycle. Resampling can only occur once 5 columns have been loaded, which means 5 columns of 6, 6, and 13 samples, for a total of 125 cycles. Plus an extra cycle for the final value to be written out to Buffer1 114 after being loaded from ImageRAM 11. To make the counting easier, we round up to 128 cycles.

After the first 128 cycles, the checking for the requirement to load the next column of samples for each of the 3 colors occurs each 75 cycles, with the appropriate samples loaded during the subsequent 75 cycles. However, the initial setting of whether to load during the first set of 75 cycles is always 1 for each color. This enables the final 6th column of each color within Buffer 1 to be filled.

At the end of each 75 cycle period, the KernelXCarryOut flag from each color plane of the Kernel Address Generator in the Resampler 112 is checked to determine if the next column of samples should be read. Similarly, an AdvanceLine pulse restarts the process on the following line if the KernelYCarryOut flag is set.

Since each 'read' effectively becomes 6 or 13 reads to fill a column in Buffer1, we keep a starting position in order to advance to the next 'read'. We also keep a coordinate value to allow the generation of out-of-bounds coordinates to enable edge pixel replication, constant color, and image wrap.

Figure 67:
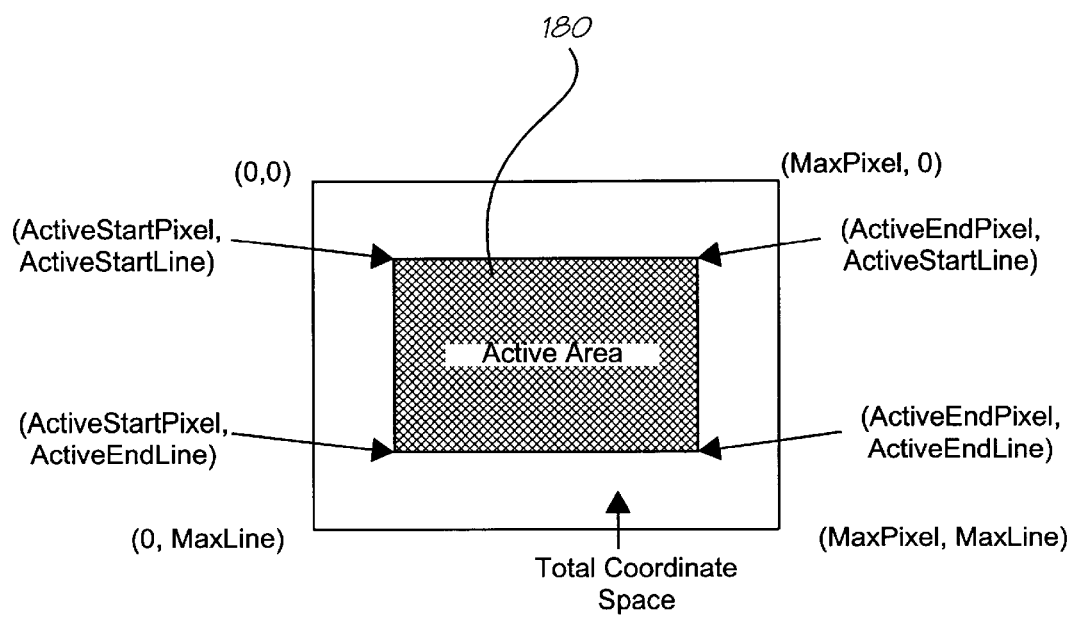
FIG. 67 shows the active image area within the generated coordinate space.

We consider the active image 180 as being within a particular bounds, with certain actions to be taken when coordinates are outside the active area. The coordinates can either be before the image, inside the image, or after the image, both in terms of lines and pixels. This is shown in FIG. 67, although the space outside the active area has been exaggerated for clarity:

Note that since we use (0, 0) as the start of coordinate generation, MaxPixel and MaxLine are also pixel and line counts. However, since address generation is run from kernel carry outs and AdvanceLine pulses from the MJI 15, these outer bounds are not required. Address generation for a line simply continues until the AdvanceLine pulse is received, and may involve edge replication, constant colors for out of bounds, or image pixel wrapping.

If we have an address, Adr, of the current sample, and want to move to the next sample, either on the next line or on the same line, the sample's coordinate will change as expected, but the way in which the address changes depends on whether we are wrapping around the active image, and must produce edge pixel replication when needed.

When there is no wrapping of the image (i.e. all print formats except Passport 31), we perform the actions in Table 38 as we advance in line or pixel. To rotate an image by 90 degrees, the CPU 10 simply swaps the ΔLine and ΔPixel values.

Looking at Table 38, the only time that ADR changes is by ΔPixel when PixelSense is 0, and by ΔLine when LineSense is 0. By following these simple rules Adr will be valid for edge pixel replication. Of course, if a constant color is desired for out of bounds coordinates, that value can be selected in instead of the value stored at the appropriate address.

To allow wrapping, we simply compare the previous sense (−,0,+) for Line and Pixel with the

TABLE 38

Actions to Perform when Advancing in Pixel or Line

| Line[a] | Pixel[b] | Pixel Change | Line Change |
|---|---|---|---|
| − | − | | |
| − | 0 | Adr = Adr + ΔPixel | |
| − | + | | |
| 0 | − | | Adr = Adr + ΔLine |
| 0 | 0 | Adr = Adr + ΔPixel | Adr = Adr + ΔLine |
| 0 | + | | Adr = Adr + ΔLine |
| + | − | | |
| + | 0 | Adr = Adr + ΔPixel | |
| + | + | | |

[a]We compare the current Line ordinate with ActiveStartLine and ActiveEndLine. If Line < ActiveStartLine, we call the value "−". If ActiveStartLine ≤ Line < ActiveEndLine, we call the value "0". If ActiveEndLine ≤ Line, we call the value "+".
[b]We compare the current Pixel ordinate with ActiveStartPixel and ActiveEndPixel. If Pixel < ActiveStartPixel, we call the value "−". If ActiveStartPixel ≤ Line < ActiveEndPixel, we call the value "0". If ActiveEndPixel ≤ Pixel, we call the value "+".

new sense. When the sense is "−" we use the advancement as described in Table 38, but when the ordinate becomes out of bounds (i.e. moving from 0 to +), we update the Adr with a new value not based on a delta. Assuming we keep the start address for the current line so that we can advance to the start of the next line once the current line has been generated, we can do the following:

If a change is in Pixel, and the pixel sense changes from 0 to + (indicating we have gone past the edge of the image), we replace Adr with the LineStartAdr and replace Pixel with ActiveStartPixel. Line remains the same.

If a change is in Line, and the line sense changes from 0 to + (indicating we have gone past the edge of the image), we subtract DeltaColumn from Adr and replace Line with ActiveStartLine. Pixel remains the same. DeltaColumn is the address offset for generating the address of (Pixel, ActiveStartLine) from (Pixel, ActiveEndLine−1).

The logic for loading the set number of samples (either 6 or 13, depending on color) is shown in the following pseudocode:

line=FirstSampleLine
    pixel=FirstSamplePixel
    adr=FirstSampleAdr
    Do N times (6 or 13)
      oldPixelSense=PixelSense(pixel)
      oldLineSense=LineSense(gLine)
      inActive=((oldLineSense==InActive) AND
         (oldPixelSense==InActive))
      If ((NOT inActive) AND UseConstant)
        Sample=ConstantColor
      else
        Sample=Fetch(adr)

EndIf
line=line+1
If ((LineSense(line)=="+") AND wrapimage)
   adr=adr−DeltaColumn
   line=ActiveStartLine
ElseIf ((LineSense(line)=="0") AND ((oldLineSense=="0")) p3 adr=adr+DeltaLine
EndIf
EndDo The setting for such variables as FirstSampleLine, FirstSamplePixel, and FirstSampleAdr is in the address generator section that responds to carry out flags from the Kernel Address Generator, as well as AdvanceLine pulses from the MJI. The logic for this part of the address generation is shown in the following pseudocode:

FirstSamplePixel=0
FirstSampleLine=0
FirstSampleAdr=FirstLineSampleAdr=ActiveStartAddress
count=0
Do Forever
  If ((KernelXCarryOut) OR (AdvanceLine AND KernelYCarryout) OR (count<5))
    Do N Samples for this color plane (see pseudocode above)
  EndIf
  oldPixelSense=PixelSense(FirstSamplePixel)
  oldLineSense=LineSense(FirstSampleLine)
  If (AdvanceLine AND KernelYCarryOut)
    count=0
    FirstSampleLine=FirstSampleLine+1
    FirstSamplePixel=0
    If ((LineSense(FirstSampleLine)=="+") AND wrapimage)
      FirstLineSampleAdr=StartAddress
      FirstSampleLine=ActiveStartLine
    ElseIf ((LineSense(FirstSampleLine)=="0") AND (oldLineSense=="0"))
      FirstLineSampleAdr=FirstLineSampleAdr+DeltaLine
    EndIf
    FirstSampleAdr=FirstLineSampleAdr
  ElseIf (KernelXCarryOut OR (count<5))
    FirstSamplePixel=FirstSamplePixel+1
    count=count+1
    If ((PixelSense(FirstSamplePixel)=="+") AND wrapimage)
      FirstSampleAdr=FirstLineSampleAdr
      FirstSamplePixel=ActiveStartPixel
    ElseIf ((PixelSense(FirstSamplePixel)=="0") AND (oldPixelSense=="0"))
      FirstSampleAdr=FirstSampleAdr+DeltaPixel
    EndIf
  EndIf
EndDo

10.2.11.3 Register Summary

There are a number of registers that must be set before printing an image. They are summarized here in Table 39. To rotate an image by 90 degrees, simply exchange the DeltaLine and DeltaPixel values, and provide a new DeltaColumn value.

TABLE 39

Registers Required to be set by Caller before Printing

| Register Name | Description |
|---|---|
| Image Access Parameters | |
| WrapImage | Tile image reads to replicate image when out of image bounds |
| UseConstant | If 0, image edge replication or wrapping occurs on reads out of image bounds. If 1, a constant color is returned. |
| Red | |
| ActiveStartAddressR | The address of red sample (ActiveStartPixel, ActiveStartLine) in ImageRAM |
| ActiveStartLineR | The first valid line for the image in red space (in relation to line 0) |
| ActiveEndLineR | The first line out of bounds for the image in red space |
| ActiveStartPixelR | The first valid pixel for the image in red space (in relation to pixel 0) |
| ActiveEndPixelR | The first pixel out of bounds for the image in red space |
| DeltaLineR | The amount to add to the current address to move from one line to the next in red space |
| DeltaPixelR | The amount to add to the current address to move from one pixel to the next on the same line in red space |
| DeltaColumnR | The amount to add to the current address to move from a pixel in the last line of the Active image area to the same pixel on the first line of the Active image area in red space. |
| ConstantColorR | Red color value to use if address out of bounds and UseConstant=1 |
| Green | |
| ActiveStartAddressG | The address of green sample (ActiveStartPixel, ActiveStartLine) in ImageRAM |
| ActiveStartLineG | The first valid line for the image in green space (in relation to line 0) |
| ActiveEndLineG | The first line out of bounds for the image in green space |
| ActiveStartPixelG | The first valid pixel for the image in green space (in relation to pixel 0) |
| ActiveEndPixelG | The first pixel out of bounds for the image in green space |
| DeltaLineG | The amount to add to the current address to move from one line to the next in green space |
| DeltaPixelG | The amount to add to the current address to move from one pixel to the next on the same line in green space |
| DeltaColumnG | The amount to add to the current address to move from a pixel in the last line of the Active image area to the same pixel on the first line of the Active image area in green space. |
| ConstantColorG | Green color value to use if address out of bounds and UseConstant=1 |
| Blue | |
| ActiveStartAddressB | The address of blue sample (ActiveStartPixel, ActiveStartLine) in ImageRAM |
| ActiveStartLineB | The first valid line for the image in blue space (in relation to line 0) |
| ActiveEndLineB | The first line out of bounds for the image in blue space |
| ActiveStartPixelB | The first valid pixel for the image in blue space (in relation to pixel 0) |
| ActiveEndPixelB | The first pixel out of bounds for the image in blue space |
| DeltaLineB | The amount to add to the current address to move from one line to the next in blue space |
| DeltaPixelB | The amount to add to the current address to move from one pixel to the next on the same line in blue space |
| DeltaColumnB | The amount to add to the current address to move from a pixel in the last line of the Active image area to the same pixel on the first line of the Active image area in blue space. |

TABLE 39-continued

Registers Required to be set by Caller before Printing

| Register Name | Description |
|---|---|
| ConstantColorB | Blue color value to use if address out of bounds and UseConstant=1 |
| White Balance and Range Expansion Parameters | |
| RedLowThreshold | 8-bit value subtracted from red input values |
| GreenLowThreshold | 8-bit value subtracted from green input values |
| BlueLowThreshold | 8-bit value subtracted from blue input values |
| RedScaleFactor | 8-bit scale factor used for range expansion of red pixels |
| GreenScaleFactor | 8-bit scale factor used for range expansion of green pixels |
| BlueScaleFactor | 8-bit scale factor used for range expansion of blue pixels |

11 REFERENCES

[1] Silverbrook Research, 1998, *Authentication of Consumables*.
[2] Silverbrook Research, 1998, *Authentication Chip*.

Although the invention has been described with reference to specific examples, it will be appreciated, by those skilled in the art, that it may be embodied in many other forms. The following numbered paragraphs provide the addressee with a further indication of the scope of the invention, although other novel and inventive features and combination of features will also be clear from the disclosure therein.

We claim:

1. A method for interpolating a Bayer image of red, green and blue pixels from an input space to an output space, the method including the steps of:

receiving the Bayer image; and mapping each of the colors to the output space in accordance with the following:

$$x' = \left(\frac{x}{mps}\right) + k_1$$

$$y' = \left(\frac{y}{mps}\right) + k_2$$

where:

x,y is the coordinate in the output space, x'y' is the coordinate in the input space;

mps is the number of pixels in the output space per input space sample, and $k_{1,2}$ are either 0 or −0.5 depending on the color and the desired relative rotational orientation of the image.

2. A method according to claim 1 wherein, for the green pixels in the input space, each ordinate of the input space is multiplied by $1/\sqrt{2}$.

3. A method according to claim 1 or claim 2 wherein, for the green pixels in the input space, each coordinate of the input space is multiplied by $1/\sqrt{2}$.

4. An apparatus for interpolating a Bayer image of red, green and blue pixels from an input space to an output space, the method including the steps of:

receiving the Bayer image; and mapping each of the colors to the output space in accordance with the following:

$$x' = \left(\frac{x}{mps}\right) + k_1$$

$$y' = \left(\frac{y}{mps}\right) + k_2$$

where:

x,y is the coordinate in the output space, x'y' is the coordinate in the input space;

mps is the number of pixels in the output space per input space sample, and $k_{1,2}$ are either 0 or −0.5 depending on the color and the desired relative rotational orientation of the image.

5. An apparatus according to claim 4 wherein, for the green pixels in the input space, each ordinate of the input space is multiplied by $1/\sqrt{2}$.

6. A method for sampling a Bayer image having two dimensional planes of red, green and blue pixels, the method including the steps of:

rotating the green plane by 45 degrees;

sequentially sampling an m×m pixel block of the rotated image, where m is an integer greater than 1;

providing an address for the $m^2$ samples by determining a starting address for a first of the samples and thereafter applying a predetermined fixed sequence of offsets to obtain the addresses of the remaining samples.

7. A method according to claim 6 wherein the step of determining the starting address is responsive to the relative rotational orientation of the image.

8. A method according to claim 6 or claim 7, wherein m=4 and there are sixteen offsets.

* * * * *